United States Patent [19]

Kline, Jr. et al.

[11] Patent Number: 5,499,188
[45] Date of Patent: Mar. 12, 1996

[54] FLEXIBLE METHOD FOR BUILDING A RECIPE IN A PROCESS CONTROL SYSTEM

[75] Inventors: Robert C. Kline, Jr.; Emory C. Clements, both of Glendale; Gretchen L. Krehbiel, Phoenix, all of Ariz.; Darrell R. Tanner, Cincinnati, Ohio; James A. Strilich, Phoenix, Ariz.; David A. Chappell, West Chester, Ohio

[73] Assignee: Honeywell Inc., Minneapolis, Minn.

[21] Appl. No.: 293,773

[22] Filed: Aug. 22, 1994

Related U.S. Application Data

[63] Continuation of Ser. No. 989,853, Dec. 14, 1992, abandoned.

[51] Int. Cl.$^6$ ............................. G06F 15/00; G06F 17/00
[52] U.S. Cl. ..................... 364/468; 364/131; 364/138; 364/401
[58] Field of Search ......................... 364/468, 478, 364/401–403, 131, 133, 138; 395/20, 51, 912

[56] References Cited

U.S. PATENT DOCUMENTS

| | | | |
|---|---|---|---|
| 4,607,256 | 8/1986 | Henzel | 364/138 |
| 4,786,182 | 11/1988 | Larsen | 366/140 |
| 4,796,194 | 1/1989 | Atherton | 364/468 |
| 4,807,108 | 2/1989 | Ben-Arieh et al. | 364/148 |
| 4,827,423 | 5/1989 | Beasley et al. | 364/468 |
| 4,870,590 | 9/1989 | Kawata et al. | 364/468 |
| 4,931,944 | 6/1990 | Richter et al. | 364/468 |
| 5,191,313 | 3/1993 | Galbraith | 340/501 |
| 5,216,612 | 6/1993 | Cornett et al. | 364/468 |
| 5,442,561 | 8/1995 | Yoshizawa et al. | 364/468 |

OTHER PUBLICATIONS

"Oop & Expert Systems Transform Batch Recipes", Paul L. Nowicki, Intech, Sep. 1992.

*Primary Examiner*—Paul P. Gordon
*Attorney, Agent, or Firm*—Arthur A. Sapelli

[57] ABSTRACT

A process plant has a process control system and a plurality of production lines, each production line having a predetermined equipment configuration. The process control system further includes a controller for interfacing to each production line. The process control system has information pertaining to the equipment configuration of each production line stored in an equipment data base, the operations performed by each production line stored in an operations data base, and raw materials information of the process plant stored in a raw materials data base. A method for controlling the production of a product by a production line comprises the steps of building a formula based on the product to be produced. The formula data provides information relating to relative quantities of raw materials included in the product and the manner of combining the raw materials. The formula also provides a sequence of operations for combining the raw materials compatible with production line operations and consistent with the formula data, the formula being independent of equipment. Based on the formula and a selected production line, a recipe is built for the product, the recipe being a set of procedures unique to the selected production line necessary to produce the product. The recipe is executed by the controller, causing the equipments of the production line to perform the operations in the specified sequence called for in the recipe to generate the product.

6 Claims, 37 Drawing Sheets

FORMULA TASKS

1 ADD A 10% +-1%
2 HEAT TO 70 DEG.C. WAIT
3 AGITATOR SLOW
4 HEAT TO 90 DEG.C.
5 ADD B 20%+-1%
6 HEAT TO 90 DEG.C. WAIT
7 MIX FAST 1 MINUTE
8 HEAT OFF
9 AGITATOR SLOW
10 ADD C 70%+10%-5%
11 MIX FAST 30 MINUTE

*Fig.10*

◇ = ACTIVE VESSEL
— = ACTIVE CHAIN
☐ = PREVIOUS ACTIVE VESSEL
— = PREVIOUS ACTIVE CHAIN
○ = FIRST COMMON ANCESTOR

◇ = ACTIVE VESSEL
— = ACTIVE CHAIN
☐ = PREVIOUS ACTIVE VESSEL
— = PREVIOUS ACTIVE CHAIN
○ = FIRST COMMON ANCESTOR

◇ =ACTIVE VESSEL
— =ACTIVE CHAIN
☐ =PREVIOUS ACTIVE VESSEL
— =PREVIOUS ACTIVE CHAIN
○ =FIRST COMMON ANCESTOR

◇ =ACTIVE VESSEL
— =ACTIVE CHAIN
☐ =PREVIOUS ACTIVE VESSEL
— =PREVIOUS ACTIVE CHAIN
○ =FIRST COMMON ANCESTOR

◇ = ACTIVE VESSEL
— = ACTIVE CHAIN
□ = PREVIOUS ACTIVE VESSEL
— = PREVIOUS ACTIVE CHAIN
○ = FIRST COMMON ANCESTOR

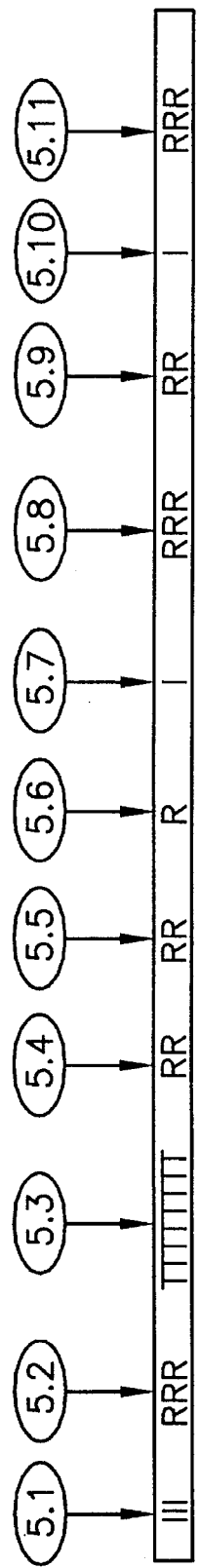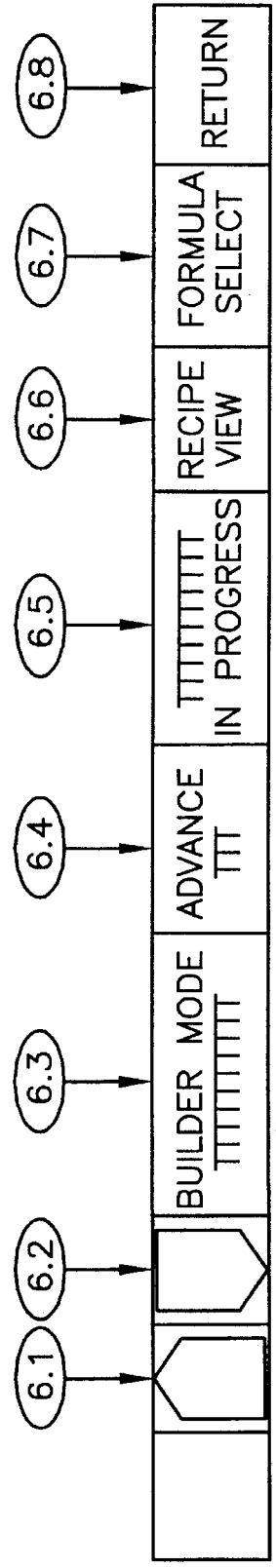
Fig. 56
Fig. 58
Fig. 59

FLEXIBLE METHOD FOR BUILDING A RECIPE IN A PROCESS CONTROL SYSTEM

This is a continuation of application(s) Ser. No. 07/989,853, filed on Dec. 14, 1992, now abandoned.

BACKGROUND OF THE INVENTION

The present invention relates to a method of process control of a process control system, and more particularly, to a method of generating a recipe which will be utilized by the process control system wherein the process control system includes a plurality of production lines of varying configurations, a recipe being automatically generated for each production line to match the equipment configuration of the production line.

In existing systems, the configuration of the production line is inputted by the production supervisor (i.e., user) and the desired process (formula) is also inputted to a microprocessor, the microprocessor generating the recipe to be utilized by the production line to generate the product (of the formula). In these existing systems, the recipe includes dependencies on an equipment class such that the recipe generated is specific to that class of production line. The generated recipe contains all the information for the control software to run the class production line. A recipe is also generated for each production line. In the existing systems, there is a recipe for each product and each class of production line. Thus, for example, a system having four (4) formulas (i.e., 4 products which are manufactured) and five (5) production lines, there are twenty (20) recipes which must be generated and maintained. Thus, any changes in the formula or the equipment requires the recipe to be regenerated. Any change to the formula requires the recipe for each equipment (i.e., production line) to be reexecuted, and any change to the equipment requires all recipes for that equipment to be regenerated.

Thus there exists a need to simplify the recipe generation and maintenance process. The present invention achieves the desired simplification by essentially separating the equipment information from the formula i.e., the equipment information, the operations information, and raw materials information are each stored in a separate equipment data base, operations data base, and a raw materials data base, respectively. The present invention maintains the formula and data bases as separate entities. The formula for generating the product is completely independent of equipment. The "recipe builder" of the present invention automatically generates a recipe from the formula which includes equipment information. The equipment data base is specific to a production line and doesn't change (unless the equipment is changed). Any change to the formula (which may change for a variety of reasons such as varying texture, quality, . . . of the output product) require a reexecution of recipe builder process which is done at run time in order to get the new recipe but the simplification is achieved by the separation of the equipment information from the formula and does not require the user to input all the information as is required by the existing systems. Thus, in the present invention, any changes to the formula only requires editing the formula, and any changes to the equipment only requires modifying the equipment data base.

SUMMARY OF THE INVENTION

Therefore, there is provided by the present invention a method which simplifies the recipe generation and maintenance of a process plant. A process plant has a process control system and a plurality of production lines, each production line having a predetermined equipment configuration. The process control system further includes a controller for interfacing to each production line. The process control system has information pertaining to the equipment configuration of each production line stored in an equipment data base, the operations performed by each production line stored in an operations data base, and raw materials information of the process plant stored in a raw materials data base. A method for controlling the production of a product by a production line comprises the steps of building a formula based on the product to be produced. The formula data provides information relating to relative quantities of raw materials included in the product and the manner of combining the raw materials. The formula also provides a sequence of operations for combining the raw materials compatible with production line operations and consistent with the formula data, the formula being independent of equipment. Based on the formula and a selected production line, a recipe is built for the product, the recipe being a set of procedures unique to the selected production line necessary to produce the product. The recipe is executed by the controller, the controller causing the equipments of the production line to perform the specified operations in the specified sequence as called for in the recipe to generate the product.

Accordingly, it is an object of the present invention to provide a method for simplifying the recipe generation and maintenance of a process plant.

This and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 10 shows a sample english representation of information supplied in a formula record;

FIG. 56 shows a design structure of FRMPC1A0;

FIG. 58 shows a structure of subpicture INTERMD9 data structure; and

FIG. 59 shows a diagram of a change zone subpicture INTCZ1A8.

DETAILED DESCRIPTION

Figure 1:
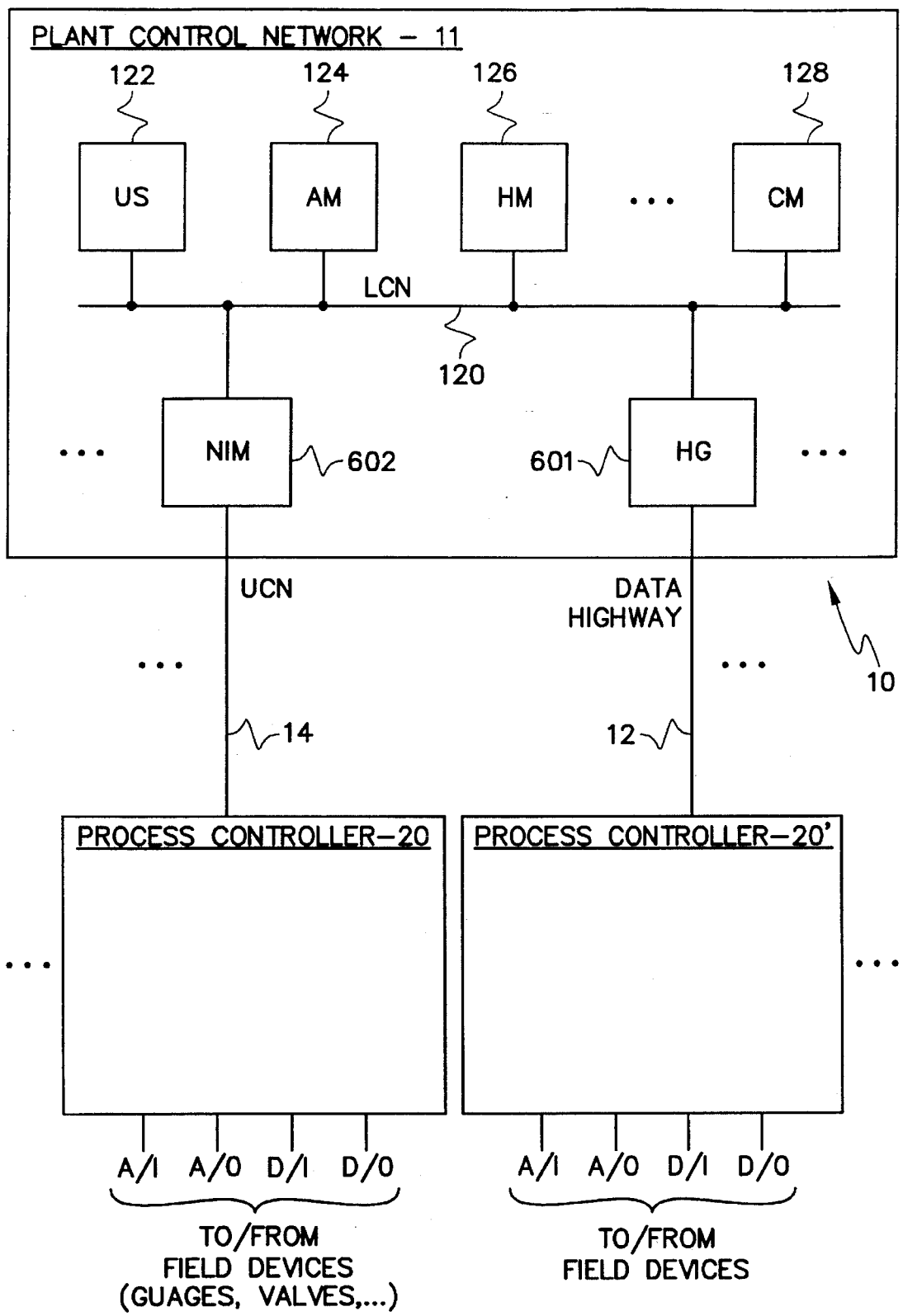
FIG. 1 shows a block diagram of a process control system in which the method of the present invention may be utilized.

Before describing the present invention, it will be helpful in understanding a system environment in which the method of the present invention can be utilized. Referring to FIG. 1, there is shown a block diagram of a process control system 10 of the preferred embodiment in which the present invention can be found. The process control system 10 includes a plant control network 11, and connected thereto is a data highway 12, which permits a process controller 20' to be connected thereto. In the present day process control system 10, additional process controllers 20' can be operatively connected to the plant control network 11 via a corresponding highway gateway 601 and a corresponding data highway 12. A process controller 20, an interface apparatus which includes many new, additions, improvements, and features over the process controller 20' is operatively connected to the plant control network 11 via a universal control network (UCN) 14 to a network interface module (NIM) 602. In the preferred embodiment of the process control system 10, additional process controllers 20 can be operatively connected to the plant control network 11 via a corresponding UCN 14 and a corresponding NIM 602. The process controllers 20, 20' interface the analog input and output signals, and digital input and output signals (A/I, A/O, D/I, and D/O respectively) to the process control system 10 from the variety of field devices (not shown) of the process being controlled which include valves, pressure switches, pressure gauges, thermocouples, ...

The plant control network (or more simply network) 11 provides the overall supervision of the controlled process, in conjunction with the plant operator, and obtains all the information needed to perform the supervisory function, and includes an interface with the operator. The plant control network 11 includes a plurality of physical modules, which include a universal operator station (US) 122, an application module (AM) 124, a history module (HM) 126, a computer module (CM) 128, and duplicates (backup or secondary) of these modules (and additional types of modules, not shown) as necessary to perform the required control/supervisory function of the process being controlled. Each of these physical modules is operatively connected to a local control network (LCN) 120 which permits each of these modules to communicate with each other as necessary. The NIM 602 and HG 601 provide an interface between the LCN 120 and the UCN 14, and the LCN 120 and the data highway 12, respectively.

Physical modules 122, 124, 126, 128, ... of network 11 of the preferred embodiment are of various specialized functional types. Each physical module is the peer, or equivalent, of the other in terms of right of access to the network's communication medium, or LCN 120, for the purpose of transmitting data to other physical modules of network 11.

Universal operator station module (US) 122 of network 11 is a work station for one or more plant operators. It includes an operator console which is the interface between the plant operator, or operators, and the process or processes of the plant for which they are responsible. Each universal operator station module 122, is connected to the LCN 120, and all communications between the universal operator station module 122, and any other physical module of network 11, is via the LCN 120. Universal operator station module 122 has access to data that is on the LCN 120 and the resources and data available through, or from, any of the other physical modules of network 11. The universal station module 122 includes a cathode ray tube display (CRT) (not shown) which includes a video display generator, an operator keyboard (KB) (not shown), a printer (PRT) (not shown), and can also include (but not shown) a cartridge disk data storage device, trend pen recorders, and status displays, for example.

A history module (HM) 126 provides mass data storage capability. The history module 126 includes at least one conventional disk mass storage device such as a Winchester disk, which disk storage device provides a large volume of nonvolatile storage capability for binary data. The types of data stored by such a mass storage device are typically trend histories, event histories, . . . or data from which such histories can be determined, data that constitutes or forms CRT type displays, copies of programs for the physical modules . . .

An application module (AM) 124 provides additional data processing capability in support of the process control functions performed by the controllers associated with the process control subsystem 20, 20' such as data acquisition, alarming, batch history collection, and provide continuous control computational facilities when needed. The data processing capability of the application module 124 is provided by a processor (not shown) and a memory (not shown) associated with the module.

Computer module (CM) 128 uses the standard or common units of all physical modules to permit a medium-to-large scale, general purpose data processing system to communicate with other physical modules of network 11 and the units of such modules over the LCN 120 and the units of process control subsystems 20, 20' via the highway gateway module 601, and the NIM 602, respectively. Data processing systems of a computer module 128 are used to provide supervisory, optimization, generalized user program preparation and execution of such programs in higher level program languages. Typically, the data processing systems of a computer module 128 have the capability of communicating with other such systems by a communication processor and communication lines.

The local control network 120 (LCN) is a high-speed, bit serial, dual redundant communication network that interconnects all the physical modules of plant control network 11. LCN 120 provides the only data transfer path between the principal sources of data, such as highway gateway module 601, application module 124, and history module 126, and principal users of such data, such as universal operator station module 122, computer module 128, and application module 124. LCN 120 also provides the communication medium over which large blocks of data, such as memory images, can be moved from one physical module such as history module 126 to universal station module 122. LCN 120 is dual redundant in that it consists of two coaxial cables that permit the serial transmission of binary signals over both cables. A more complete description of the plant control network 11, and the physical modules can be had by reference to U.S. Pat. No. 4,607,256.

Figure 2:
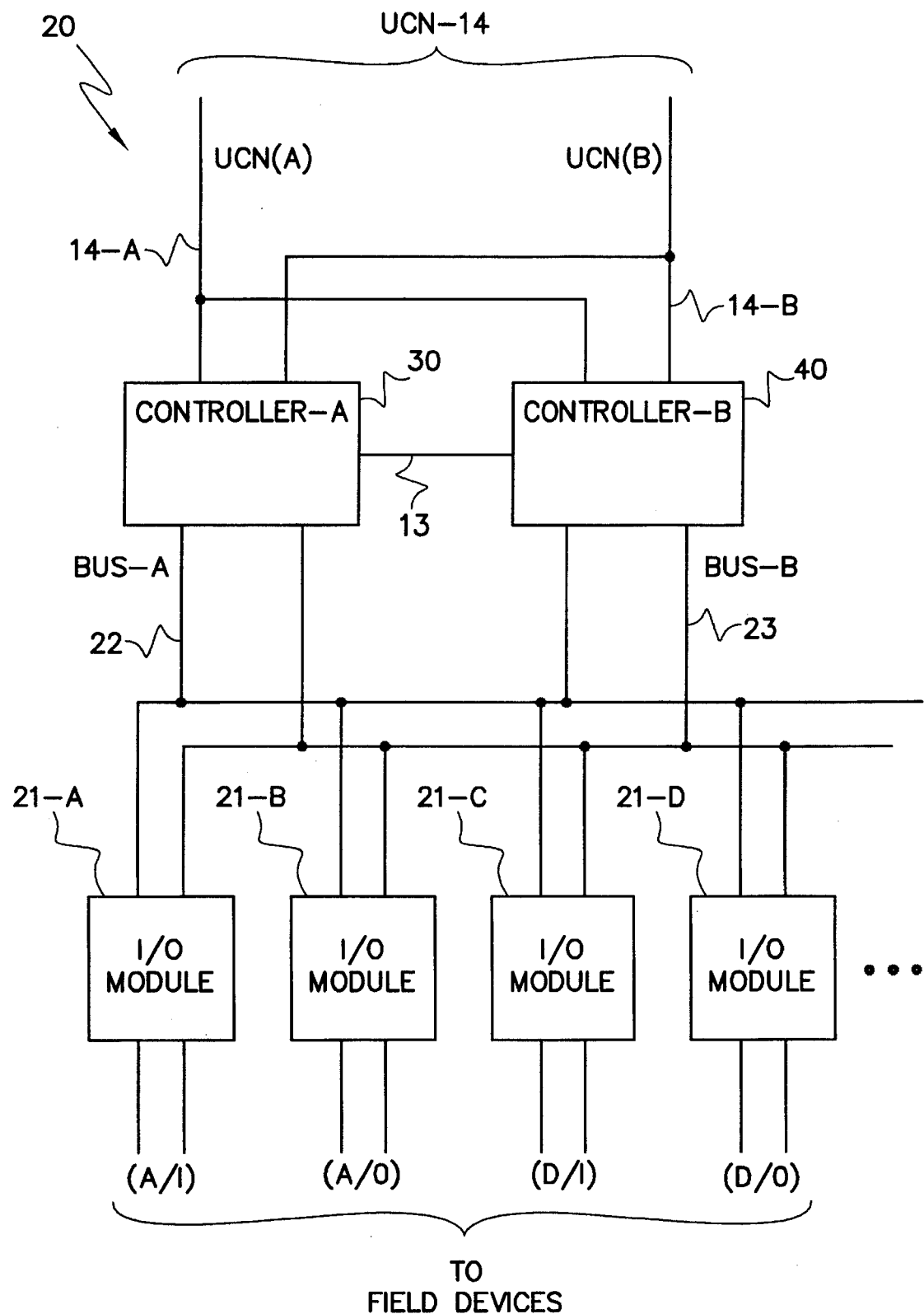
FIG. 2 shows a block diagram of a process controller, the preferred embodiment of the interface apparatus of the present invention.

Referring to FIG. 2 there is shown a block diagram of the process controller 20, i.e., of the preferred embodiment. The process controller 20 of the preferred embodiment includes a controller A30 and a controller B40, which effectively operate as a primary and secondary controller. Controller A30 and Controller B40 are connected to the UCN 14, the UCN 14 in the preferred embodiment comprising for communication redundancy purposes, a UCN(A) 14A and a UCN(B) 14B. Input output (I/O) modules 21 interface to field devices, field devices being various valves, pressure switches, pressure gauges, thermocouples, . . . which can be analog inputs (A/I), analog outputs (A/O), digital inputs (D/I), and digital outputs (D/O). The controller A30 interfaces to each I/O module 21 via a bus A22, and controller B40 interfaces to each I/O module 21 via a bus B23. In addition, once again for communication redundancy purposes, controller A30 is also connected to bus B and controller B40 is connected to bus A22.

Controller A and controller B, 30, 40, can communicate with each other via three mediums, the UCN 14, a link 13 between the controllers, and the busses A, B, 22, 23, bus A and bus B in the preferred embodiment being serial I/O links. One controller (controller A30 or controller B40) operates as a secondary controller (in more of a reserve mode than a backup, in that if a failure of controller A30 should occur, controller B is ready to take over the control function with essentially no start-up or initialization time). On a predetermined time basis, point processing is performed by the controller designated as the primary controller and communicates with the I/O modules 21. In addition, the controller acting as the primary controller communicates with the plant control network 11 reporting status, history, and accepting inputs from the plant control network such as commands from the operator via the universal station 122. In addition, a data base maintained by the primary controller is communicated to the secondary controller via link 13. In the preferred embodiment, as mentioned above one controller operates as a secondary controller; however, it will be understood by those skilled in the art that a secondary controller is not necessary for the process controller 20. In the preferred embodiment, the secondary controller is optional and operates in a mode intended by the invention. It will further be understood by those skilled in the art that various configurations can exist for interfacing the controller A, B30, 40 to the UCN 14A, 14B. Controller A30 can be interfaced to UCN 14A and controller B40 can be interfaced to UCN 14B; however, in this case a bus (UCN) of event that causes UCN A 14A to fail can cause a switch-over to the backup controller,—i.e., controller B40. But in the preferred embodiment, controller A30 is connected to both UCN 14A and 14B. Likewise, controller B40 is connected to both 14A and 14B. In this configuration, a communication event does not force the system to a processor failover situation.

Figure 3:
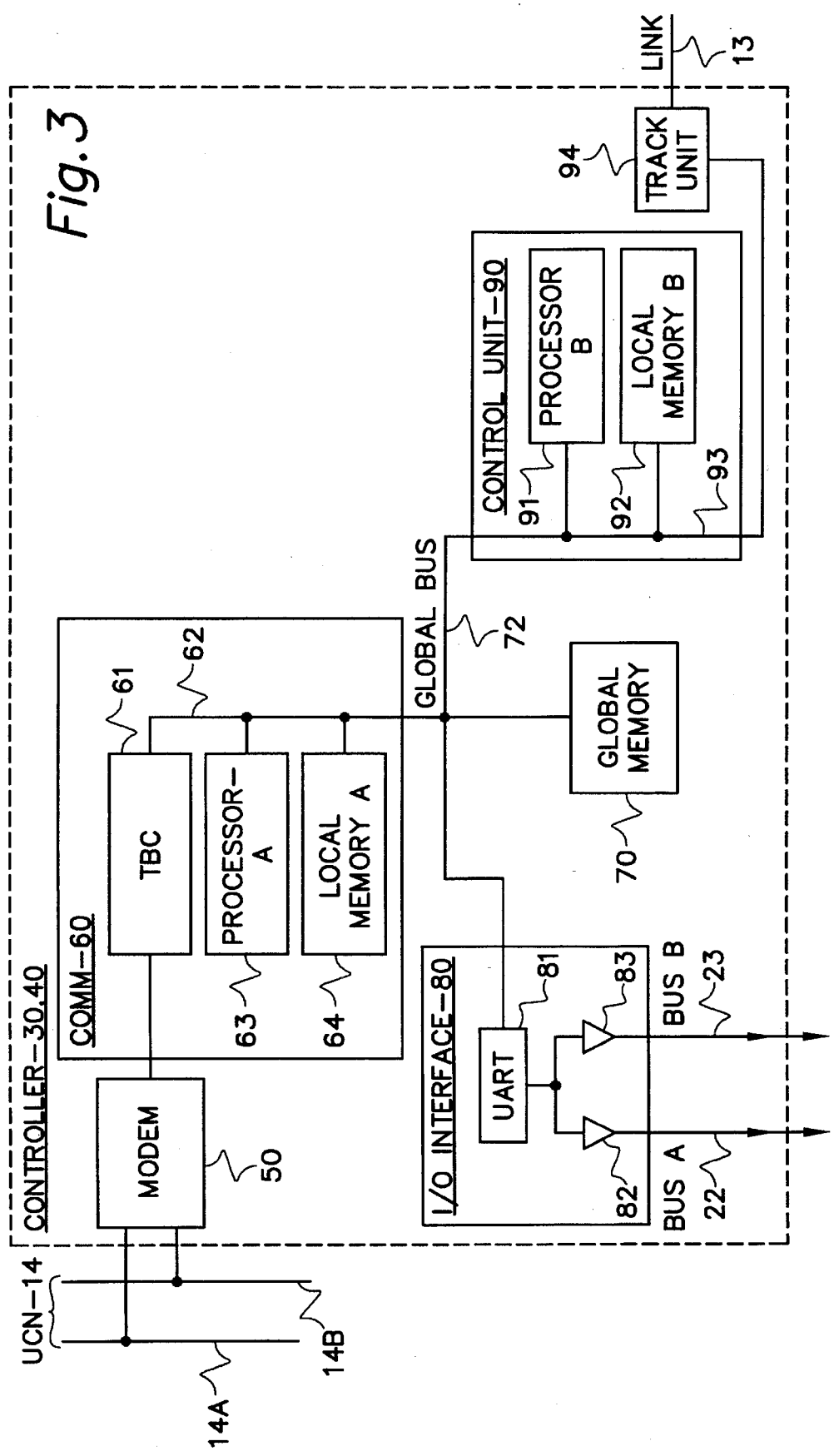
FIG. 3 shows a block diagram of a controller of the process controller of the preferred embodiment of the present invention.

Referring to FIG. 3, there is shown a block diagram of the controller 30, 40. A modem 50 is connected to the UCN 14, the modem having two inputs, one connected to UCN 14A and the other connected UCN 14B. In preferred embodiment, the modem is a Concord Data Systems 5 mega-bit carrier band modem having two ports which allows interfacing with a communication unit (COMM) 60 which in turn interfaces with a global memory 70, an I/O interface unit 80, and a control unit 90 via global bus 72. The communication unit 60 includes a communication control unit, in the preferred embodiment a token bus controller (TBC) 61, Motorola type 68824, which is connected to a local bus 62. Connected to the local bus 62 is a processor A63 (which essentially performs the communication function) and a local memory A64. The processor A63 via the TBC 61, communicates with the plant control network 11 via modem 50. The local memory A64 stores information, including personality image which is downloaded from the plant control network 11, for use by processor A63 and TBC 61. The global memory 70 stores information which is common to both processors A63 and B91. It also stores all the data received from bus A22 and B23. The global memory 70 also serves as an interprocessor communication vehicle between processors A63 and B91. Control unit 90 includes a processor B91 and a local memory B92. Processor B91 performs the control function (i.e., control processing) relating to the field devices. This essentially includes performing the point processing, and updating the local memory B92 and global memory 70. Also coupled to the local bus 93 of control unit 90 is a track unit 94 which is utilized to implement the data base transfer via link 13 to the other controller 30, 40 of the process controller 20. The I/O interface unit 80 includes a receiver-transmitter device, in the preferred embodiment this device being a UART (Universal Asynchronous Receiver/Transmitter) 81. In the preferred embodiment the UART utilized is a circuit within the Intel 80C31 microcontroller. The UART 81 is coupled through drivers 82, 83, to bus A22 and bus B23, respectively. (As mentioned previously, control unit 90 can be eliminated, the control processing being performed by another processor within the plant control network 11, such as AM124. In this configuration, the interface apparatus of the present invention functions as a data acquisition unit).

Processor B91 receives data from the various field devices through global memory 70, performs the necessary point processing and control function, and then updates the local memory B92 and global memory 70, as required. The communication unit 60, in response to commands from the control unit 90 via global memory 70, inputs and outputs data between the I/O modules 21 (via the I/O interface unit 80) and the global memory 70, thereby relieving the control unit 90 from the burden of I/O module management. In this manner the control processing is performed by the control unit 90 within the process control 20 for the predefined attached field devices, and the communication (i.e., the I/O control) is handled by the communication unit 60 through the UART 81.

Figure 4:
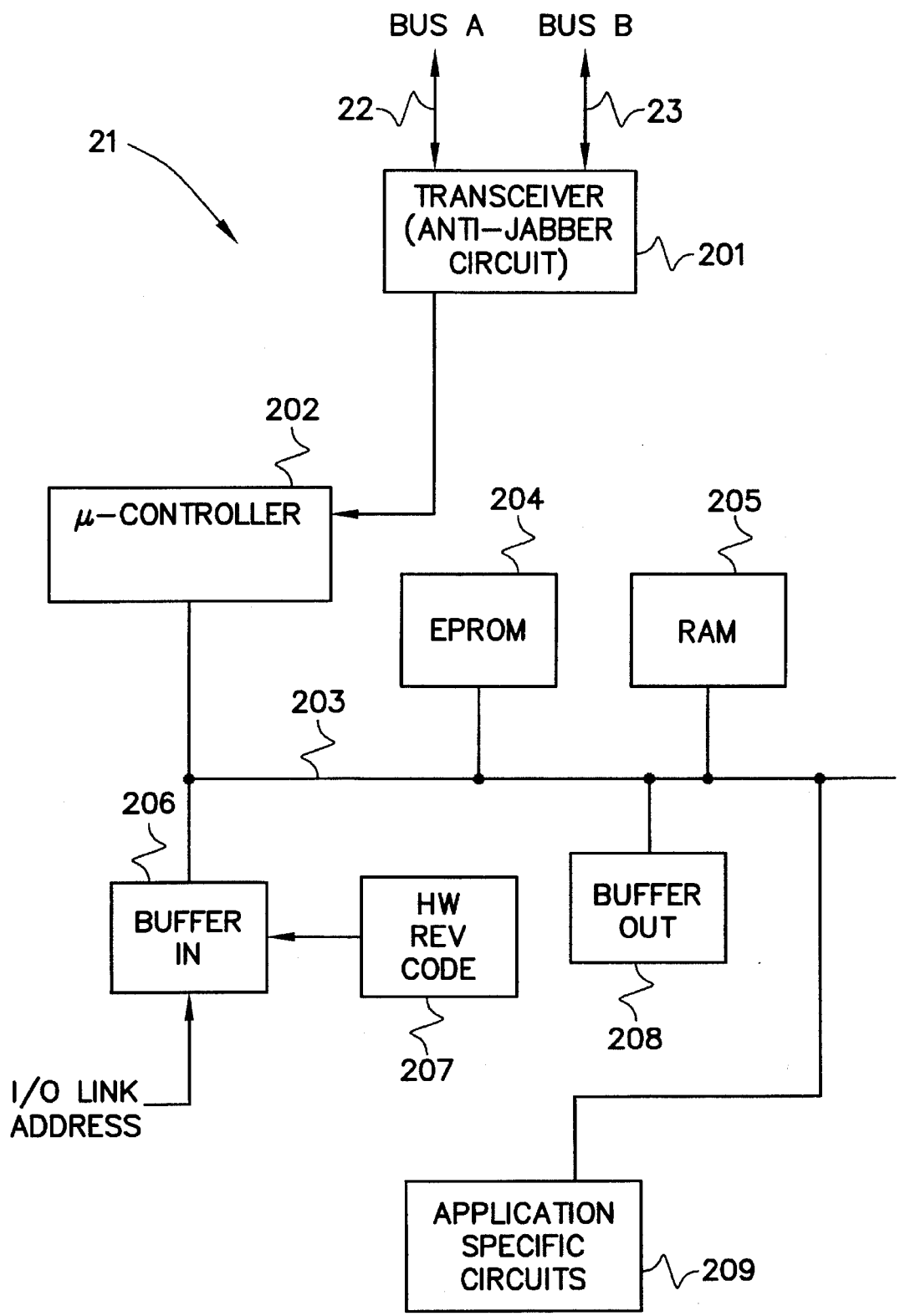
FIG. 4 shows a block diagram of the I/O module of the preferred embodiment of the present invention.

Referring to FIG. 4 there is shown a block diagram of the I/O module of the preferred embodiment. A transceiver (anti-jabber circuit) 201 interfaces with bus A22 and bus B23. The transceiver 201 interfaces with a microcontroller (u-controller) 202. In the preferred embodiment the microcontroller 202 is of the type, Intel 80C31. The microcontroller is coupled to a local bus 203, and includes an EPROM 204 and a RAM 205 also attached to the local bus 203. The RAM 205 also attached to the local bus 203. The RAM 205 also attached to the local bus 203. The RAM 205 contains the information which forms the database for the I/O module 21. The EPROM 204 contains the program information utilized by the microcontroller 202. (It will be recognized by those skilled in the art that the EPROM and RAM comprise a memory unit and any type memory unit which can interface with the microcontroller 202 may be utilized.) Also attached to local bus 203 is an input buffer which receives the I/O link address information from the I/O link (bus A, bus B, 22, 23). Connected to the input buffer (BUFFER IN) 206 is a hardware revision code unit 207 which identifies the hardware and revision of the I/O module 21 which can be read by the microcontroller 202 in order to verify the revision of the hardware. The output buffer (BUFFER OUT) 208 is also connected to the local bus 203. The application specific circuits 209 is also connected to the local bus 203 and interfaces with the input and output buffers 209 is also connected to the local bus 203 and interfaces with the input and output buffers 206, 208, and microcontroller 202 via the local bus 203. The application specific circuits vary from I/O module to I/O module depending on the field device to which the I/O module is to be coupled. If the field device is of a type which requires a digital input, then the application specific circuit 209 will include the logic in order to place the digital input into a predefined format which will interface with the remainder of the I/O module. Likewise, if the field device is such that requires an analog input, then the application specific circuit contains a logic which converts the analog input signal (via an A/D converter) into a format again consistent with predefined formats. In this manner, the I/O modules are referred to as a specific I/O module type. The microcontroller 202 performs the I/O processing (or preprocessing) for the application specific circuits 209. The preprocessing will vary from each I/O module 21 depending on the type (i.e., A/I, A/O, . . .) the preprocessing essentially consisting of translating the signals from the application specific circuits to a format compatible with the controller 30, 40 (and more specifically with control unit 90), and putting the signals from controller 30, 40 in a format compatible with the I/O module 21. Some of the preprocessing performed includes zero drift, linearization (linearizing thermocouples), hardware correction, compensation (gain compensation and zero compensation), reference junction compensation, calibration correction, conversions, checking for alarms (limits) . . . and generating a signal in a predetermined format having predetermined scale (i.e., engineering units, normalized units, percent of scale, . . .). In the preferred embodiment of I/O module 21, seven types of applications specific circuits are currently provided for, these include a high level analog input, low level analog input, analog output, digital input, digital output, smart transmitter interface, and pulse input counter.

Figure 5:
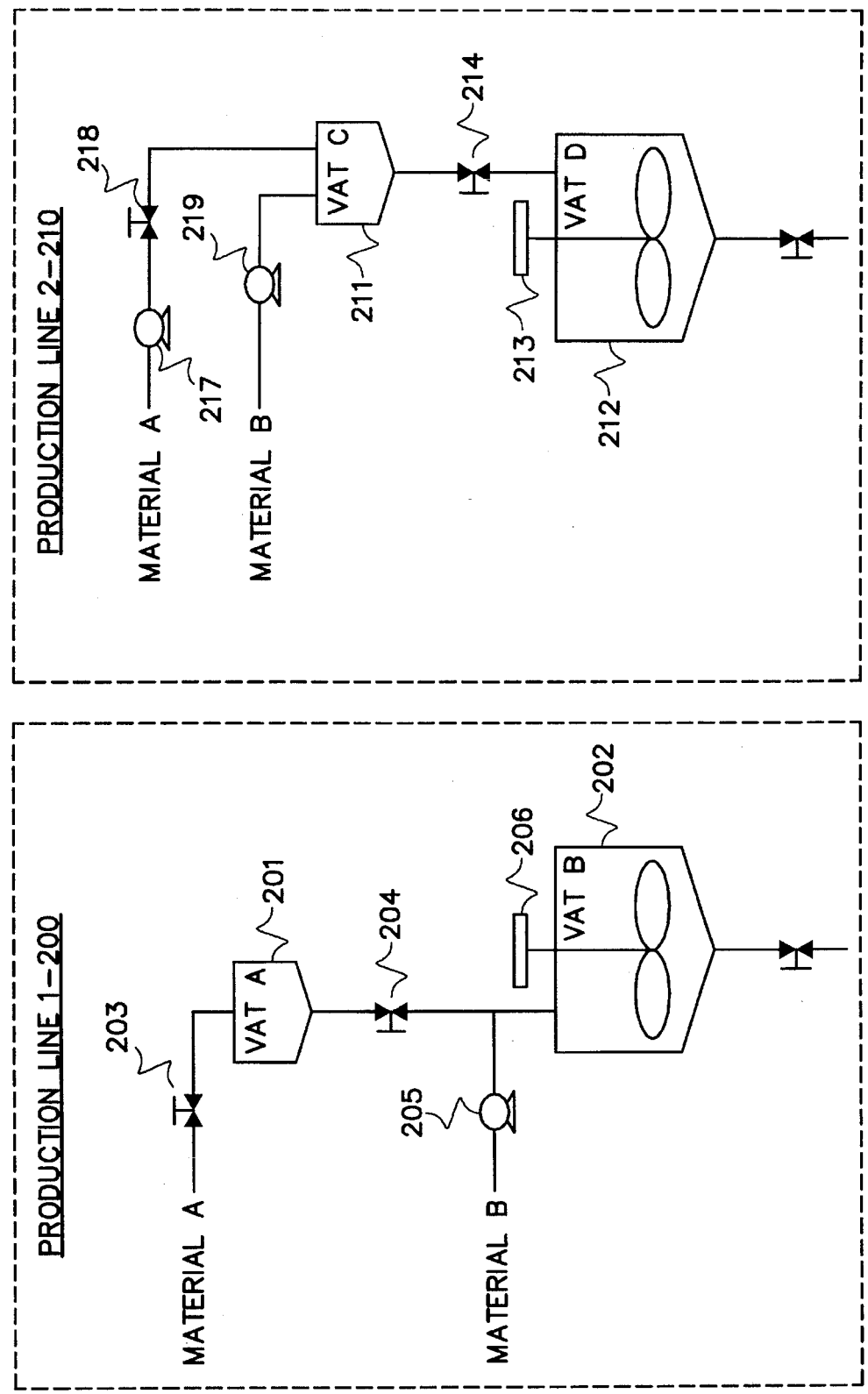
FIG. 5 shows a typical plurality of production lines.

The process control system 10 described above controls a plurality of production lines. Each production line has predetermined equipment and a predetermined interconnection between equipments. Referring to FIG. 5, there is shown a typical plurality of production lines each production line having predetermined equipment contained therein and a predetermined interconnection between equipments. For example purposes only, production line 1 200 includes vat A201 and a vat B202. Vat A201 has a valve 203 which permits raw material (MAT A) to flow into vat A201. Vat B202 receives the raw material from vat A201 when a valve 204 is opened and/or raw material (B, MAT B) when pump 205 is active. Vat B also contains an agitator 206. Again for example purposes only production line 2 210 includes a vat C211 and a vat D212. Vat D also includes an agitator 213. Material from vat C211 flows into vat B212 when valve 214 is opened. Vat C receives material A and material B when the corresponding pump 217 and corresponding vale 218 in the pipeline to vat C211 is on, and the corresponding pump 219 in the pipeline is on.

Thus each production line has its own predetermined equipment set and interconnection of the equipment. It is obvious to one skilled in the art that a plurality of production lines can each have various equipments and equipment configurations. The interconnection between the equipment is essentially fixed by the hardware (pipelines) but the flow between equipments is controllable by the valves, pumps, . . . included in the equipment configuration of the production line.

When a predetermined product is to be made by the production line(s) the production line is controlled in accordance with a "recipe". The recipe is generated as some time prior to production run. In the preferred embodiment the recipe is generated by the plant control network 11 based on the inputs from an operator at the universal station 122. The recipe is generated in accordance with the method of the present invention based on inputs/information which include the formula of the product (the formula being equipment independent), an operations data base, raw materials data base, and equipment data base for a predetermined production line, which will be described hereinunder. After the recipe is generated it is stored; in the preferred embodiment the recipe is stored in preestablished files of the history module 128. When the production run is commanded, the recipe is down loaded to a predetermined controller 30, 40 which then executes the control of the field devices of the production line connected thereto via the appropriate I/O modules 21, as described above.

Figure 6:
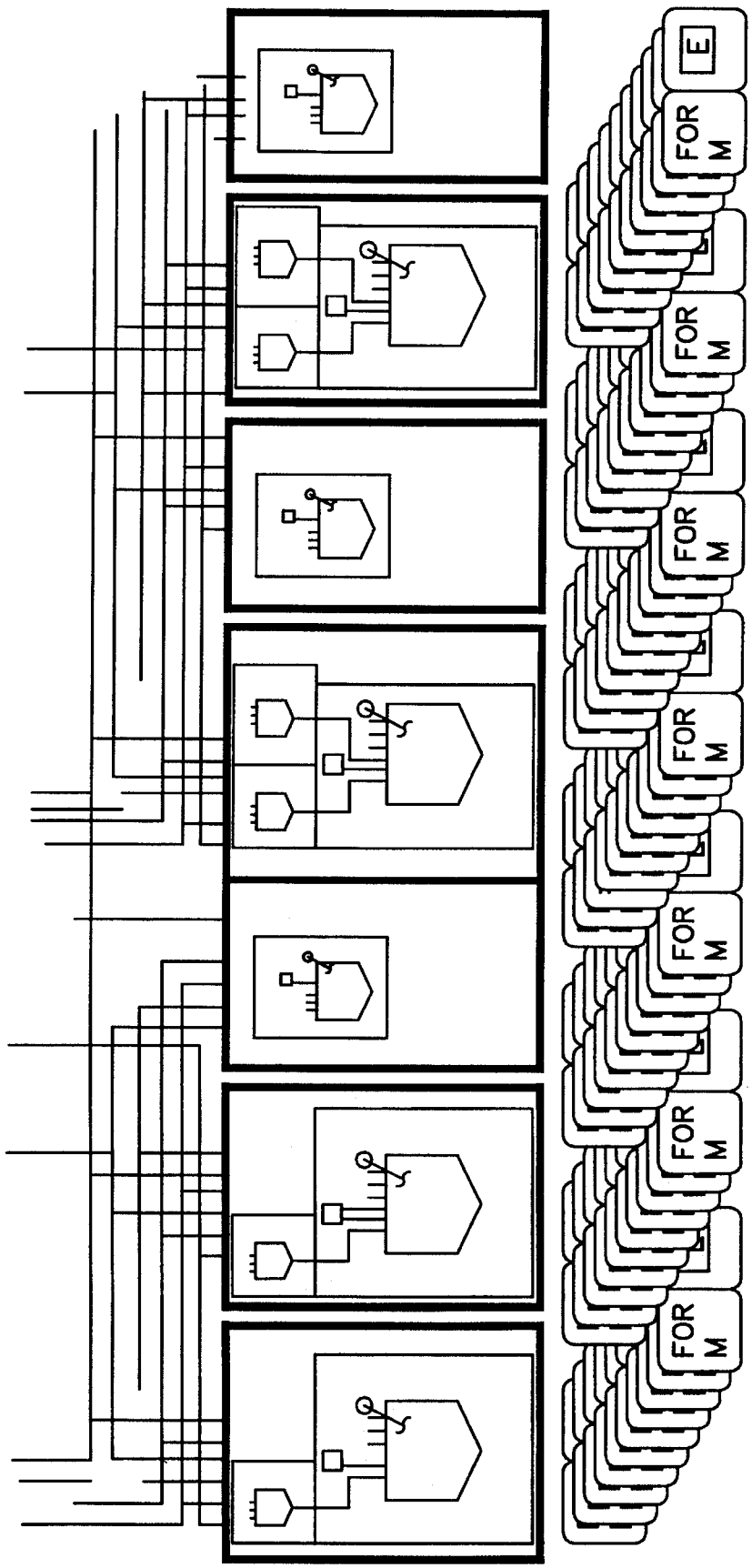
FIG. 6 shows a prior art production plant having seven production lines and prior to implementing the method of the present invention.
Figure 7:
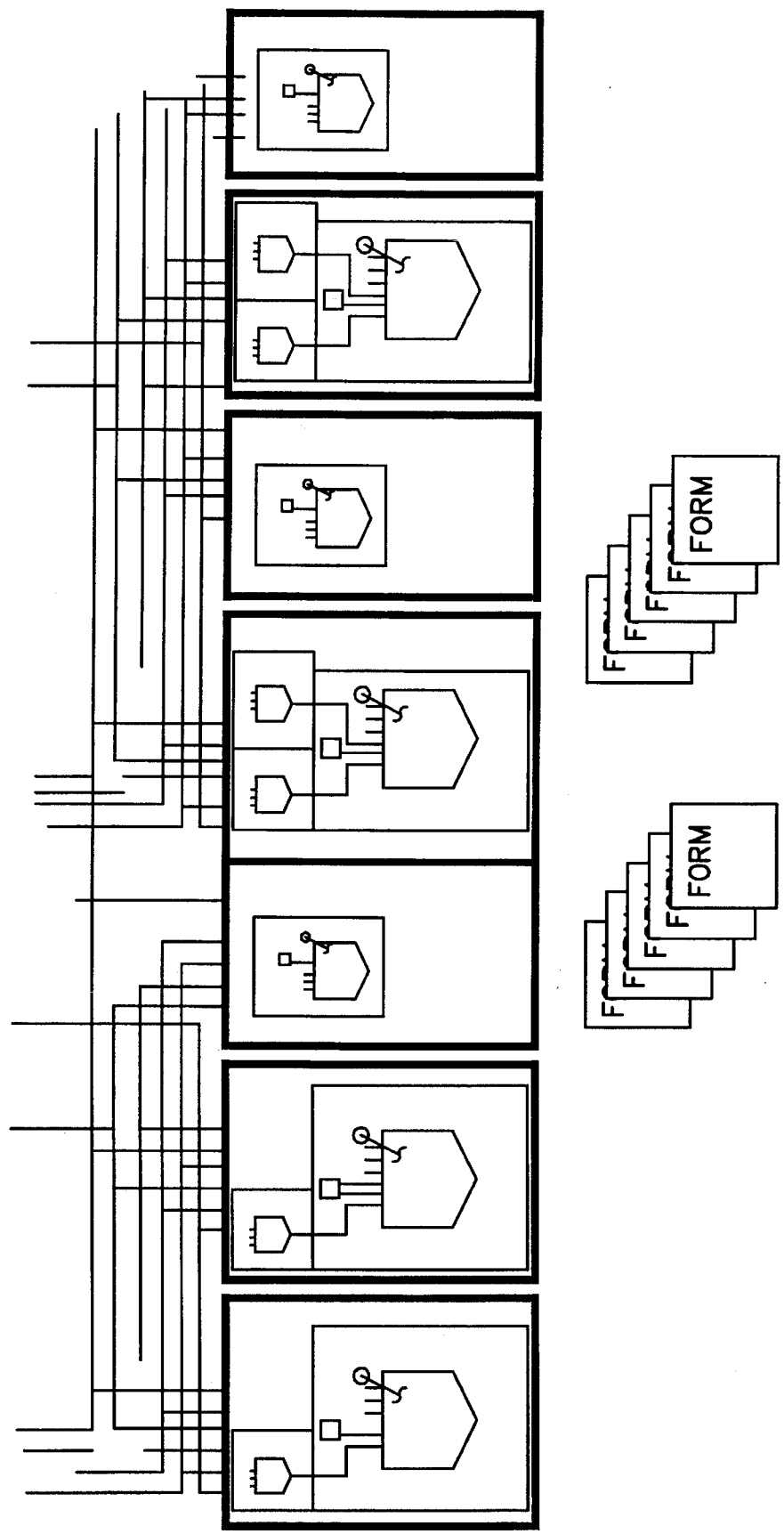
FIG. 7 shows the same production plant of FIG. 6 after implementing the method of the present invention.

A different recipe is required for each product of each production line. Referring to FIG. 6, there is shown a prior art production plant having seven production lines having the necessary formulas (which are equipment dependent) necessary for each product, and prior to implementing the method of the present invention. For example purposes only, assuming there are 10 formulas, and since each formula includes equipment data (E), there are 140 equipment-formula records to be stored, and thus 140 recipes. Any time a change to the formula is made, 140 equipment-formula records must be changed and also 140 recipes. Referring to FIG. 7, there is shown the same production plant as in FIG. 6 having seven production lines but now includes the method of the present invention. Assuming again for example purposes only there are 10 formula's, the formula management problem identified above is essentially eliminated since all that is stored in the present invention are the 10 formulas. At run time, that is just prior to a production run, the method of the present invention, the recipe builder, utilizes the equipment there for the production line selected and the formula which corresponds for the product to be generated, and generates the recipe. The recipe can be stored as described above, and then downloaded from the plant control network, or it will be recognized by one skilled in the art can be generated as a preliminary to the production run. Also after the recipe is generated the recipe may or may not be stored as desired by the plant supervisor, i.e., the operator. Thus it can be seen that the method of the present invention eliminates the formula management (and recipe management) problem identified with prior art systems.

Figure 8:
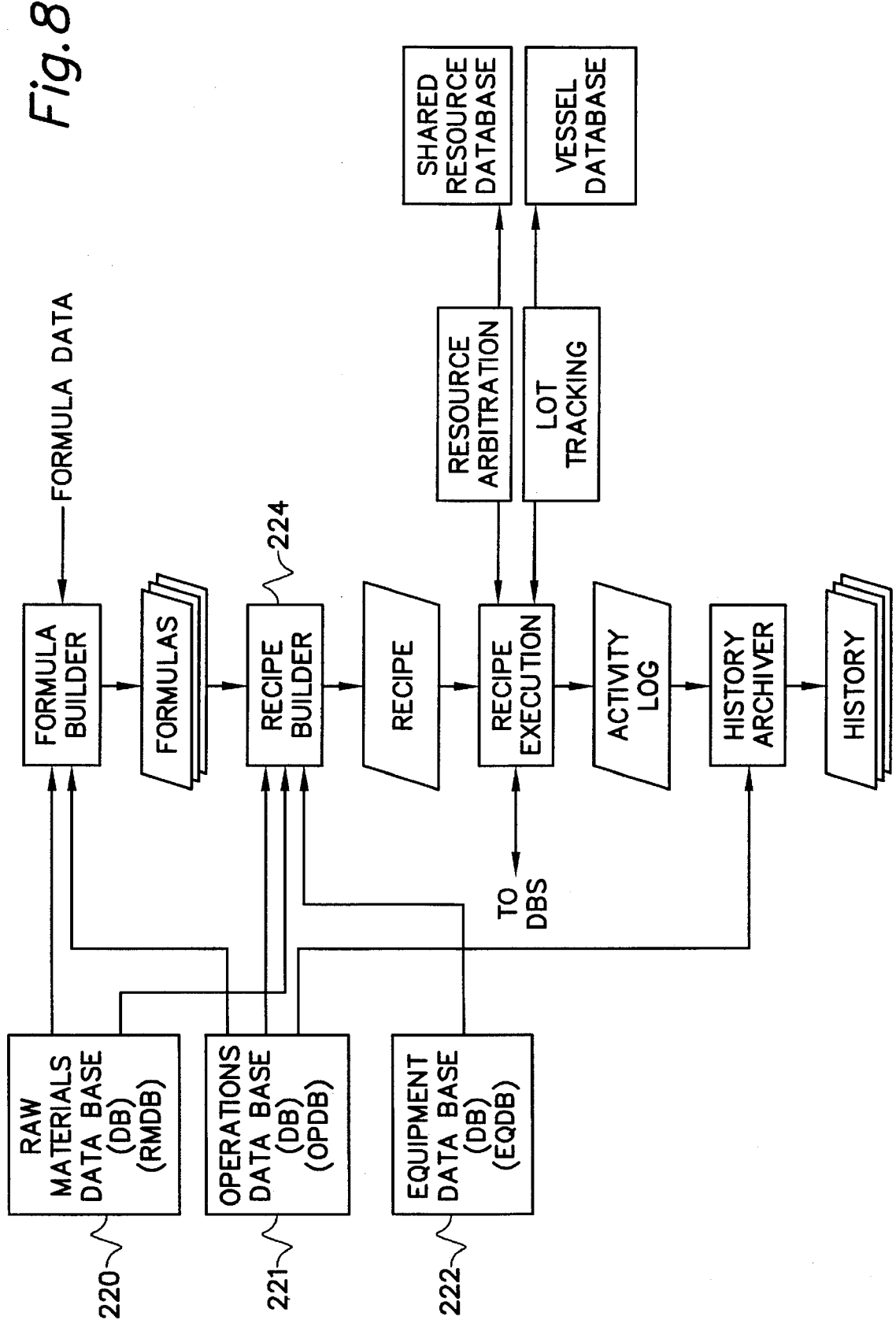
FIG. 8 shows an overview of the total system operation which includes the method of the present invention.

The present invention will now be described. Referring to FIG. 8, there is shown an overview of the total system operation which includes the method of the present invention; namely, the recipe builder. Stored in the process control system is included a raw material data base 220 (RMDB) an operations data base 221 (OPDB), and an equipment data base 222 (EQDB). The raw materials data base 220 includes global raw material data, that is raw material excisable by all the production lines within the plant, systems specific raw material data and advance control information which is system specific. The global raw material data includes the name of the raw material, an identifier code, a description, . . . The systems specific raw material data includes whether the raw material is available, source identifier, engineering units, conversion factors from batch units to feed units, . . . The systems specific advance control information includes minimum time for valve to open, average flow during feed, . . . The operations data base 221 includes operations pertaining to the formula and operations pertaining to the recipe. In both instances the operations are identified in the operations data base and includes such operations as agitation, recirculation, material feed, blend, . . . These are the operations which can be performed by the production lines within the physical plant. Includes information about each production line. The production line is a system which is the set of process equipment required to produce a product. Within the system is a subsystem which identifies the vessel(s) or process units within a system, and a gauge tank which is an addition system which delivers a raw material to a subsystem with a fill and dump type action. The system portion of the equipment data base include information such as in use/not in use, path for recipe build files, . . . , and the subsystem information includes the dump destination, dump raw material, maximum vessel capacity, . . . The gauge tank portion of the equipment data base includes maximum vessel weight, minimum capability, zero flow start, . . .

Formula data for a product is inputted to the process control system. The formula data (or formula card) is the product specification and procedures to make the product as produced in a laboratory by a product development group. At the plant, the formula (or formula data) must be adapted to the plant location, or site. The formula builder essentially translates the information of the formula data to a formula which is compatible with the process control system. The formula build operation is a manual operation which incorporates operations which can be performed at the plant, in the preferred embodiment the operator interacts with the process control system at the universal station 122 to generate the formula. Essentially the operator compares the data to the available equipment of the production line and examines the operation which is needed to performed in order to generate the product, and from this operation generates a formula. For example the formula data may indicate which raw materials are to be added to a vat (or vessel) where order is not important. The formula may indicate to mix predetermined quantities in percentages or materials A, B, C, and D. However, the operator (or plant engineer) has to determine an order which will accomplish the desired result. If for example a quantity of dry material is dumped into a vat before adding a liquid, the combination may not mix because the agitator may be unable to perform its agitating system of the combination i.e., the dry material. Therefore, being generated by the formula builder process generates a formula which is compatible with the production lines of the plant, but does not include equipment information in the formula.

The recipe builder 224 merges the formula data (operations list), systems specific raw materials data, and equipment data base data to generate a recipe. Recipes are the systems specific procedures required to make the product. The recipe builder builds one recipe against one system (or production line). The recipe can be saved in appropriate storage or can be executed by a process controller of the process control system as described above. The controller operates control sequences in accordance with the sequence of the recipe and performs any arbitration needed when a resource is shared. Lot tracking consists of passing the amount of a material that was fed to a vessel data base the vessel data base totalize the materials the materials and supplies a lot usage report to the activity log. The activity log is a sequence of events reporting function and captures step data before execution. Each activity log contains time stamps which indicate the time and operation was started and the time at which it was completed. Once the recipe execution is complete, the activity log is written into the history module (or history archives) 126.

Figure 9:
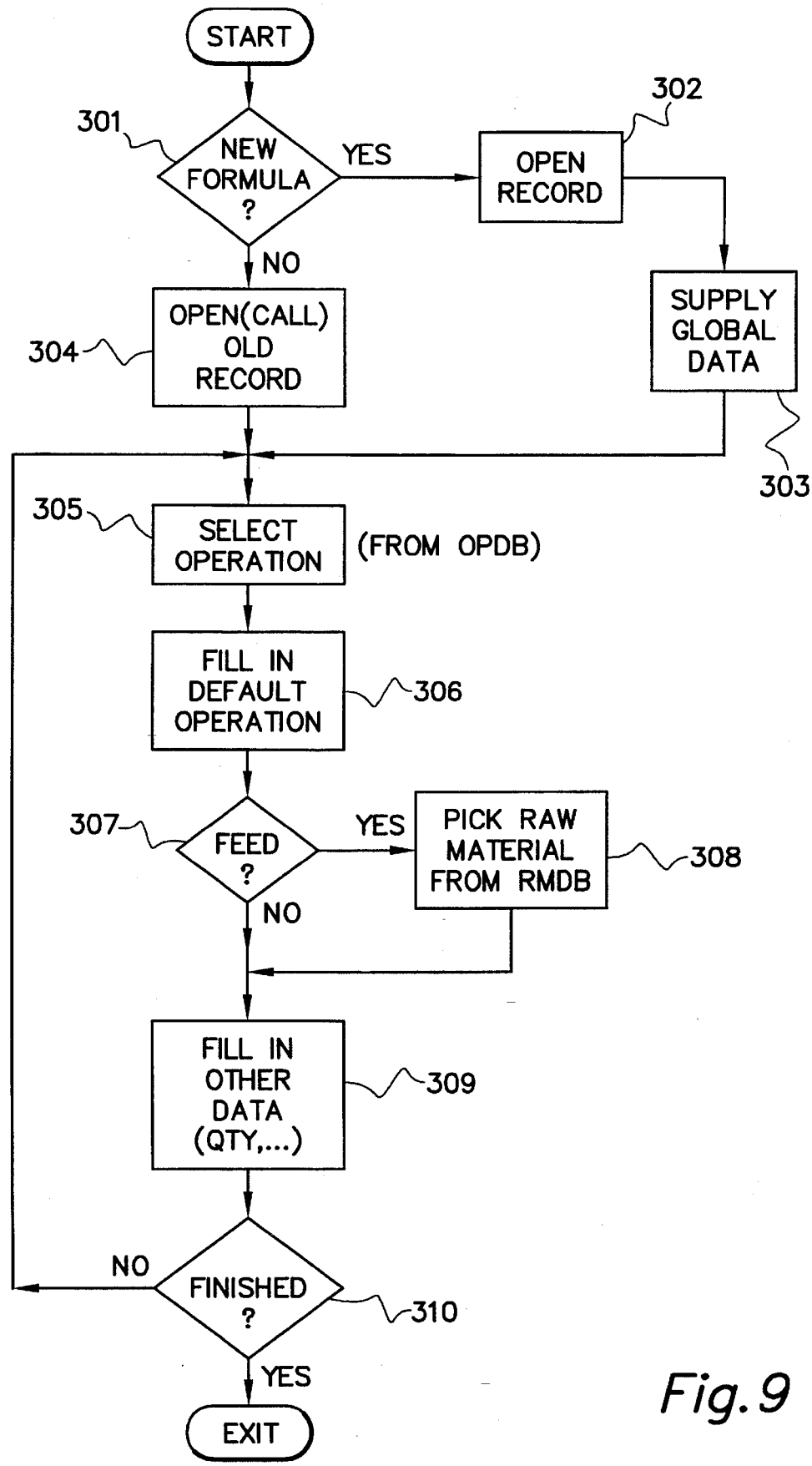
FIG. 9 shows a flow diagram of the formula build process of the preferred embodiment.

Referring to FIG. 9, there is shown a flow diagram of the formula build process of the preferred embodiment. The operator, from the US122 of the preferred embodiment makes the various entries from the keyboard and interacts with the process control system from the universal station US122. Once the formula buildup process is selected from a menu, the interaction process includes determining if a new formula is to be built (lock 301). If a new formula is to be built, a new record is opened and global data is supplied such as the formula ID, . . . (blocks 302, 303). If an old formula is to be reviewed or modified the old formula is called from its stored location (block 304). From the operation data base, the operator selects the desired operation (block 305), and default information is inserted into the record (block 306). If a feed operation was selected (block 307) the raw material required to be fed is selected from the raw materials data base (block 308). Other data is then inputted into the record (block 309), which includes quantity, in relative amounts, . . . If the formula build process is completed the process is exited (block 310) otherwise the formula build process continues back at the select operation (block 305). When the formula is completed, the formula will take on the appearance as shown in FIG. 10. Quantities are in percentages or relative amounts, and operations including the sequence of operations and the duration of the operation is also included. It will be obvious to one skilled in the art that the formula as shown in FIG. 10 is a sample english representation of information supplied in the record which is in a format compatible with the processing system of the process control system (i.e., the microprocessor or engine) and is compatible in an engine which can be utilized by the recipe builder operation included in the process control system 10. The method of the recipe builder of the preferred embodiment of the present invention will now be described. As described above the recipe builder merges the formula data (operation list), the systems specific raw material data (that is links the source of the raw material to the raw material identified in the formula) and the equipment data base data to generate the recipe, as previously mentioned above. The output of the recipe builder is a recipe which is a set of specific control procedures for the selected system (i.e., production line required to make the product of the formula).

Figure 11:
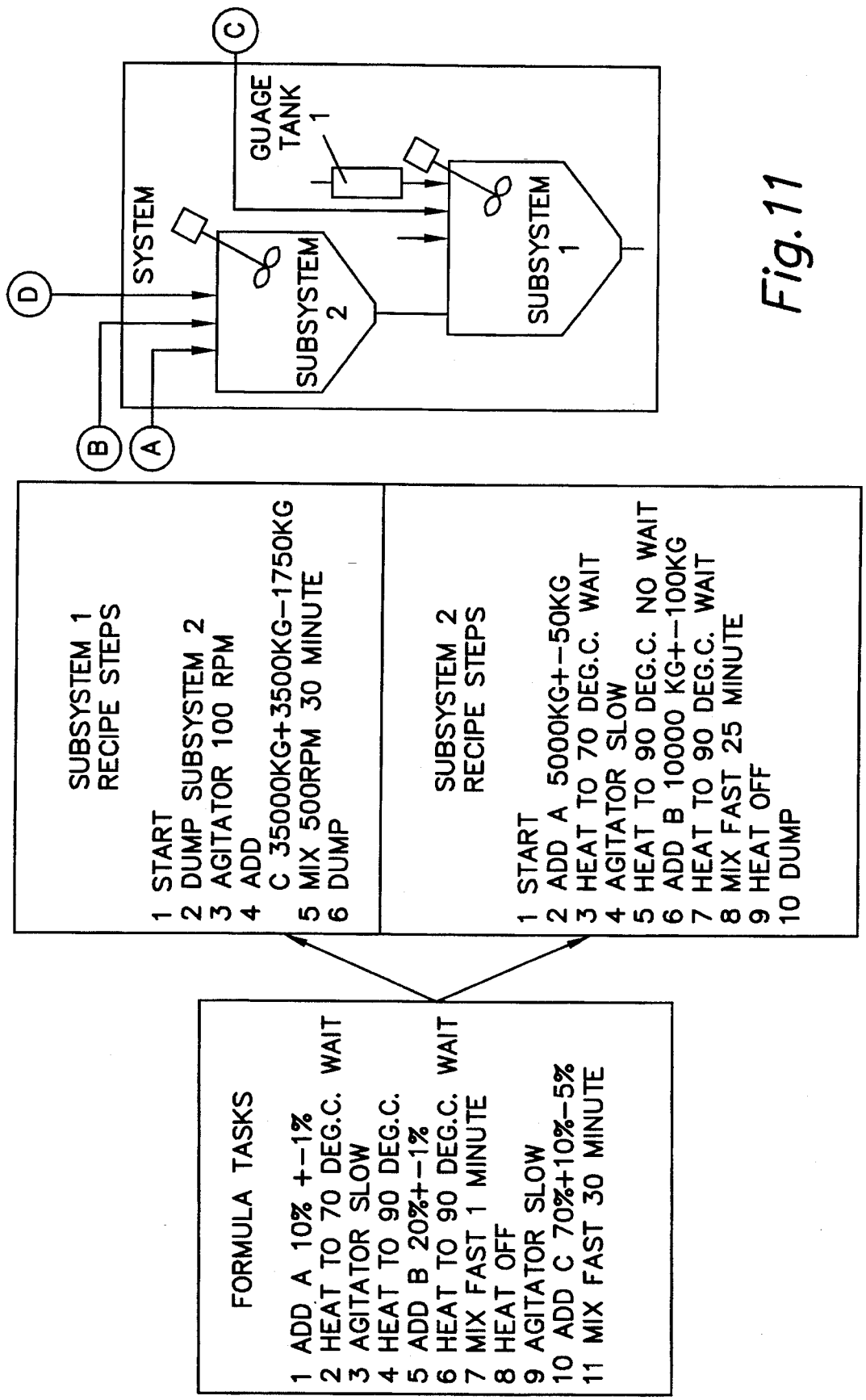
FIG. 11 shows a sample production line having a predetermined configuration and a resultant output of recipe builder (recipe) from a formula inputted to recipe builder.

Referring to FIG. 11, there is shown a sample system (production line) having a predetermined configuration. Also shown is an example of a recipe (output) of the recipe builder from a formula. It will be understood by those skilled in the art that if the equipment configuration of the production line is different from that of FIG. 11, the recipe is different and corresponds to the equipment configuration. If a production line does not have a connection to receive raw material A, then the production line cannot be used to produce the production of the formula.

Figure 12:
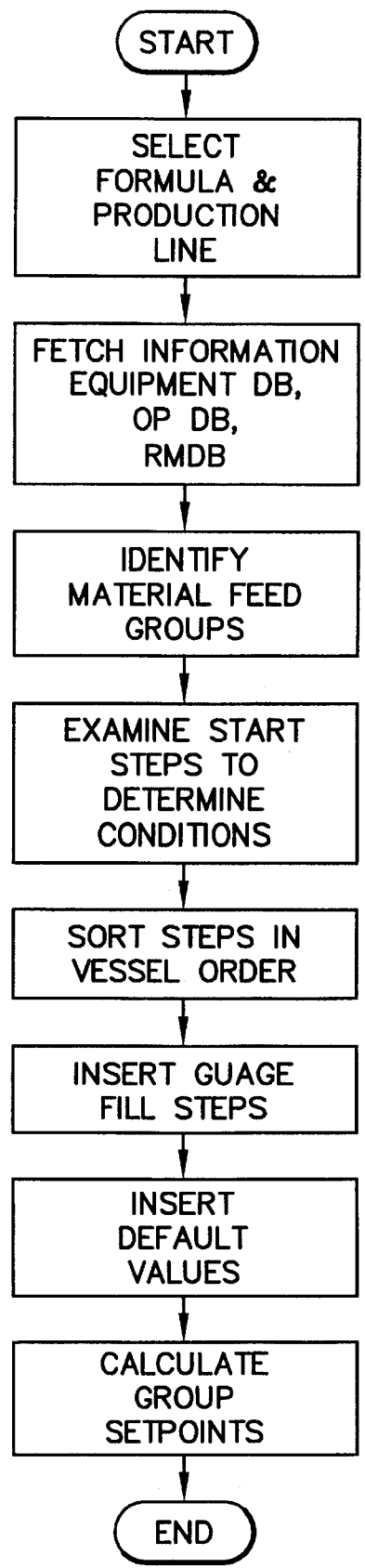
FIG. 12 shows an overview flow diagram of the process of the recipe builder.

Referring to FIG. 12, there is shown an overview flow diagram of the process of the recipe builder. The first step of the recipe builder is to select the product (or formula, the product specifying the formula), and to select the production line to be used to produce the product. Once this information is obtained all the necessary data is fetched into memory so it can be utilized by the processor performing the recipe build operation. In particular, the formula information is selected based on the formula picked, and the equipment data is fetched based on the production line selected above. This information is obtained from the various data bases being maintained by the process control system. All the information is incorporated into single temporary data structure which is used by the recipe builder. The second step, or second pass, i.e., pass 2, is responsible for identifying material feed groups within the batch and inserting START, READY TO DUMP, REQUEST TO DUMP, . . . steps (operations) into the recipe when necessary. Pass 2 employs logic which views the recipe as a sequential series of operations even though the final result of the recipe built is a set of recipes which can be executed in parallel. Pass 2 employs a concept called chaining. A chain is defined as a group of vessels a material must travel through in order to reach the primary substation. Pass 2 also employs a concept called the first common ancestor. To determine the first common ancestor between two vessels, the chains generated by each vessel are examined the first vessel that is common to both chains is the first common ancestor. The pass 2 logic views the recipe as a series of sequential operations. On this bases a logic always keeps track of the vessel which is currently active, and is so marked. When a task is encountered that is marked as being "group defining" or "group ending" within its typed definition, then the active vessel and current chain are reevaluated. When ever a step is examined in the recipe a check is performed to make sure that the vessel into which the step will be located as already been started if it has not, then a start step is added to the recipe to that vessel. Whenever a vessel is changed, it results in a change to the current chain the logic checks that every vessel in the chain is started. Dumps can be generated in the recipe build through one of three cases these are the group defining tasks, group ending tasks and force secondary group dump request. When a vessel dumps, its status is changed from "STARTED" to "NOT STARTED" this is because any further actions in that vessel will be part of another group and will require an insertion of another start step into the vessel recipe.

The pass 3 of the recipe builder examines each start step within the recipe to determine if the start step should be made conditional. For each START step that is made conditional, a corresponding INITIATE step must be added to the vessel to which containing the start step dumps. The pass 3 logic scans through the steps in the pass 2 results and perform two basic functions. First it maintains a flag to indicate whether the steps being examined are currently inside of an analysis task or not. Second, it examines each start step encountered, categorizes the start step into one of five categories. The five categories include start step of preliminary vessel, material residency restriction (no inside analysis task), material residency restriction (inside analysis task), no material residency restriction and not inside analysis task, and no material residency restriction (inside analysis task).

Pass 4 of the recipe builder sorts all the steps in the pass 3 results according to the vessel they are located in. Steps located in vessel 1 come first, and steps located in vessel 20 come last.

Pass 5 of the recipe builder inserts initiate gauge fill steps into the recipe. For each gauge tank feed present in the recipe, the corresponding gauge tank fill step must be inserted into the recipe somewhere prior to the gauge tank feed. Gauge tank fill steps are placed at the beginning of a vessel recipe (immediately after the start step) with the following exceptions:

A. Initiate step for any gauge tank with a material residency restriction is placed immediately before the corresponding gauge tank feed step, and B. The initiate step for any gauge tank feed that is within a group with a conditional start is placed immediately after the start step for the group in which the material is fed.

The logic for inserting the gauge tank fill step is now described the steps and the recipe are searched by the logic until a gauge tank feed step is located. If the gauge tank feed step is a material residency restriction, then the gauge tank fill step is inserted immediately prior to the gauge tank feed. If there is not material residency restriction, then the logic search is backwards through the steps in the recipe until either a conditional start up step or the first start step in the recipe is located. The initiate gauge tank fill step in inserted immediately after the start step. The remaining passes of the recipe build logic do not generate any more steps or change the order of any steps. The order of steps after pass 5 results in the order of the steps as they will appear in the finished individual vessel recipes.

In the subsequent passes, material feed steps retrieve the default value for the detailed enumeration code from there type definition point. Setpoint limits for all start steps are set to zero maximum vessel weight. The engineering unit setpoints, setpoints limits, and material tolerance are recalculated for all material feeds in the recipe. In the last step the recipe builder calculates group setpoints. These setpoints are written into the engineering units setpoints values of all START STEPS and all requested TO DUMP STEPS. A more detailed description of the operation of recipe builder of the preferred embodiment can be had by referring to Appendix A (pages A-0 through A-71), and in particular pages A-55 through A-59.

It will be obvious to one skilled in the art that the process described above directed to a chemical type process and that the above described process can also be adapted to mechanical type processes such that the operation data base includes mechanical type operations such as sanding, drilling, . . . , the raw material data base defines parts, stock, . . . , to be processed from a predetermined source, and the equipment data base includes laths, sanders, drillers, . . . Also, assembly type processes can be drilled via the above described process such that the source defined location of the part . . . , operation defines insert, bolt, solder, . . . , and raw material defines the part to be inserted, . . . Further, while a batch type process is described in the example of the preferred embodiment, it will be understood by one skilled in the art that the method described herein is equally adaptable to a continuous process such as DUMP steps are replaced by "material transfer" so that a device is defined to continually transfer material, . . .

While there has been shown what is considered to be the preferred embodiment of the present invention, it will be manifest that many changes and modifications can be made therein without departing from the essential spirit and scope of the invention. It is intended, therefore, annexed claims to cover all such changes and modifications which fall within the true scope of the invention.

APPENDIX—A 8.5 Recipe Build Example or

. . . How to get a formula to build the "Correct" recipe . . . While the concept of Flexible Formulation is to be able to create equipment independent formulas, it is important to realize that the order in which tasks are placed in a formula will affect the results of a recipe build. If the formulator has an understanding of the algorithms which are used by the recipe builder, he or she will be far more successful at creating formulas that build to the correct recipe structures. The following is an example recipe build which explains the algorithms applied in each pass of the recipe build. The operator can also study the intermediate results of the recipe build on one of his or her own recipes by using the recipe builder intermediate results schematic, INTERMIX), with the recipe builder placed into semi-automatic mode.

8.5.1 Example Recipe Build—Formula Data

The diagram below shows a sample recipe which we shall use in our recipe build example. Since not all the information for each task is required by the recipe builder algorithms, we show only the pertinent information:

| | | ORIGINAL FORMULA DATA | | | | | |
|---|---|---|---|---|---|---|---|
| TASK NO | TYPE | MATERIAL | RMS CODE | SP(FPS) | SP(EUs) | ENG UNITS | DETAIL | WAIT |
| 1 | AGITATOR | | | | 15.0 | RPM | START | WAIT |
| 2 | MAT FEED | TEST_A | A | 5.000 | 382.5 | KG | | |
| 3 | MAT FEED | TEST_B | B | 0.000 | 0.0 | KG | | |
| 5 | TEMPERT | | | | 100.0 | DGF | | |
| 5 | MAT FEED | TEST_C | C | 0.008 | 612.0 | GM | | |
| 6 | MAT FEED | TEST_E | E | 4.992 | 381.9 | KG | | |
| 7 | MAT FEED | TEST_F | F | 9.000 | 1514.7 | LBS | | |
| 8 | MAT FEED | TEST_G | G | 3.000 | 229.5 | KG | | |
| 9 | AGITATOR | TEST_H | H | | 45.0 | RPM | START | WAIT |
| 10 | MAT FEED | TEST_I | H | 2.000 | 153.0 | KG | | |
| 11 | AGITATOR | TEST_J | I | | 72.0 | RPM | START | WAIT |
| 12 | MAT FEED | IMT_I | I | 0.000 | 0.0 | LBS | | |
| 13 | MAT FEED | TEST_J | J | 6.000 | 459.0 | KG | | |
| 14 | MAT FEED | TEST_K | K | 10.000 | 765.0 | KG | | |
| 15 | MAT FEED | TEST_L | L | 20.000 | 1530.0 | KG | | |
| 16 | MAT FEED | TEST_M | M | 7.000 | 1178.1 | LBS | | |
| 17 | TEMPERT | TEST_N | N | | 200.0 | DGF | WAIT> | WAIT |
| 18 | MAT FEED | TEST_N | N | 23.000 | 1759.5 | KG | | |
| 19 | MAT FEED | TEST_O | O | 1.000 | 76.5 | KG | | |
| 20 | TEMPERT | TEST_P | P | | 180.0 | DGF | | |
| 21 | MAT FEED | TEST_P | P | 9.000 | 688.5 | KG | | |
| 22 | ANALYSIS | TEST_P | P | | | | | WAIT |
| 23 | MAT FEED | TEST_N | N | 0.000 | 0.0 | KG | | |
| 24 | MAT FEED | TEST_O | O | 0.000 | 0.0 | KG | | |
| 25 | MAT FEED | TEST_N | N | 0.000 | 0.0 | KG | | |
| 26 | MAT FEED | TEST_O | O | 0.000 | 0.0 | KG | | |
| 27 | MAT FEED | TEST_P | P | 0.000 | 0.0 | KG | | |
| 28 | ENDLINKD | TEST_P | P | | | | | WAIT |
| 29 | ANALYSIS | | | | | | | WAIT |
| 30 | MAT FEED | TEST_I | I | 0.000 | 0.0 | LBS | | |
| 31 | MAT FEED | TEST_J | J | 0.000 | 0.0 | KG | | |
| 32 | MAT FEED | TEST_K | K | 0.000 | 0.0 | KG | | |
| 33 | MAT FEED | TEST_L | L | 0.000 | 0.0 | KG | | |
| 34 | MAT FEED | TEST_M | M | 0.000 | 0.0 | LBS | | |
| 35 | ENDLINKD | | | | | | | WAIT |
| 36 | PUMPOUT | | | | | | | WAIT |

-continued

| | | ORIGINAL FORMULA DATA | | | | | |
|---|---|---|---|---|---|---|---|
| TASK | | | | | ENG | | |
| NO TYPE | MATERIAL | RMS CODE | SP(FPS) | SP(EUs) | UNITS | DETAIL | WAIT |
| 37 MAT FEED | TEST_Q | Q | 10.000 | 900.0 | KG | | |
| 38 MAT FEED | TEST_R | R | 5.000 | 450.0 | KG | | |

8.5.2 Example Recipe Build—Type Definition Point Configuration

The diagram below shows the configuration of the type definition point configuration of tasks located in the recipe build example formula. Since not all the information on the type definition point is used by the recipe builder algorithm, only the pertinent information is shown:

| | Type Definition Point Configuration | | | |
|---|---|---|---|---|
| Operation | Group Defining | Group Ending | Linked Task Start | Linked Task End |
| MAT FEED | YES | NO | NO | NO |
| AGITATOR | NO | NO | NO | NO |
| TEMPRTR | NO | NO | NO | NO |
| ANALYSIS | NO | YES | YES | NO |
| END LINKED | NO | YES | NO | YES |
| PUMPOUT | NO | YES | NO | NO |

8.5.3 Example Recipe Build—Equipment Configuration

Figure 13:
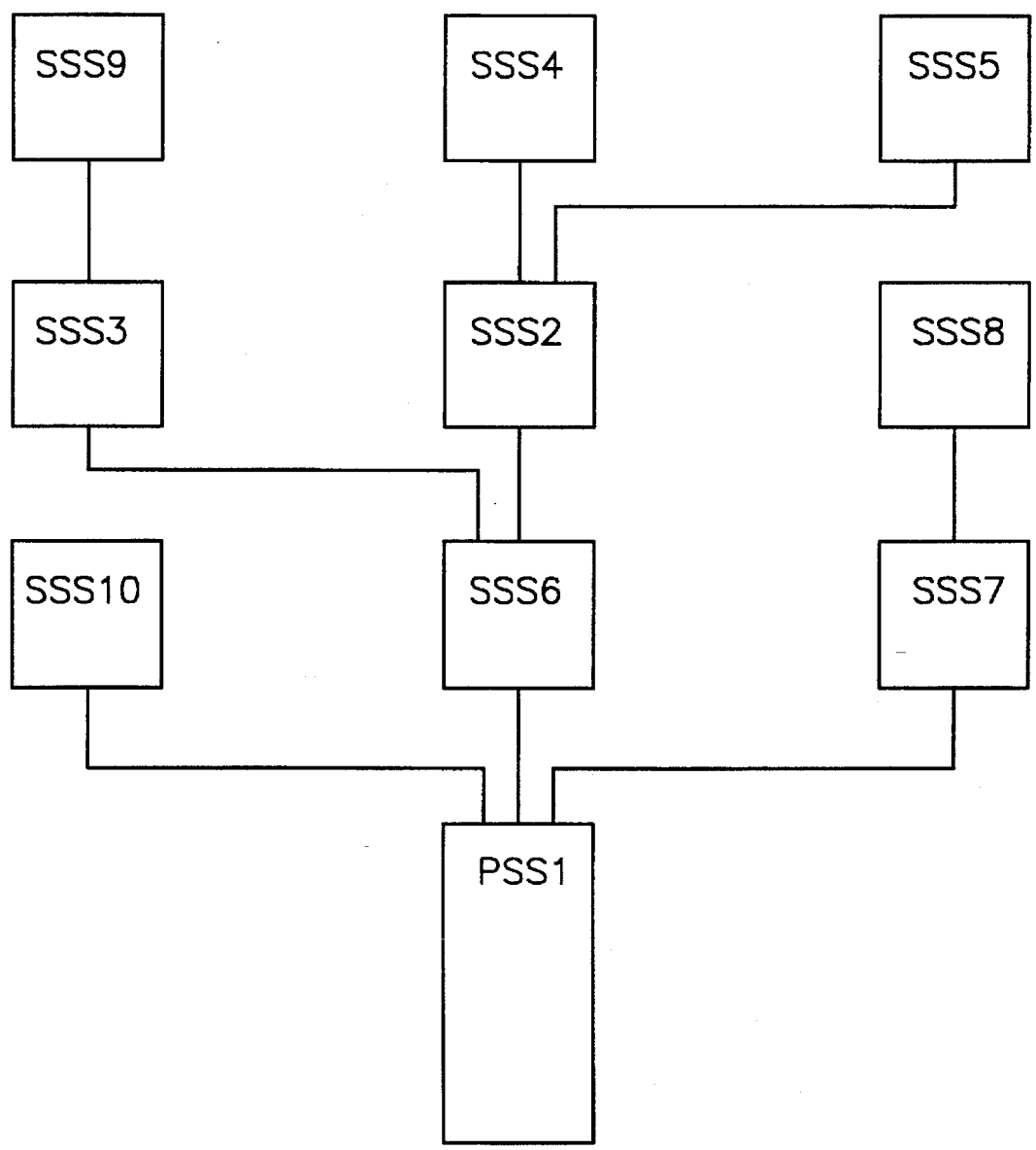
FIG. 13 shows a block diagram of an example recipe build system.

The system against which the example recipe will be built is a ten vessel system with vessel chaining up to four levels high. A diagram of the system is shown in FIG. 13.

8.5.4 Example Recipe Build—Raw Material

The relevant data held in the system specific area of the raw material database for the materials contained in the recipe build example formula is shown below. Since not all of the data in the system specific area of the raw material database is used during the process of a recipe build, only the pertinent information is shown:

| | System Specific Raw Material Database Information | | |
|---|---|---|---|
| NAME | VESSEL | FEED TYPE | MATERIAL RESIDENCY RESTRICTION |
| TEST_A | PSS1 | FLOW | NO |
| TEST_B | PSS1 | GAIN IN WT | NO |
| TEST_C | SSS2 | FLOW | NO |
| TEST_E | SSS4 | GAUGE TANK | YES |
| TEST_F | SSS4 | FLOW | NO |
| TEST_G | SSS5 | GAIN IN WT | NO |
| TEST_H | SSS2 | FLOW | NO |
| TEST_I | SSS3 | FLOW | NO |
| TEST_J | SSS9 | FLOW | NO |
| TEST_K | SSS9 | FLOW | YES |
| TEST_L | SSS9 | GAIN IN WT | NO |
| TEST_M | SSS6 | GAUGE TANK | NO |
| TEST_N | SSS8 | GAIN IN WT | NO |
| TEST_O | SSS8 | FLOW | NO |
| TEST_P | SSS7 | FLOW | NO |
| TEST_Q | SSS1 | GAUGE TANK | NO |
| TEST_R | SSS10 | FLOW | NO |

8.5.5 Example Recipe Build—Pass One

Pass one of the recipe build takes all the information required for the recipe build: formula dam, equipment data, raw material data, and type definition point data, and incorporates it into a single temporary data structure which the recipe builder can use The results of the recipe build after pass one are shown below. These results are identical to what the user could see on a real system by using the recipe build intermediate results schematic INTERMDO.

The fields in the intermediate results are:

STEP: The step column shows sequential numbering of the steps currently in the formula.

TASK: The task column is a pointer back to the original task number of the step in the formula. If a step is generated by a recipe then one of two things happens. If the new step needs to copy the data structure of one of the original formula tasks, then it is given a pointer to the task from which it should copy its data. If it does not need to copy data from any of the original tasks, then it is given a pointer value of −1.

FUNCTION: This is the name of the type definition point that defines the operation.

VSL: This is the vessel number into which the task will be located once the recipe build is complete.

FSG/GRP: In the pass one results, this field holds the value of the Force Secondary Group Dump request code associated with the formula. If the value is zero (invisible) then there is no request. If there is a value, then a positive value is a RMI to point to the vessel to which the group dump should occur. If the value is negative, then it is the negative of the vessel number to which the group should dump. After pass one, this field stores the group numbers for the vessels. For Example, a start step might be starting the third group in a preweigh.

GRP END/DEF: This field shows a one if a task is defined as being "group ending", and a two if a task is defined as "group defining".

LINKED CODE: This field holds a one if a task is defined to be the start of a group of linked tasks, and a two if a task is defined to be the end of a group of linked tasks.

RMI: Tills field shows the raw material index associated with a task. If the value is magenta (in parenthesis in this document), this indicates a material residency restriction on this raw material.

ASSOC SUBSYS: This field shows which subsystem will be acted upon by the task. For example, for a REQ DUMP step, the requested subsystem to dump would be shown here.

CONDL START: This column shows a one If the step is a start step and it is conditional.

PAIR ID: This column shows pair ID numbers. Two steps which have the same value in their PAIR ID are considered to be "paired". Examples of paired steps would be RDY_DUMP & REQ DUMP, INIT_2ND &

START<etc.

| | | | | Pass One Results | | | | | |
|---|---|---|---|---|---|---|---|---|---|
| STEP | TASK | FUNCTION | VSL | FSG/ GRP | GRP END/DEF | LINKED CODE | RMI | ASSOC SUBSYS | CONDL START | PAIR ID |
| 1 | 1 | AGITATOR | 1 | | | | | | | |
| 2 | 2 | FLOW | 1 | | 2 | | A | | | |
| 3 | 3 | GAIN IN WT | 1 | | 2 | | B | | | |
| 4 | 4 | TEMPERTR | 1 | | | | | | | |
| 5 | 5 | FLOW | 2 | | 2 | | C | | | |
| 6 | 6 | GAUGE TANK | 4 | | 2 | | (E) | | | |
| 7 | 7 | GLOW | 4 | | 2 | | F | | | |
| 8 | 8 | GAIN IN WT | 5 | | 2 | | G | | | |
| 9 | 9 | AGITATOR | 2 | | | | H | | | |
| 10 | 10 | FLOW | 2 | | 2 | | H | | | |
| 11 | 11 | AGITATOR | 3 | | | | I | | | |
| 12 | 12 | FLOW | 3 | | 2 | | I | | | |
| 13 | 13 | FLOW | 9 | | 2 | | J | | | |
| 14 | 14 | FLOW | 9 | | 2 | | (K) | | | |
| 15 | 15 | GAIN IN WT | 9 | | 2 | | L | | | |
| 16 | 16 | GAUGE TANK | 6 | | 2 | | M | | | |
| 17 | 17 | TEMPERTR | 8 | | | | N | | | |
| 18 | 18 | GAIN IN WT | 8 | | 2 | | N | | | |
| 19 | 19 | FLOW | 8 | | 2 | | O | | | |
| 20 | 20 | TEMPERTR | 7 | | | | P | | | |
| 21 | 21 | FLOW | 7 | | 2 | | P | | | |
| 22 | 22 | ANALYSIS | 7 | | 1 | 1 | P | | | |
| 23 | 23 | GAIN IN WT | 8 | | 2 | | N | | | |
| 24 | 24 | FLOW | 8 | 7 | 2 | | O | | | |
| 25 | 25 | GAIN IN WT | 8 | | 2 | | N | | | |
| 26 | 26 | FLOW | 8 | | 2 | | O | | | |
| 27 | 27 | FLOW | 7 | | 2 | | P | | | |
| 28 | 28 | END LINKED | 7 | | 1 | 2 | P | | | |
| 29 | 29 | ANALYSIS | 1 | | 1 | 1 | | | | |
| 30 | 30 | FLOW | 3 | | 2 | | I | | | |
| 31 | 31 | FLOW | 9 | | 2 | | J | | | |
| 32 | 32 | FLOW | 9 | | 2 | | (K) | | | |
| 33 | 33 | GAIN IN WT | 9 | | 2 | | L | | | |
| 34 | 34 | GAUGE TANK | 6 | | 2 | | M | | | |
| 35 | 35 | END LINKED | 1 | | 1 | 2 | | | | |
| 36 | 36 | PUMPOUT | 1 | | 1 | | | | | |
| 37 | 37 | GAUGE TANK | 1 | | 2 | | Q | | | |
| 38 | 38 | FLOW | 10 | | 2 | | R | | | |

8.5.6 Example Recipe Build—Pass Two

Pass two of the recipe builder is the first pass to insert steps into the data structure. Pass two is responsible for identifying material feed groups within the batch and inserting START, READY TO DUMP, REQUEST TO DUMP, DUMP, and START steps in the recipe where necessary. Pass two is interesting in that it employs an algorithm which views the recipe as a sequential series of operations even though the final results of a recipe build is a set of recipes which can execute in parallel.

Chaining

Pass two employs a concept called chaining. A chain is defined as the group of vessels a material must travel through in order to reach the primary subsystem For example, given our recipe build example system. If a material was to feed into vessel four, it would generate a chain of vessel as follows: 4-2-6-1. This means that vessel four must dump to vessel two which must dump to vessel six which must dump to vessel one in order for the material entering vessel four to reach the primary subsystem First Common Ancestor Pass two also employs a concept called the first common ancestor. To determine the first common ancestor between two vessels, it is necessary to examine the chains generated by each vessel. The first vessel that is common to both chains is the first common ancestor. For example, a material feed into vessel 4 generates a chain of 4-2-6-1. A material feed into vessel 9 generates a chain of 9-3-6-1. The first common ancestor between these two chains is vessel 6 since it is the first vessel that appears in both chains. Vessel one also appears in both chains, but since vessel 6 appears before vessel 1 in both chains it is the first common ancestor. Sometimes it is possible for a vessel to be its own first common ancestor. For example, the first common ancestor between chains 4-2-6-1 and 6-1 would be vessel six. In this case, the first common ancestor for the chains generated from vessel four and vessel six is vessel six itself.

Active Vessel/Chain

The pass 2 algorithm views the recipe as a series of sequential operations. On this basis, it always keeps track of what vessel is currently "active". This vessel is marked as the ACTIVE vessel. The chain generated from this vessel is marked as the ACTIVE CHAIN. Whenever a task is encountered that is marked as being "group defining" or "group ending" within its type definition point, then the active vessel and current chain are re-evaluated.

Determining when to Insert Start Steps

Whenever a step is examined in the recipe, a check is performed to make sure that the vessel into which the step will be located has already been started. If it has not, then a start step is added to the recipe for that vessel. Whenever the active vessel is changed, this results in a change to the current chain. The software checks that every vessel in the current chain is started. If any vessel in the chain is not started, then start steps for the vessels that require them are inserted into the recipe. Whenever a start step is inserted into the recipe for a vessel, the status of the vessel is changed from "NOT STARTED" to "STARTED".

Determining when to Dump

Dumps can be generated in the recipe build algorithm through one of three cases. These are group defining tasks, group ending tasks, and force secondary group dump requests.

Group Defining Task

Whenever a step is encountered whose type definition point is configured to define the step as a group defining task, the vessel into which the step is located is marked as the currently active vessel. The currently active chain is then set equal to the chain generated from the new active vessel. The first common ancestor between the old chain and the new chain is found, If the first common ancestor is lower on the old chain than the previous active vessel, then the previous active vessel must dump down to the old chain until it reaches the first common ancestor.

Group Ending Tasks

Whenever a step is encountered whose type definition point is configured to define the step as a group ending task, the following actions happen. If the current chain can trace its way down through the vessel into which the group ending task is to be located, then the currently active vessel must dump down its chain until it reaches the vessel into which the group ending task is located. The vessel in which the group ending task is located is then marked as the currently active vessel and the current chain set equal to the chain generated from that task. If the currently active chain does not pass through the vessel in which the group ending task is located, then no action is taken and the currently active vessel and chain are left unchanged.

Force Secondary Group Dump Requests

A force secondary group dump request, when present on a material feed step, can force a dump to occur when the recipe builder algorithm would not normally generate dumps. The force secondary group dump requests specifies a vessel to which the currently active vessel is to dump. For example, in our system, if the currently active vessel was vessel 4, and the force secondary group dump request specified vessel 6, then dump steps would have to be generated to have vessel 4 dump into vessel 2 and then vessel 2 would have to dump to vessel 6. The insertion of steps into the recipe based upon a force secondary group dump request occurs slightly different than the normal step insertion. Normally steps being inserted into a recipe are inserted BEFORE the step that is currently being examined. In the case of a force secondary group dump request, the steps are inserted AFTER the step in which the force secondary group damp request was located.

Effects of Dumping

Whenever a vessel dumps, its status is changed from "STARTED" to "NOT STARTED". This is because any further actions in that vessel will be part of another group and will require the insertion of another start step into the vessel recipe.

PASS TWO ALGORITHM EXAMPLE IMPLEMENTATION

Figure 14:
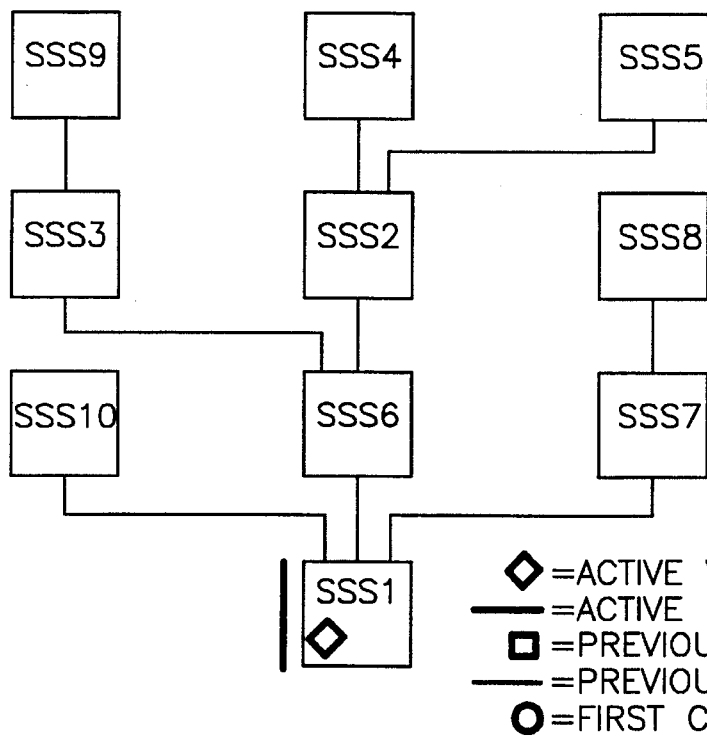
FIG. 14 shows a block diagram of initialization.

Initialization:

Now that we have defined the concepts of chaining and first common ancestors, we can attempt to describe the algorithm used by the pass two program to determine group boundaries by using our example recipe build. We begin by marking all the vessels in the system as being "NOT STARTED". We initialize the currently active vessel as being vessel one, the primary vessel. We initialize the current chain as the chain generated from the current vessel. Since the current vessel is the primary, the chain is simply 1. This is shown in FIG. 14.

Analysis of Step 1

Agitator Task
Group Defining: NO
Group Ending: NO

Figure 15:
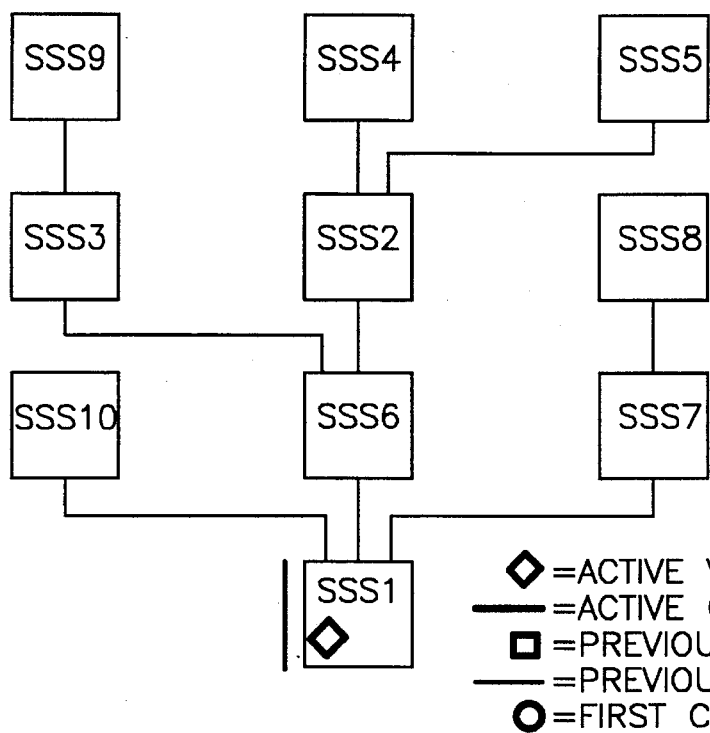
FIG. 15 shows a block diagram of an agitator task.

Now we examine the first step in the recipe. It is an agitator task located in the primary vessel. The primary has a status of "NOT STARTED", so we insert a start step located in vessel I into the formula prior to the agitator task and mark the primary vessel as being "STARTED". Now we check to see if we have to change our currently active vessel. The type definition point for the agitator task marked it as being neither group ending or group defining, so no change to the currently active vessel/chain is necessary. This is shown in FIG. 15.

Analysis of Step 2

Flow Feed
Group Defining: YES
Group Ending: NO

Figure 16:
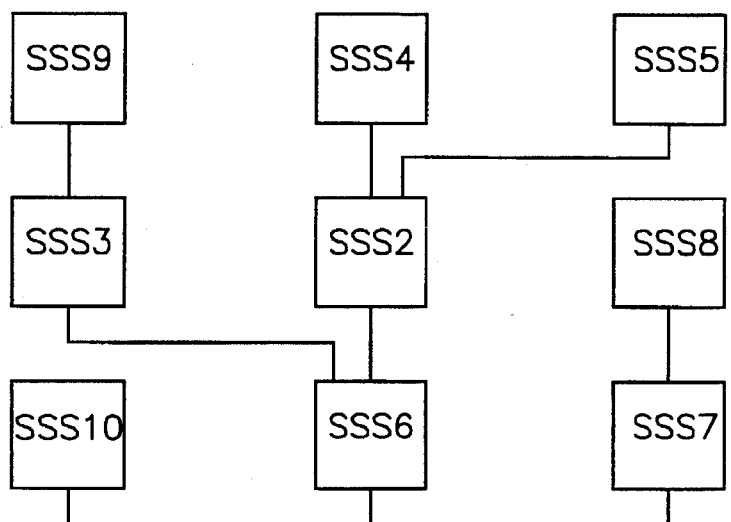
FIG. 16 shows a block diagram of flow feed.

The second task in the pass 1 results is a flow feed. It is located in vessel one. Since the vessel one has already been started, it is not necessary to insert any start steps into the recipe. The material feed task is marked as being group defining. The active vessel is set equal to vessel one and the current chain is set to 1. The first common ancestor between the old chain and the new chain is vessel one. Since the first common ancestor is the same as the previous active vessel, no dumps are required. This is shown in FIG. 16.

Analysis of Step 3

GIW Feed
Group Defining: YES
Group Ending: NO

Figure 17:
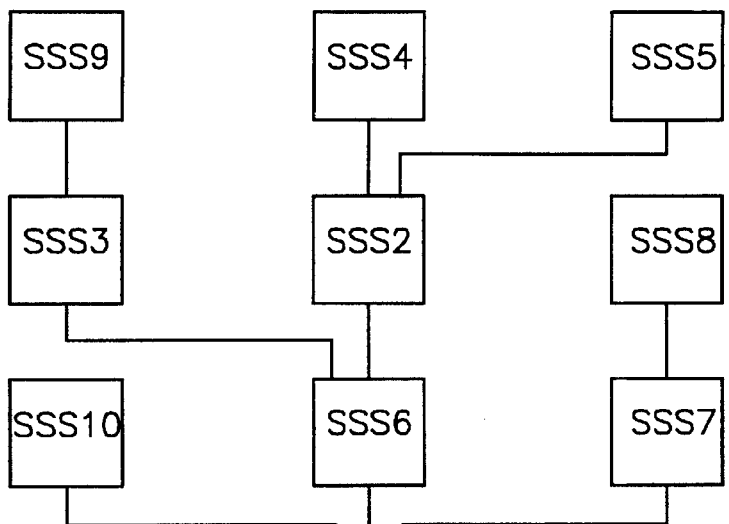
FIG. 17 shows a block diagram of GIW Feed.

The second task in the pass 1 results is a gain in weight feed. It is located in vessel one. Since vessel one has already been started, it is not necessary to insert any start steps into the recipe. The material feed task is marked as being group defining. The active vessel is set equal to vessel one and the current chain is set to 1. The first common ancestor between the old chain and the new chain is vessel one. Since the first common ancestor is the same as the previous active vessel, no dumps are required. This is shown in FIG. 17.

Analysis of Step 4

Temperature
Group Defining: NO
Group Ending: NO

Figure 18:
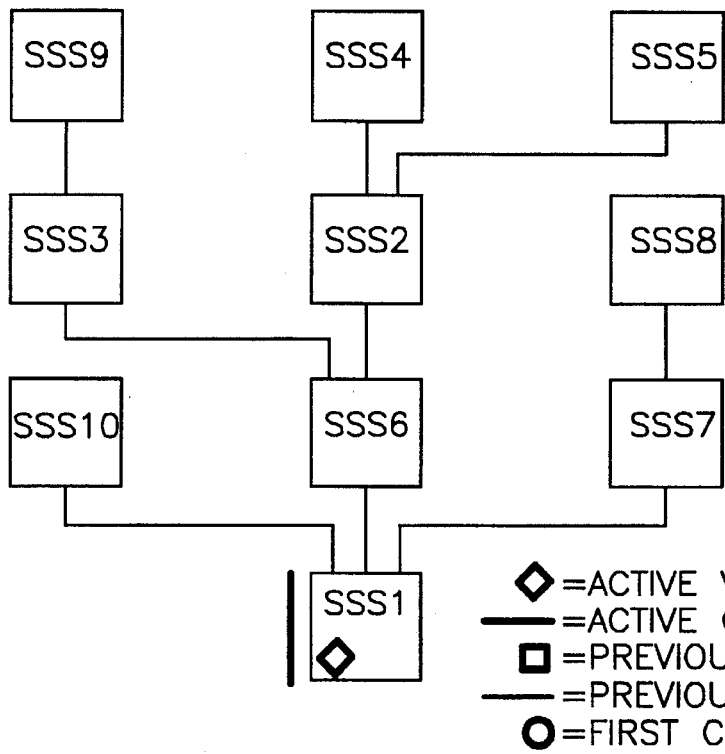
FIG. 18 shows a block diagram of temperature.

The fourth task in the pass 1 results is a temperature task located in the primary subsystem. The primary subsystem has already been started, so it is not necessary to insert a start step into the recipe. Since the temperature task is neither group defining nor group ending, no changes to the active vessel/chain is necessary. This is shown in FIG. 18.

Analysis of Step 5

Flow Feed
Group Defining: YES
Group Ending: NO

Figure 19:
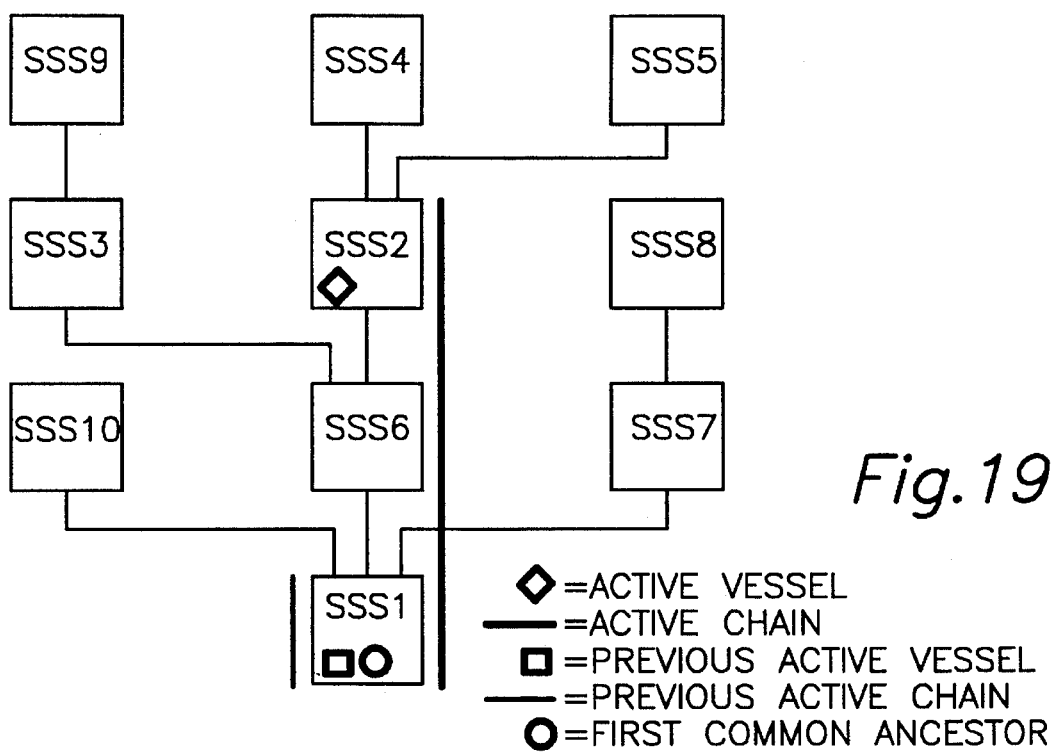
FIG. 19 shows a block diagram of flow feed.

The fifth task in the pass 1 results is a flow feed into vessel two. Vessel two has a status of "NOT STARTED", so it is necessary to insert a START step for vessel two into the recipe and change the vessel status to STARTED. The flow feed is a group defining task, so the currently active vessel is reassigned as vessel 2, and the active chain is reassigned as 2-6-1. Since vessel 6 in the current chain has a status of "NOT STARTED", it is necessary to insert a start step into the recipe for vessel 6 and change the status of vessel 6 to "STARTED". The first common ancestor between the old chain (1) and the new chain (2-6-1) is vessel one. Since the first common ancestor is the same as the previous active vessel, no dump steps are necessary to get material from the previous active vessel to the first common ancestor. This is shown in FIG. 19.

Analysis of Step 6

Gauge Tank Feed
Group Defining: YES
Group Ending: NO

Figure 20:
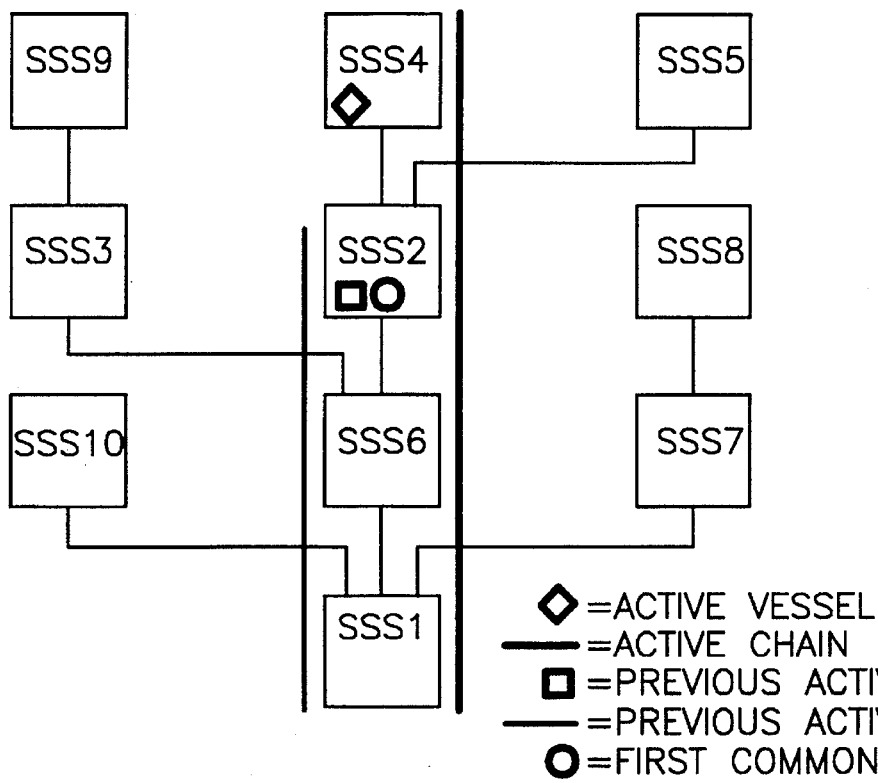
FIG. 20 shows a block diagram of gauge tank feed.

The sixth task in the pass I results is a gauge tank feed into vessel 4. Vessel 4 has a status of "NOT STARTED", so it is necessary to insert a start step for vessel four into the recipe prior to the gauge tank feed and change the vessel status to "STARTED". The gauge tank feed is a group defining task, so the active vessel is updated to four and the active chain is updated to 4-2-6-1. All vessels in the new active chain are started, so it is not necessary to insert any other start steps at this point. The first common ancestor between the old chain (2-6-1) and the new chain (4-2-6-1) is vessel 2. Since the previous active vessel is the same as the first common ancestor, no dump steps are necessary to get material from the previous active vessel to the first common ancestor. This is shown in FIG. 20.

Analysis of Step 7

Flow Feed
Group Defining: YES
Group Ending: NO

Figure 21:
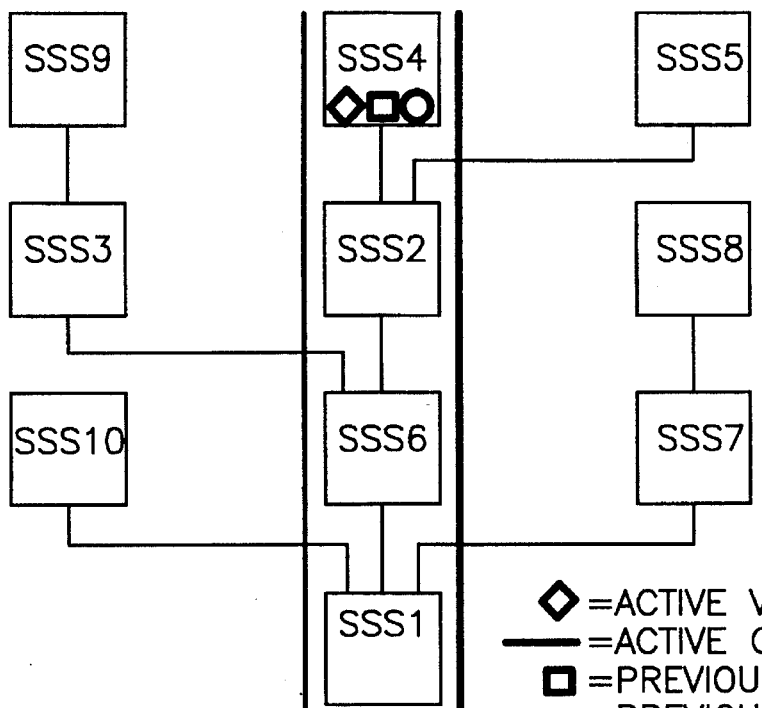
FIG. 21 shows a block diagram of flow feed.

The seventh task in the pass 1 results is a flow feed into vessel four. Vessel four has already been started, so it is not necessary to insert a start step into the recipe for vessel four. The flow feed task is group defining, so the active vessel is reset to 4 and the active chain is reset to 4-2-6-1. Every vessel in the new active chain is started, so it is not necessary to insert any additional start steps into the recipe. The first common ancestor between the old chain and the new chain is vessel 4. Since the first common ancestor is the same as the previous active vessel, no dump steps are necessary. This is shown in FIG. 21.

Analysis of Step 8

GIW Feed
Group Defining: YES
Group Ending: NO

Figure 22:
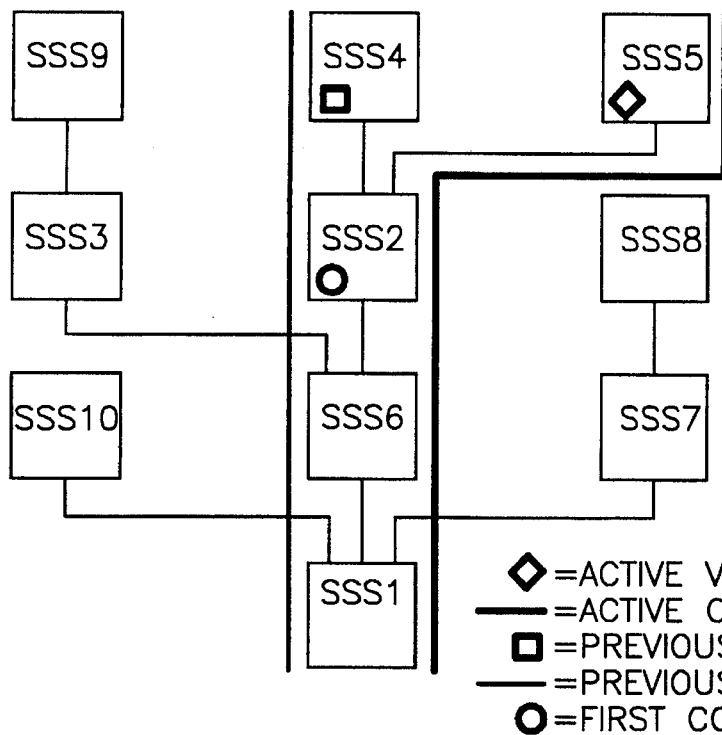
FIG. 22 shows a block diagram of GIW Feed.

The eighth task in the pass 1 results is a gain in weight feed into vessel 5. The status of vessel 5 is "NOT STARTED" so we insert a start step for vessel five into the recipe prior to the gain in weight feed and mark vessel five as being "STARTED". The feed step in vessel five is a group determining task, so we change our currently active vessel to five and our active chain to 5-2-6-1. All the vessels in the new chain are already started. so it is not necessary to insert any more start steps at this point. The first common vessel between the old chain (4-2-6-1) and the new chain (5-2-6-1) is vessel two, so the material in previous active vessel (4) must dump from vessel 4 to vessel 2. To achieve this end, READY TO DUMP and DUMP steps are inserted into vessel 4 and a REQUEST TO DUMP step is placed into vessel 2. Vessel four is then changed to a status of "NOT STARTED" since it has dumped and is no longer part of the current chain. This is shown in FIG. 22.

Analysis of Step 9

Agitator
Group Defining: NO
Group Ending: NO

Figure 23:
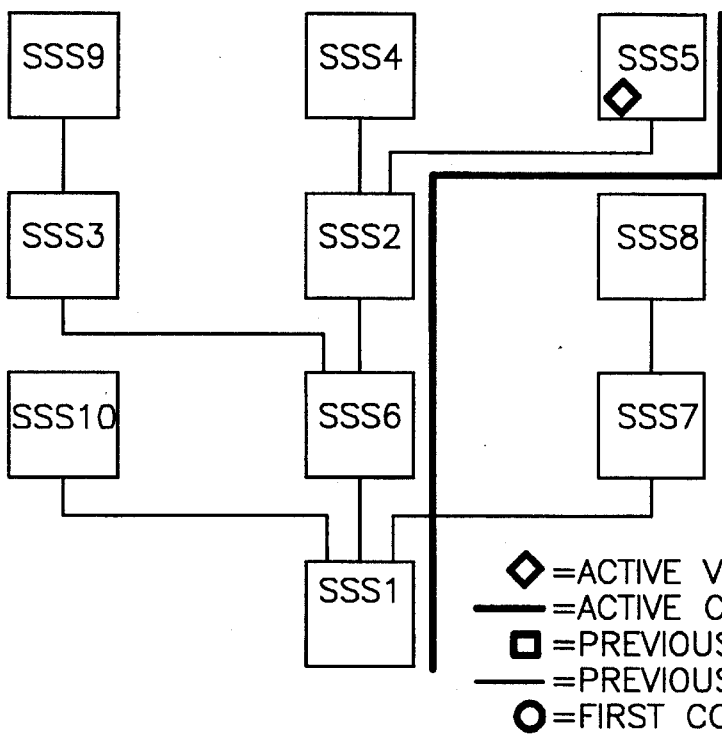
FIG. 23 shows block diagram of agitator.

The ninth task in the pass 1 results is an agitator task located in vessel two. Since vessel two is already started and the agitator task is neither group defining or group ending, no action is necessary. The currently active vessel remains 5 and the current path 5-2-6-1. This is shown in FIG. 23.

Analysis of Step 10

Flow Feed
Group Defining: YES
Group Ending: NO

Figure 24:
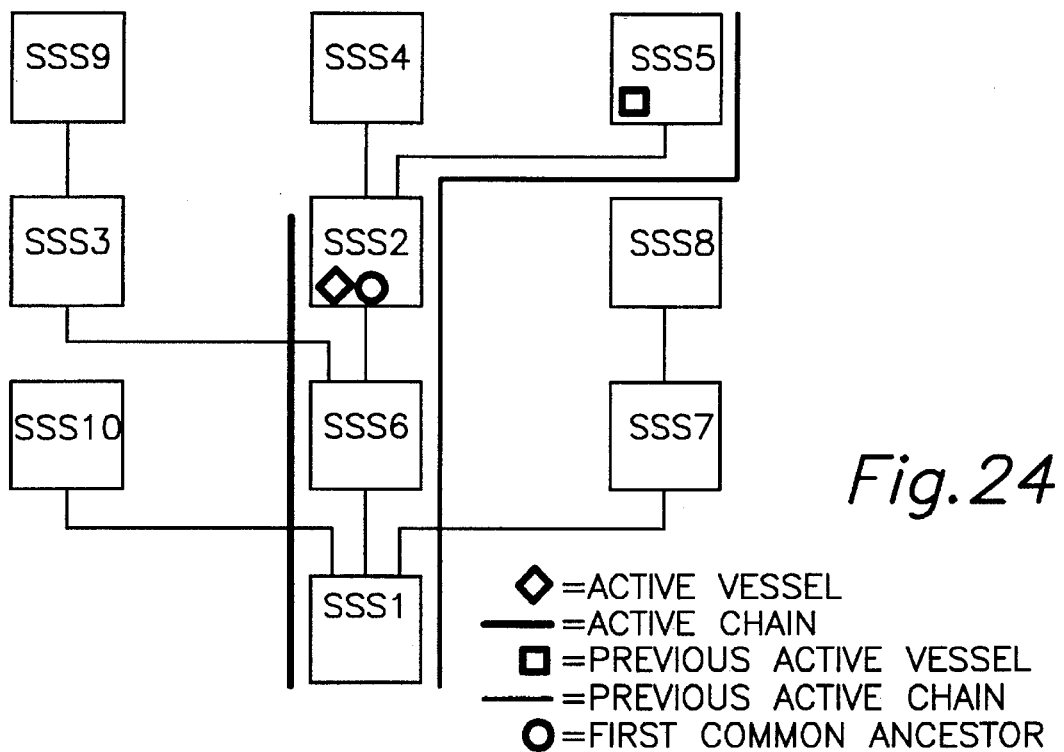
FIG. 24 shows a block diagram of flow feed.

The tenth task is a flow feed into vessel 2. Vessel two is already started, so it is not necessary to add a start step to the recipe. The flow feed type definition point is group defining, so the active vessel is changed to 2 and the active chain reset to 2-6-1. The first common vessel between the old chain (5-2-6-1) and the new chain (2-6-1) is vessel 2, so the previous active vessel (5) must dump down to the vessel 2. To achieve this, READY TO DUMP and DUMP steps are inserted into the recipe for vessel 5 and a REQUEST TO DUMP is inserted into the recipe for vessel 2. Vessel 5 is then changed to a status of "NOT STARTED" since it has dumped and is no longer part of the current chain. This is shown in FIG. 24.

Analysis of Step 11

Agitator
Group Defining: NO
Group Ending: NO

Figure 25:
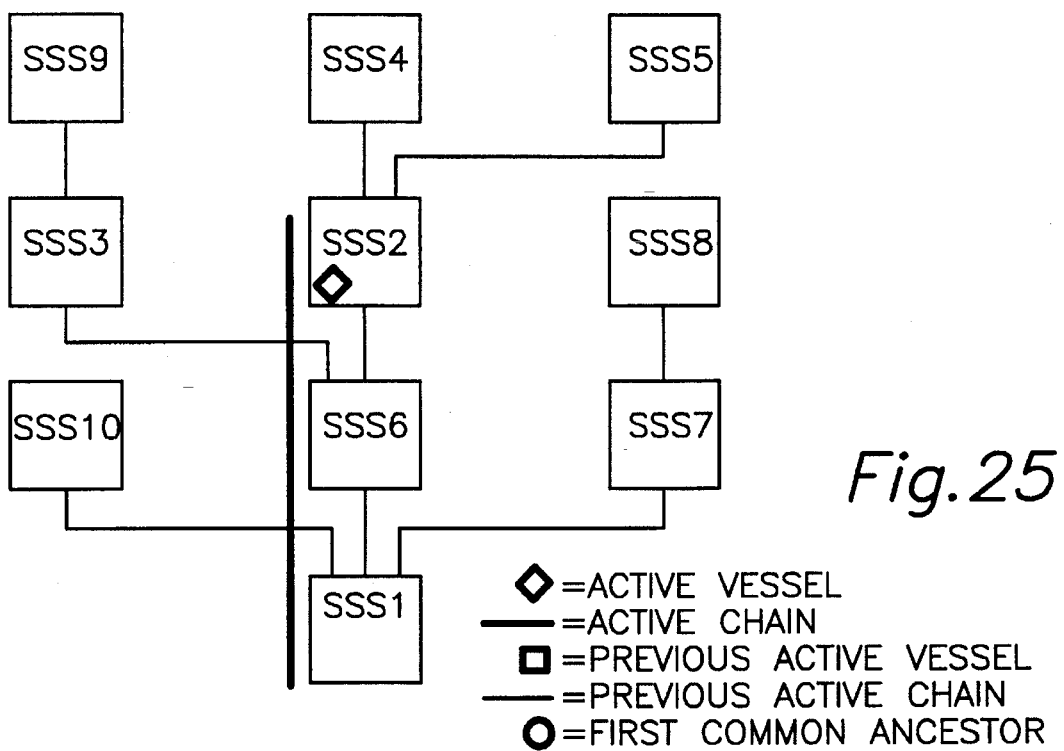
FIG. 25 shows a block diagram of agitator.

The eleventh task is an agitator task located in vessel three. Since vessel three has not yet been started, it is necessary to insert a START step into the recipe for vessel three and the status of vessel three is changed to "STARTED". Since the agitator task is neither group defining nor group ending, no change in currently active vessel/ path is necessary. This is shown in FIG. 25.

Analysis of Step 12

Flow Feed
Group Defining: YES
Group Ending: NO

Figure 26:
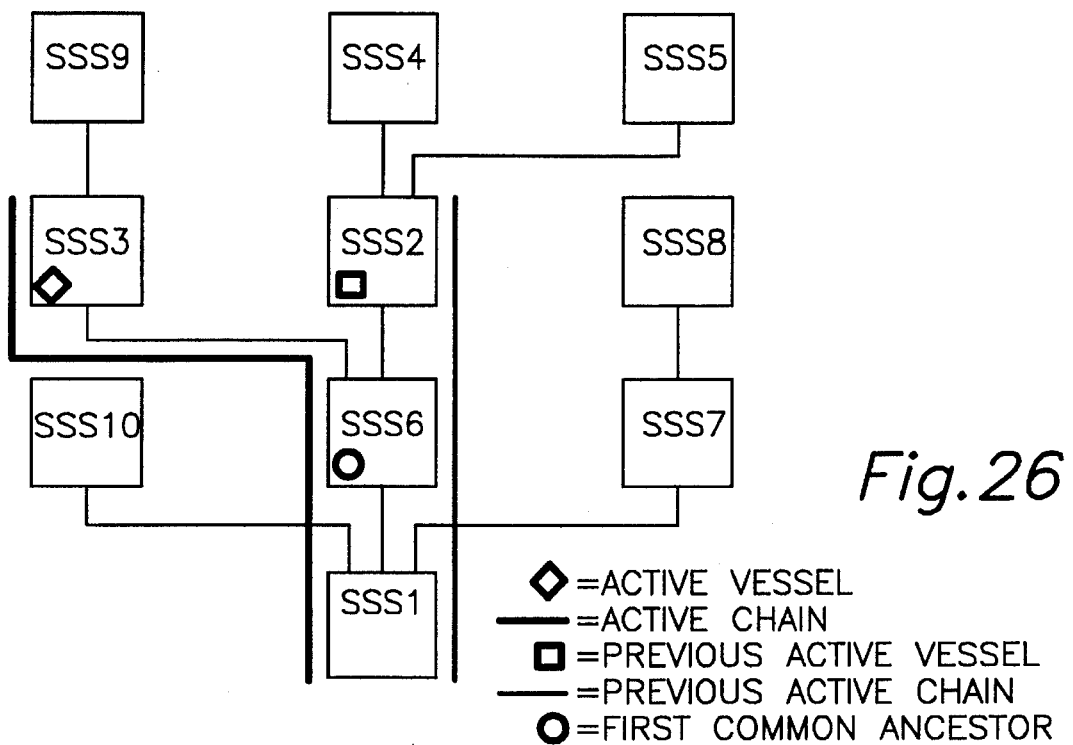
FIG. 26 shows a block diagram of flow feed.

The twelfth task is a flow feed into vessel three. Since vessel three has already been started, it is not necessary to add a staff step for vessel three. The flow feed task is a group defining task, so the active vessel is changed to three and the active chain updated to 3-6-1. All vessels in the new chain have already been started, so it is not necessary to insert any start steps. The first common vessel between the old path (2-6-1) and the new path (3-6-1) is vessel 6, so it is necessary to dump from previous active vessel (2) to vessel six. To achieve this, READY TO DUMP and DUMP steps are inserted into the recipe for vessel 2 and a REQUEST TO DUMP step is inserted into the recipe for vessel 6. The status of vessel 2 is then changed to "NOT STARTED" since it has dumped and is no longer part of the current chain. This is shown in FIG. 26.

Analysis of Step 13

Flow Feed
Group Defining: YES
Group Ending: NO

Figure 27:
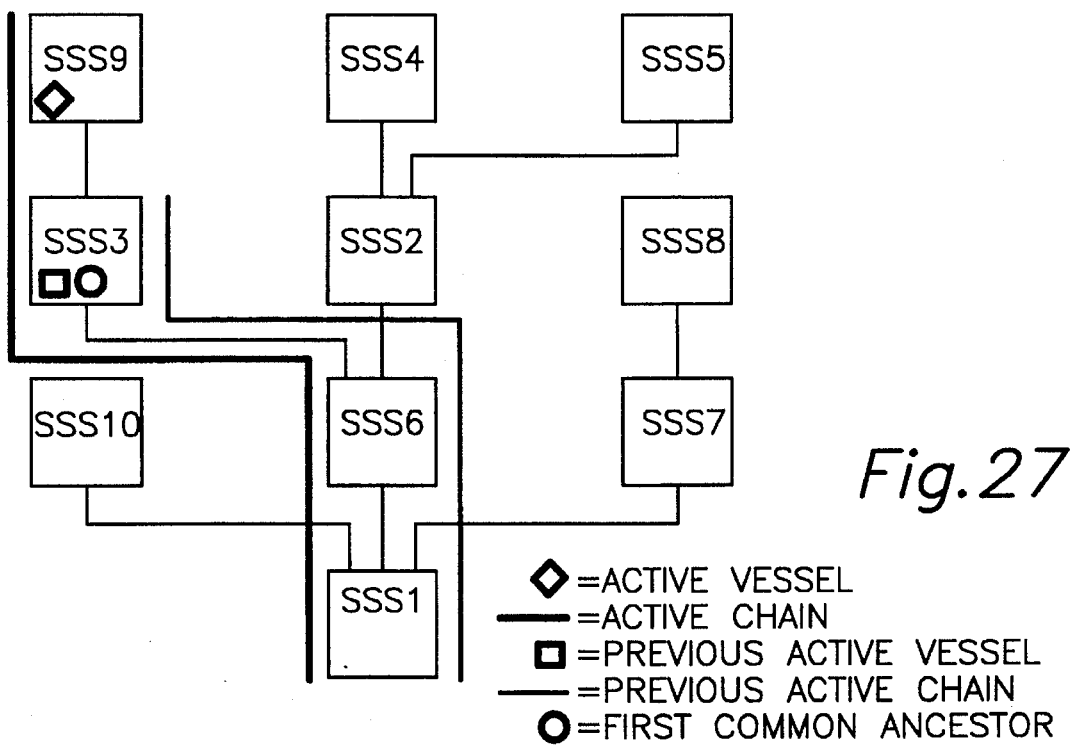
FIG. 27 shows a block diagram of flow feed.

The thirteenth task is a flow feed into vessel nine. Since vessel nine has not yet been started it is necessary to insert a START step into the recipe for vessel 9 and change the status of vessel 9 to "STARTED". Since the flow feed is a group defining task the active vessel is changed to 9 and the active chain updated to 9-3-6-1. All vessels in the new chain have been started so it is not necessary to insert any additional staff steps into the recipe. The first common ancestor between the old chain (3-6-1) and the new chain (9-3-6-1) is the previous active vessel (6) so no dumps are necessary. This is shown in FIG. 27.

Analysis of Step 14

Flow Feed
Group Defining: YES
Group Ending: NO

Figure 28:
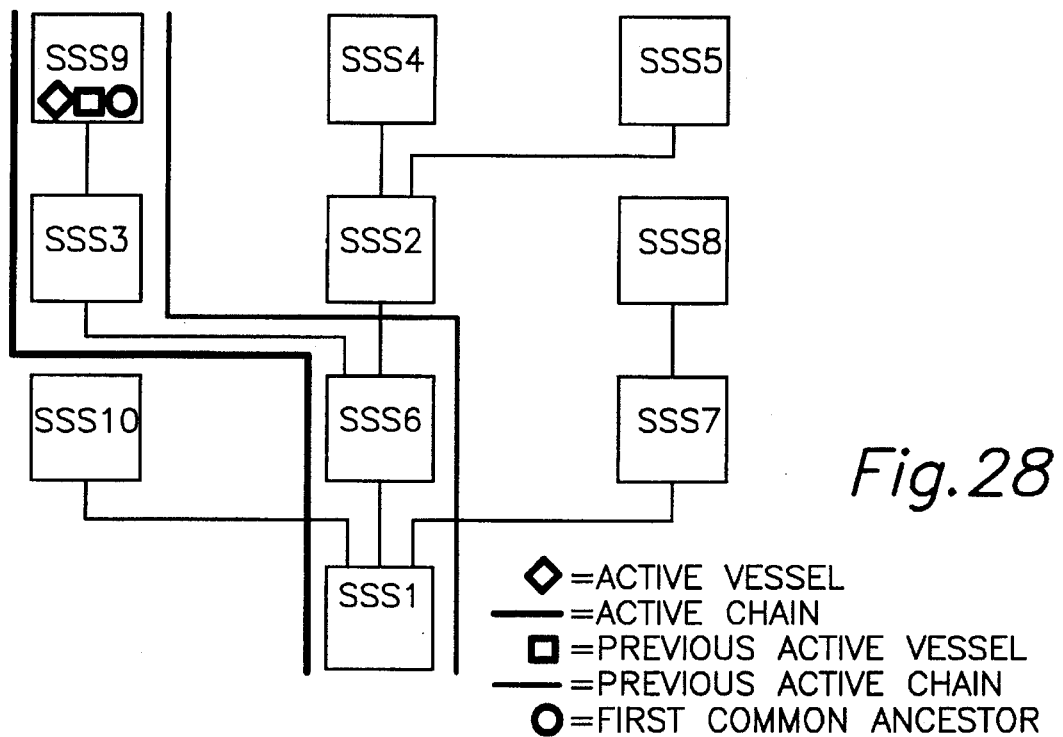
FIG. 28 shows a block diagram of flow feed.

The fourteenth step in the pass one results is a flow feed into vessel 9. Since vessel 9 has already been started, it is not necessary to insert a start step into the recipe for vessel 9. The flow feed task is group defining, so the active vessel is set to 9 and the active chain set to 9-3-6-1. All vessels in the new active chain have already been started, so it is not necessary to insert any additional start steps at this time. The first common ancestor between the old chain and the new chain is the previous active vessel, so no dumps are necessary. This is shown in FIG. 28.

Analysis of Step 15

GIW Feed
Group Defining: YES
Group Ending: NO

Figure 29:
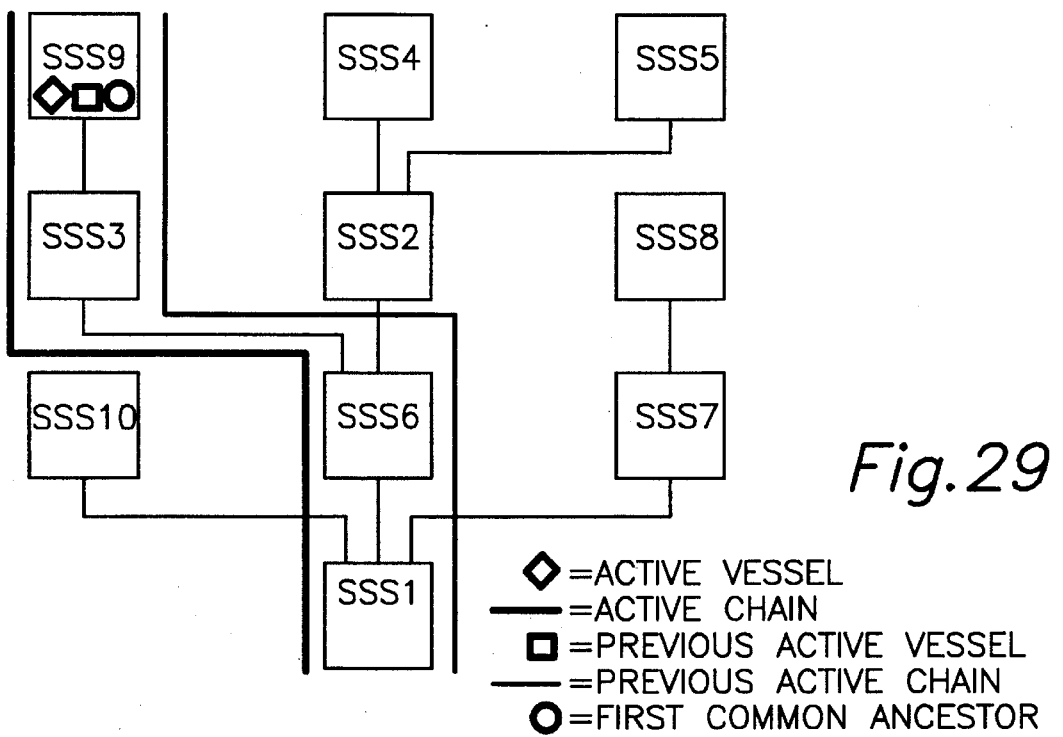
FIG. 29 shows a block diagram of GIW Feed.

The fifteenth task in the pass one results is a gain in weight feed into vessel 9. Since vessel 9 has already been started, it is not necessary to insert a start step into the recipe for vessel 9. The gain in weight feed task is group defining, so the active vessel is set to 9 and the active chain set to 9-3-6-1. All vessels in the new active chain have already been started, so it is not necessary to insert any additional start steps at this time. The first common ancestor between the old chain and the new chain is the previous active vessel, so no dumps are necessary. This is shown in FIG. 29.

Analysis of Step 16

Gauge Tank Feed
Group Defining: YES
Group Ending: NO

Figure 30:
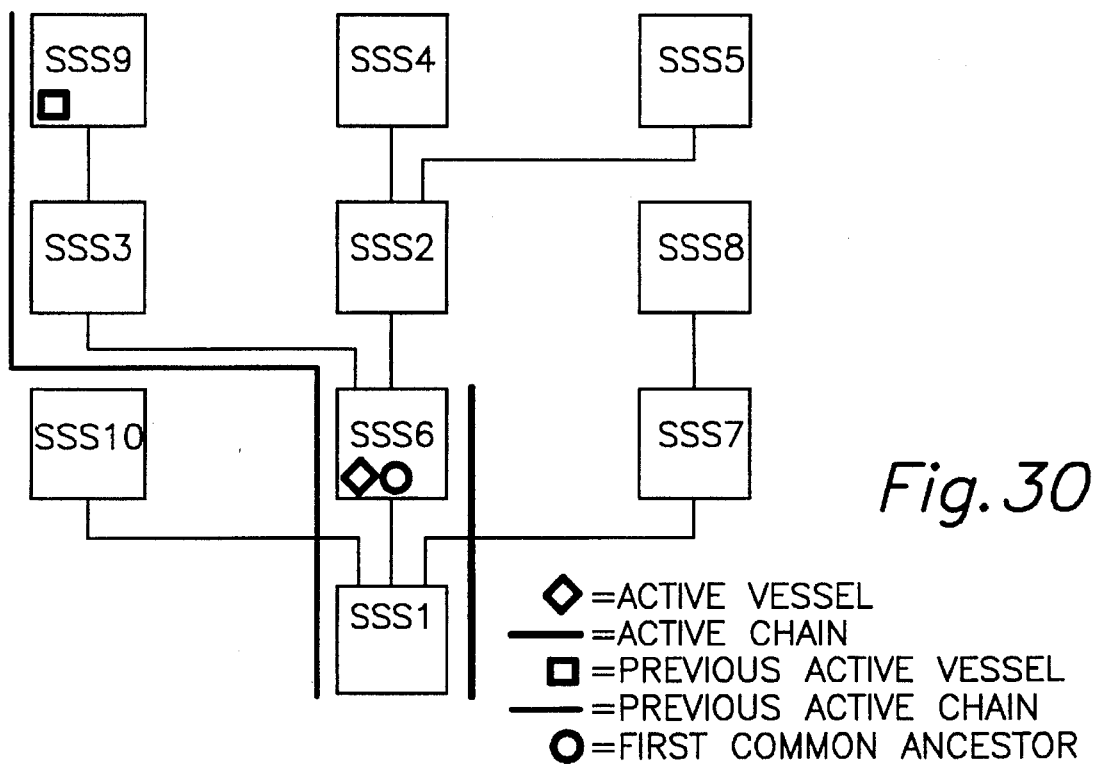
FIG. 30 shows a block diagram of Gauge Tank Feed.

The sixteenth task is a gauge tank feed into vessel 6. Since vessel 6 has already been started, it is not necessary to add a start step for vessel 6. The gauge tank feed is a group defining task, so the active vessel is changed to six and the active chain updated to 6-1. All vessels in the new chain have already been started, so it is not necessary to insert any start steps. The first common vessel between the old path 9-3-6-1 and the new path 6-1 is vessel six, so the previous current vessel, 9, must dump to vessel 3 and vessel 3 must then dump into vessel 6. To achieve this, READY TO DUMP and DUMP steps are inserted for vessel 9 and a REQUEST TO DUMP step is inserted into vessel 3. Then READY TO DUMP and DUMP steps are inserted into vessel 3 and a REQUEST TO DUMP step is inserted into vessel 6. The statuses of both vessel 9 and 3 are then changed to "NOT STARTED" since they have dumped and are no longer part of the current chain. This is shown in FIG. 30.

Analysis of Step 17

Temperature
Group Defining: NO
Group Ending: NO

Figure 31:
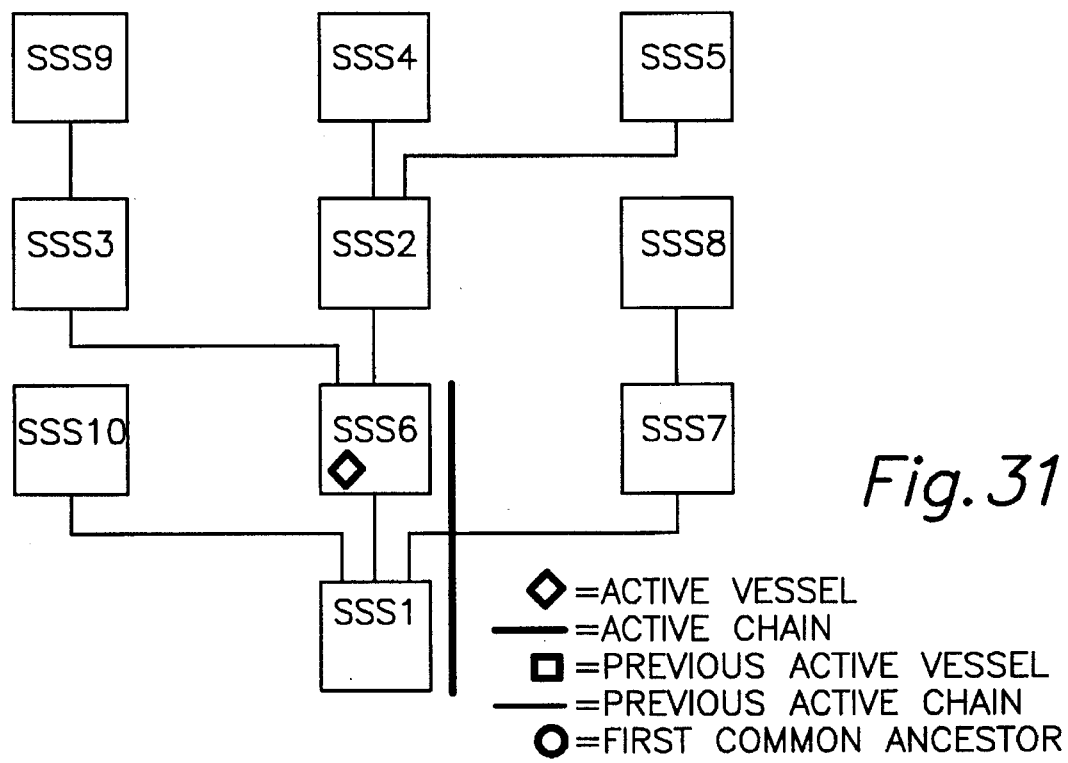
FIG. 31 shows a block diagram of Temperature.

The seventeenth task in the pass one results is a temperature task located in vessel 8. Since vessel 8 has not been started, it is necessary to insert a START step for vessel 8 into the recipe. The status of vessel 8 is changed to "STARTED". Since the temperature task is neither group defining nor group ending, no change to the active vessel/chain is required. This is shown in FIG. 31.

Analysis of Step 18

GIW Feed
Group Defining: YES
Group Ending: NO

Figure 32:
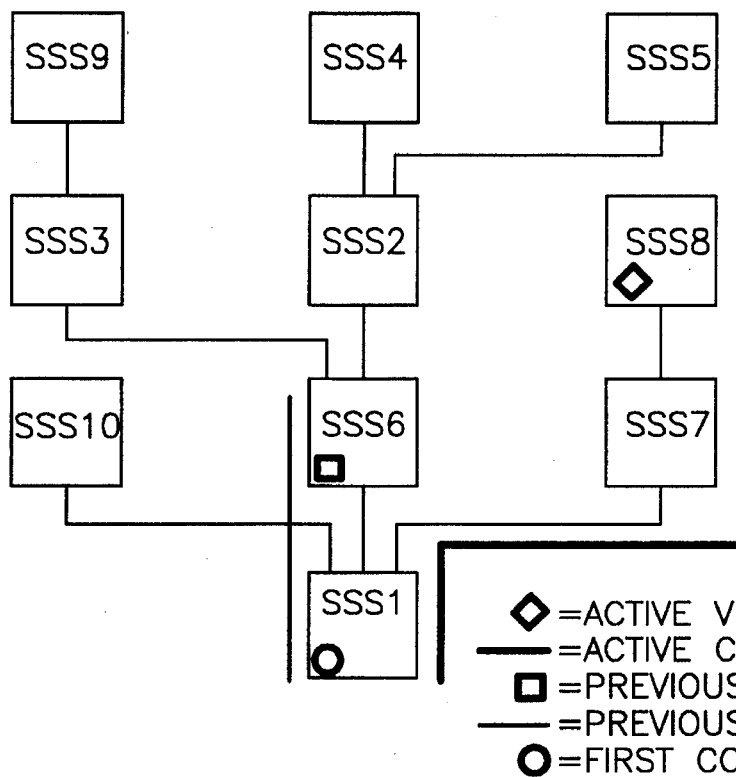
FIG. 32 shows a block diagram of GIW feed.

The eighteenth task is a gain in weight feed into vessel 8. Since vessel 8 has already been started, it is not necessary to insert a start step for vessel eight. Since the material feed task is a group defining task, the active vessel is changed to 8 and the active chain updated to 8-7-1. Vessel 7 in the new chain has not been started, so it is necessary to also insert a START step for vessel 7 into the recipe. The first common vessel between the old path 6-1 and the new path 8-7-1 is the primary subsystem, so it is necessary for the old current vessel, 6, to dump to the primary subsystem. To achieve this READY TO DUMP and DUMP steps are inserted into the recipe for vessel 6 and a REQUEST TO DUMP step is inserted into the recipe for the primary subsystem. The status of vessel 6 is then changed to "NOT STARTED" since it has dumped and is no longer part of the current chain. This is shown in FIG. 32.

Analysis of Step 19

Flow Feed
Group Defining: YES
Group Ending: NO

Figure 33:
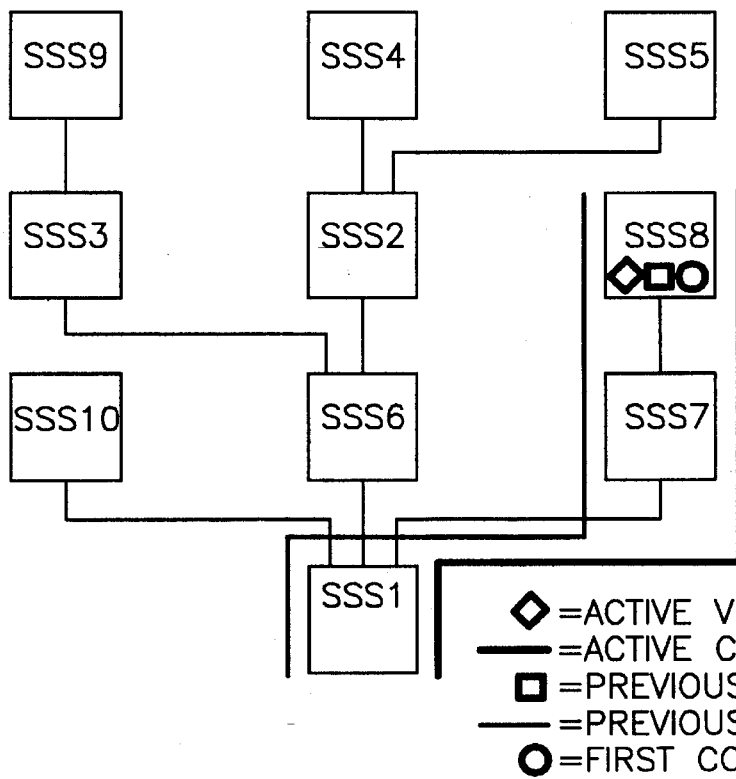
FIG. 33 shows a block diagram of Flow Feed.

The nineteenth task in the pass one results is a flow feed into vessel 8. Since vessel eight has already been started it is not necessary to insert a start step into the recipe for vessel eight. The flow feed step is group defining, so the active vessel is set to eight and the active chain set to 8-7-1. All vessels in the new active chain have already been started, so it is not necessary to insert any additional starts steps into the recipe at this time. The first common ancestor between the old chain and the new chain is the previous active vessel so no dumps are required. This is shown in FIG. 33.

Analysis of Step 20

Temperature—Vessel 7
Group Defining: NO
Group Ending: NO

Figure 34:
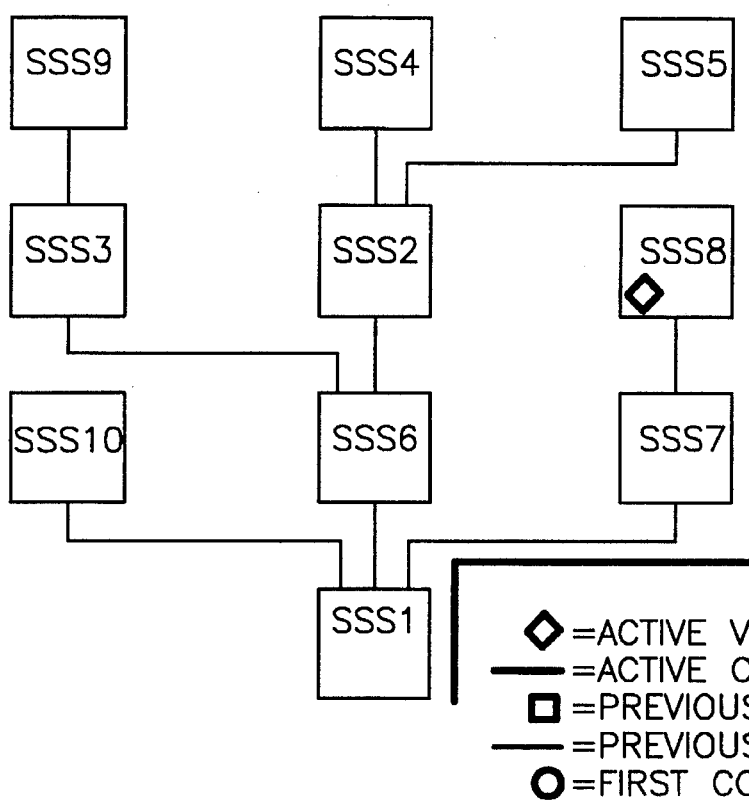
FIG. 34 shows a block diagram of Temperature—Vessel 7.

The twentieth task is a temperature task located in vessel 7. Since vessel 7 has already been started, it is not necessary to insert a start step for vessel 7. Since the temperature task is neither group ending or group defining, no changes to the active vessel/chain are required. This is shown in FIG. 34.

Analysis of Step 21

Flow Feed—Vessel 7
Group Defining: YES
Group Ending: NO

Figure 35:
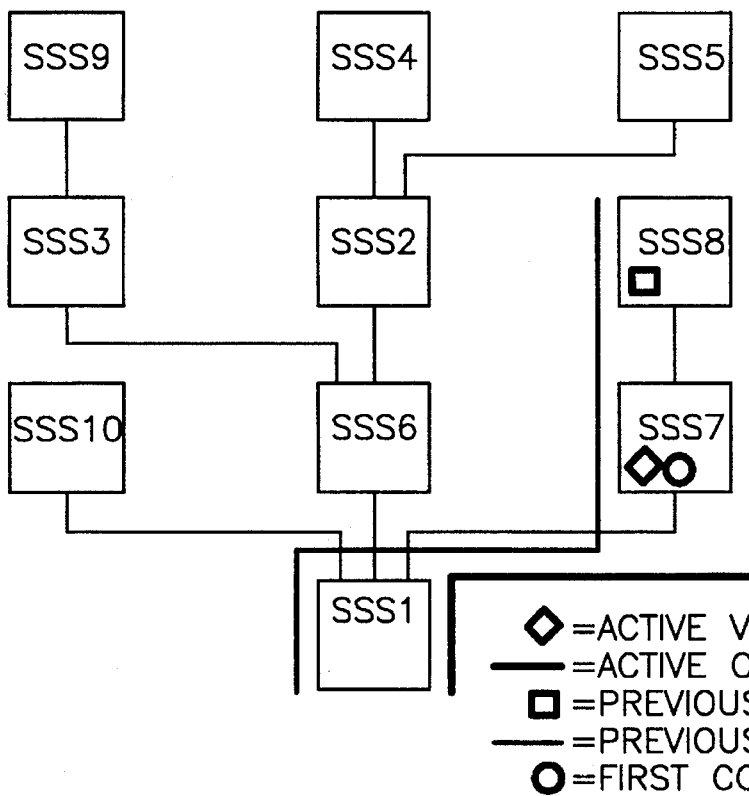
FIG. 35 shows a block diagram of Flow Feed—Vessel 7.

The twenty-first task is a flow feed into vessel 7. Since vessel 7 has already been started, it is not necessary to insert a start step for vessel 7. The flow feed task is group defining so the active vessel is changed to 7 and the active chain reset to 7-1. All vessels in the new chain have already been started so it is not necessary to insert any start steps into the recipe. The first common ancestor between the old chain (8-7-1) and the new chain (7-1) is vessel 7, so the previous current vessel, 8, must dump to vessel 7. To achieve this. READY TO DUMP and DUMP steps are inserted into the recipe for vessel 8 and a REQUEST TO DUMP step is inserted into the recipe for vessel 7. The status of vessel 8 is then changed to "NOT STARTED" since it has dumped and is no longer part of the current chain. This is shown in FIG. 35.

Analysis of Step 22

Analysis—Vessel 7
Group Defining: NO
Group Ending: YES

Figure 36:
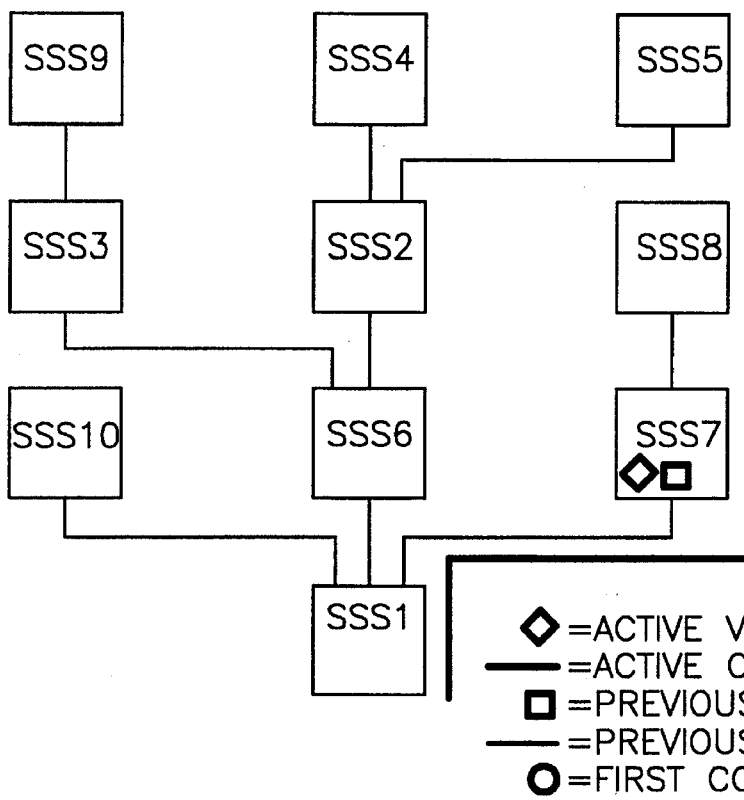
FIG. 36 shows a block diagram of Analysis—Vessel 7.

The twenty-second task in the formula is an analysis task located in vessel 7. Since vessel 7 has already been started, it is not necessary to insert a START step into the recipe for vessel 7. The analysis task is a group ending task. The currently active chain does run through the vessel in which the analysis task is located, but since the active vessel and the vessel into which the analysis task is located are the same, no dumps or changes of active vessel/chain are required. This is shown in FIG. 36.

Analysis of Step 23

GIW Feed—Vessel 8
Group Defining: YES
Group Ending: NO

Figure 37:
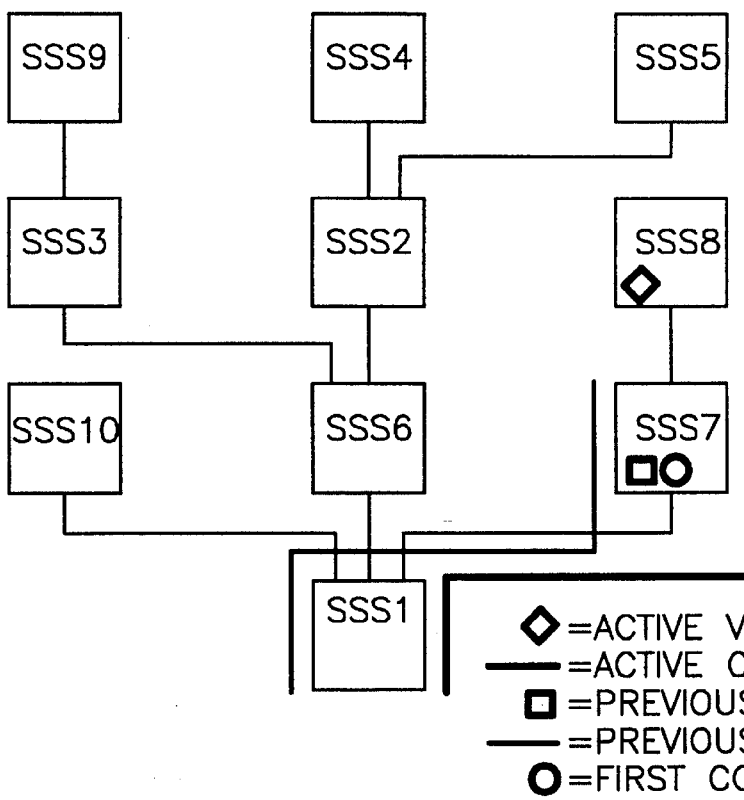
FIG. 37 shows a block diagram of GIW Feed—Vessel 8.

The twenty-third task in the pass one results is a gain in weight feed located in vessel 8. Vessel 8 is no longer marked as being started since it had dumped earlier, so it is once again necessary to insert a START step for vessel 8 into the recipe and mark vessel 8 as being "STARTED" again. The gain in weight task is group defining, so the active vessel is changed to 8 and the active chain updated to 8-7-1. All vessels in the active chain are started, so it is unnecessary to insert any more start steps into the recipe. The fast common ancestor between the active chain 8-7-1 and the previous chain 7-1 is vessel 7 which is the previous current vessel, so no dumping is necessary. This is shown in FIG. 37.

Analysis of Step 24—Part I (Before Force Secondary Group Dump)

Flow Feed—Vessel 8
Group Defining: YES
Group Ending: NO

Figure 38:
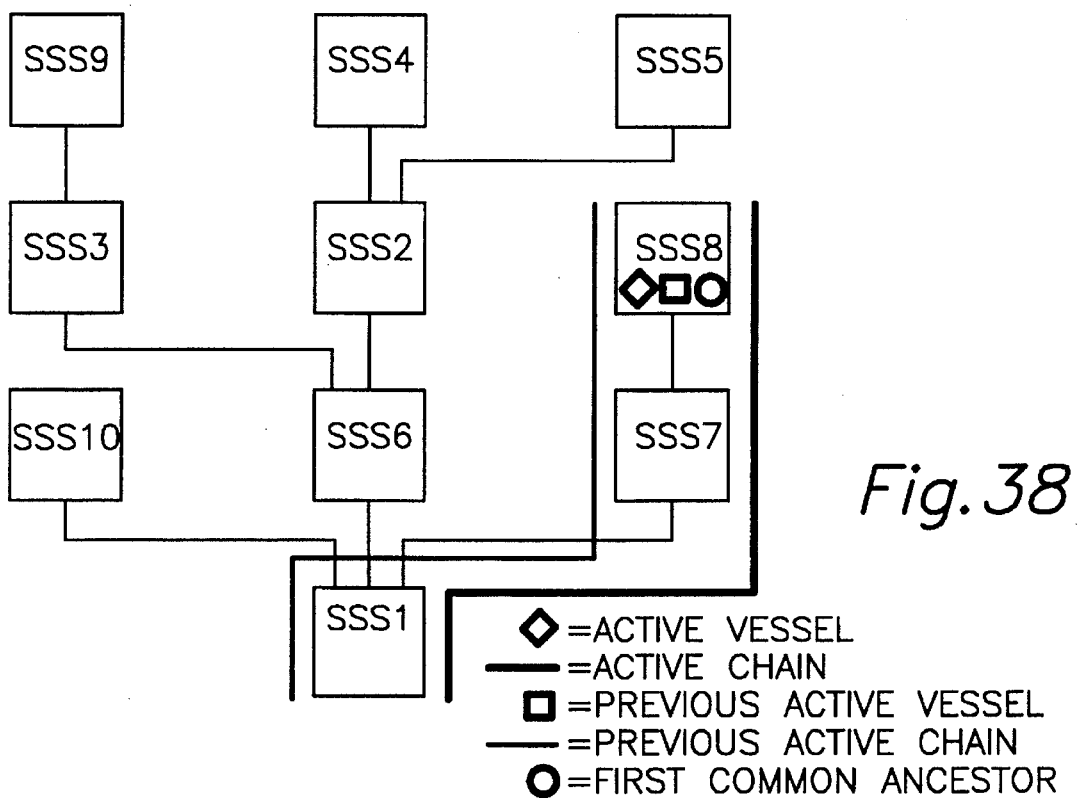
FIG. 38 shows a block diagram of Flow Feed—Vessel 8.

The twenty-fourth task in the formula is a flow feed into vessel 8. Vessel eight has already been started, so it is not necessary to insert a start step into the recipe for vessel 8. The flow feed step is group defining, so the active vessel is set to eight, and the active path set to 8-7-1. All vessels in the active path have already been started, so it is not necessary to insert any more start steps at this time. The first common ancestor between the old chain and the new chain is the previous active vessels, so no dumping is necessary. This is shown in FIG. 38.

Analysis of Step 24—Part II (After Force Secondary Group Dump)

Force Secondary Group Dump Request on Step 24

Figure 39:
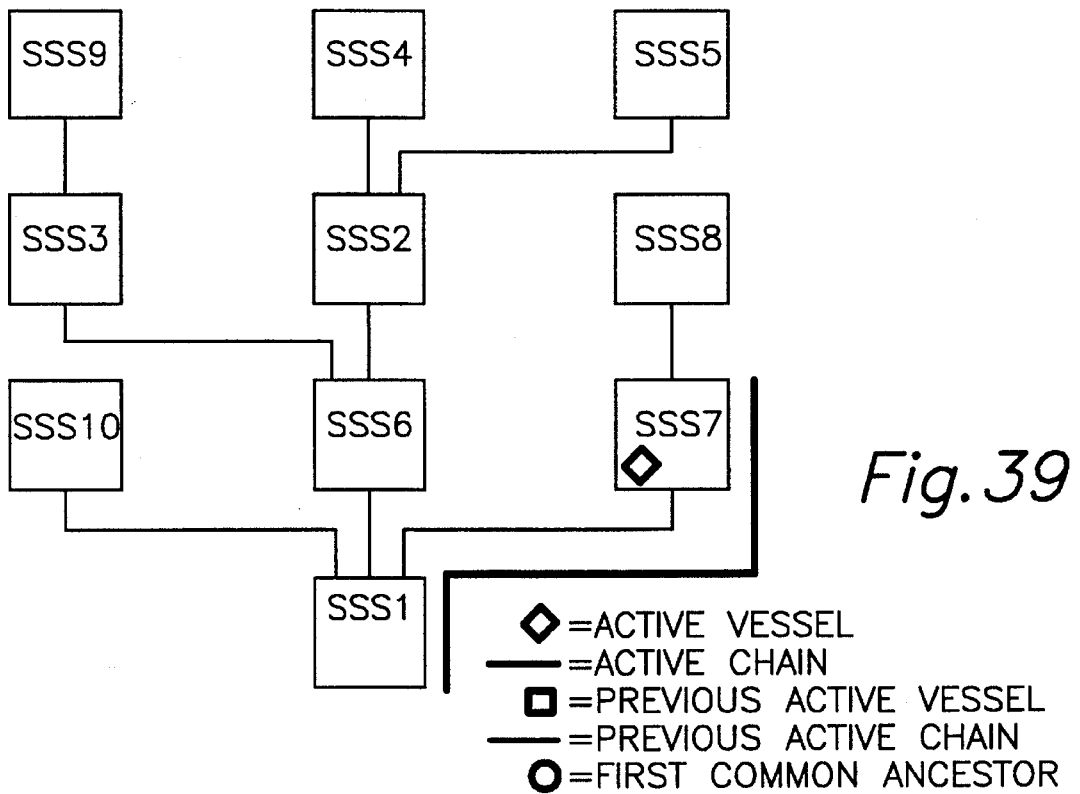
FIG. 39 shows block diagram of Force Secondary Group Dump Request on Step 24.

The force secondary group dump request is to dump to the vessel where material P feeds into the system which in this system is vessel 7. Because of this, READY TO DUMP and DUMP steps are inserted into the recipe for vessel 8 and a REQUEST TO DUMP step is inserted into the recipe for vessel 7. The active vessel is changed to 7, the active chain set to 7-1. The status of vessel 8 set to "NOT STARTED" since it has just dumped and is no longer part of the current chain. This is shown in FIG. 39.

Analysis of Step 25

GIW Feed
Group Defining: YES
Group Ending: NO

Figure 40:
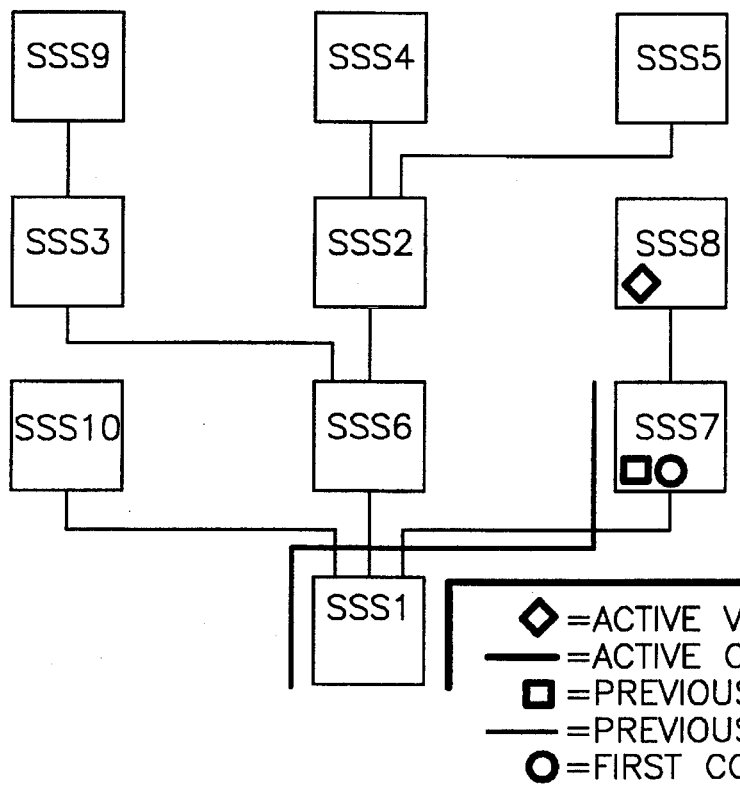
FIG. 40 shows a block diagram of GIW Feed.

The twenty-fifth task in the pass one results is a gain in weight feed located in vessel 8. Vessel 8 is no longer marked as being started since it had dumped earlier, so it is once again necessary to insert a START step for vessel 8 into the recipe and mark vessel 8 as being "STARTED" again. The gain in weight task is group defining, so the active vessel is changed to 8 and the active chain updated to 8-7-1. All vessels in the current chain are started, so it is unnecessary to insert any more start steps into the recipe. The first common ancestor between the current chain 8-7-1 and the previous chain 7-1 is vessel 7 which is the previous current vessel, so no dumping is necessary. This is shown in FIG. 40.

Analysis of Step 26

Flow Feed—Vessel 8
Group Defining: YES
Group Ending: NO

Figure 41:
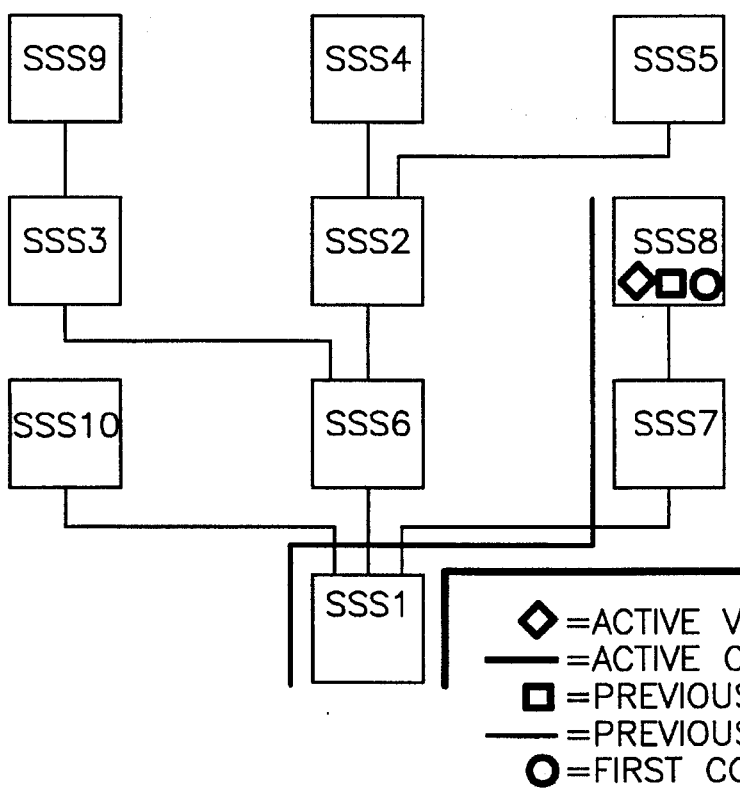
FIG. 41 shows a block diagram of Flow Feed—Vessel 8.

The twenty-sixth task in the pass one results is a flow feed into vessel 8. Vessel eight has already been started, so it is not necessary to insert a start step into the recipe for vessel 8. The flow feed step is group defining, so the active vessel is updated to eight and the active chain updated to 8-7-1. All vessels in the active chain have been started, so it is not necessary to insert any more start steps into the recipe at this time. The first common ancestor between the current chain (8-7-1) and the old chain (8-7-1) is vessel 8, which is the previous current vessel, so no dumping is necessary. This is shown in FIG. 41.

Analysis of Step 27

Flow Feed—Vessel 7

Group Defining: YES
Group Ending: NO

Figure 42:
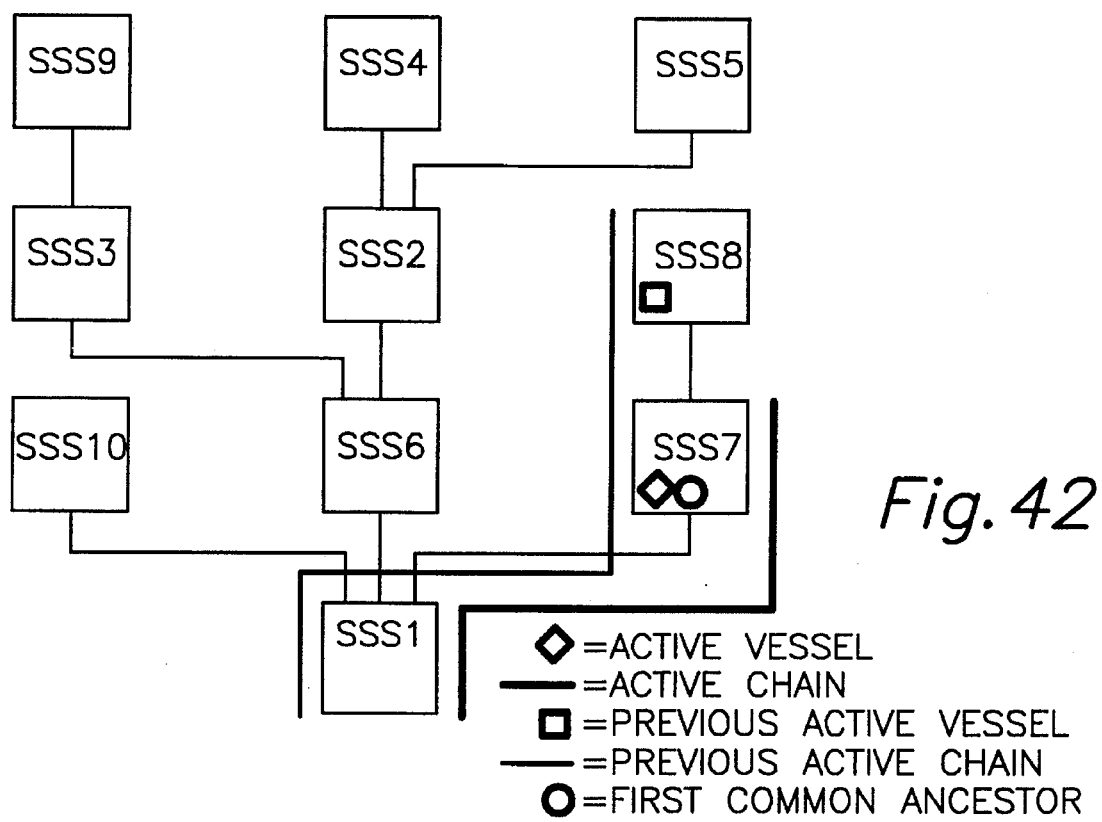
FIG. 42 shows a block diagram of Flow Feed—Vessel 7.

The twenty-seventh task in the pass one results is a flow feed into vessel 7. Vessel 7 has already been started, so it is not necessary to insert a start step for vessel 7. The flow feed task is group defining, so the active vessel is reset to 7 and the active chain is reset to 7-1. All vessels in the active chain are started, so it is not necessary to insert any additional start steps into the recipe. The first common ancestor between the old chain (8-7-1) and the new chain (7-1) is vessel 7, so the previous current vessel, vessel 8, must dump to vessel 7. To achieve this READY TO DUMP and DUMP steps are inserted into the recipe for vessel 8, and a REQUEST TO DUMP step is inserted into the recipe for vessel 7. The status of vessel 8 is set to "NOT STARTED" since it has just dumped and is no longer pan of the current chain. This is shown in FIG. 42.

Analysis of Step 28

End Linked—Vessel 7
Group Defining: NO
Group Ending: YES

Figure 43:
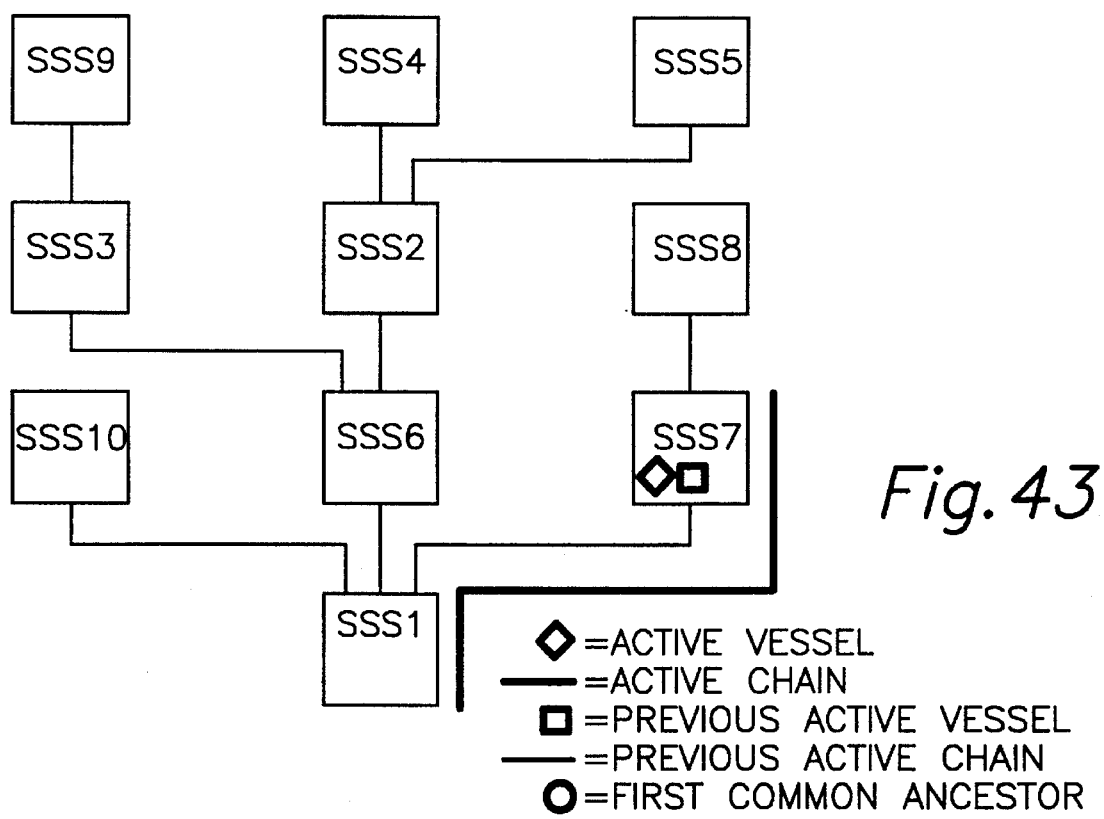
FIG. 43 shows a block diagram of End Linked—Vessel 7.

The twenty-eighth task in the formula is an end linked task located in vessel 7. Since vessel 7 has already been started, it is not necessary to insert a start step for vessel 7. The end linked task is a group ending task. The vessel in which the end linked task is located is in the currently active chain, but since the currently active vessel and the vessel into which the end linked task is located are the same, no dumps or changes of currently active vessel/chain are necessary. This is shown in FIG. 43.

Analysis of Step 29

Analysis—Vessel 1
Group Defining: NO
Group Ending: YES

Figure 44:
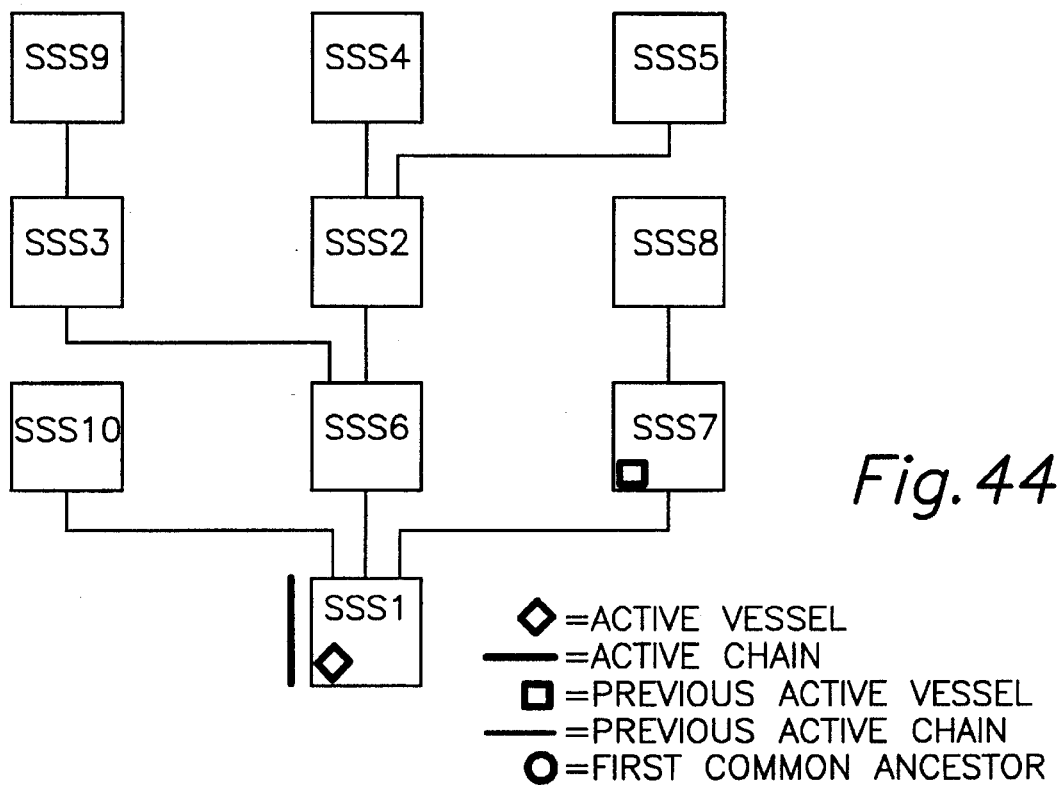
FIG. 44 shows a block diagram of Analysis—Vessel 1.

The twenty-ninth task in the pass one results is an analysis task located in the primary subsystem. Since the primary subsystem is already started, it is not necessary to insert a start step for the primary subsystem. The analysis task is a group ending task located in vessel 1. The current chain from the currently active vessel is 7-1. Since the vessel in which the group ending task is located is in the current chain, the currently active vessel must dump down to the vessel in which the group ending task is located. To achieve this, READY TO DUMP and DUMP steps are inserted into the recipe for vessel 7 and a REQUEST TO DUMP step is inserted into the recipe for vessel 1. Vessel 7 then has its status updated to "NOT STARTED". The active vessel is reassigned as vessel 1, and the active path is reset to 1. This is shown in FIG. 44.

Analysis of Step 30

Flow Feed—Vessel 3
Group Defining: YES
Group Ending: NO

Figure 45:
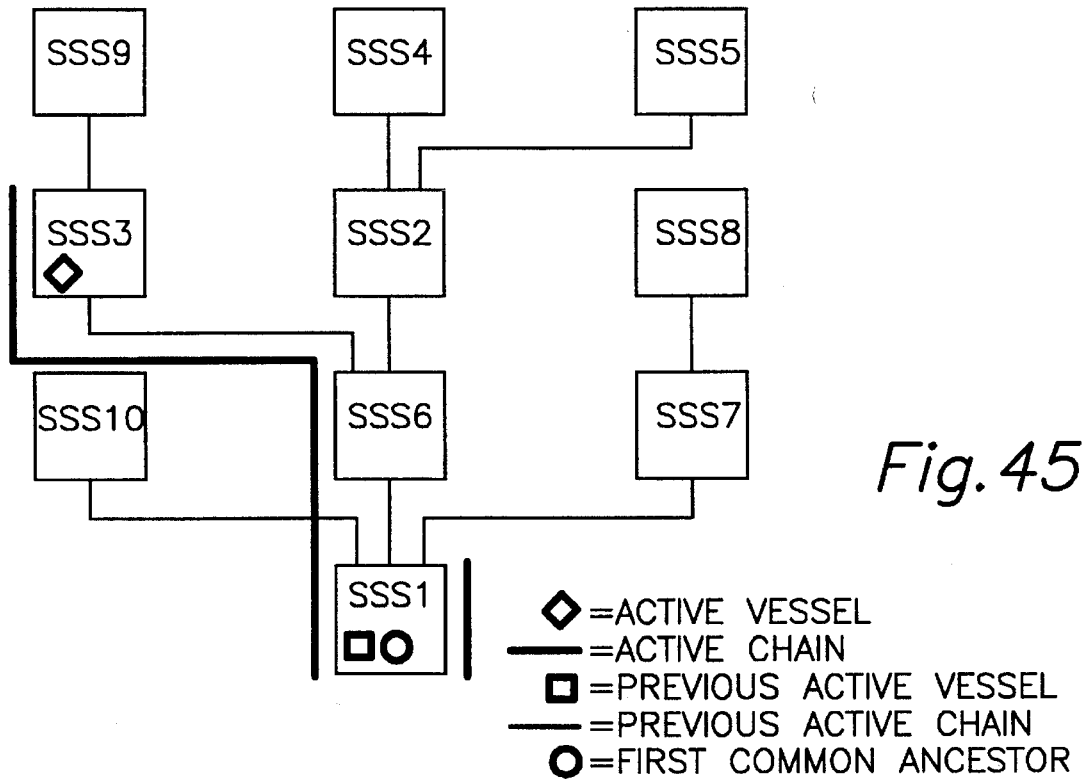
FIG. 45 shows a block diagram of Flow Feed—Vessel 3.

The thirtieth task in the pass one results is a flow feed located in vessel three. Since vessel three is not started, it is necessary to insert a START step into the recipe for vessel 3. Since the flow feed is a group defining task, the active vessel is changed to 3 and the active chain is reset to 3-6-1. Vessel 6 in the new chain is not started so it is necessary to insert a START step for vessel 6 into the recipe. The fast common ancestor between the old chain (1) and the new chain (3-6-1) is vessel 1. This is the same as the previous current vessel, so it is not necessary to generate any dumps. This is shown in FIG. 45.

Analysis of Step 31

Flow Feed—Vessel 9
Group Defining: YES
Group Ending: NO

Figure 46:
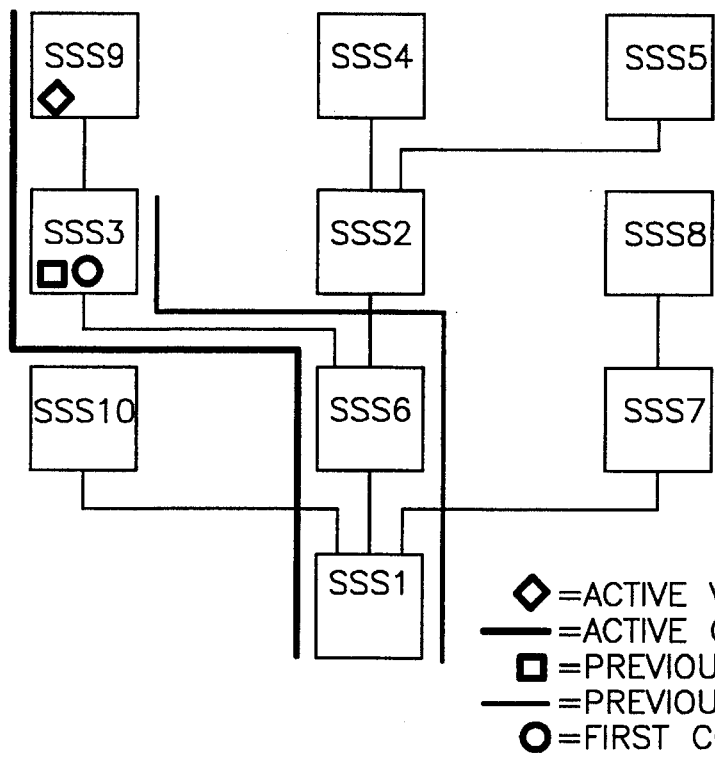
FIG. 46 shows a block diagram of Flow Feed—Vessel 9.

The thirty-first task in the formula is a flow feed located in vessel 9. Since vessel 9 is not started, it is necessary to insert a START step into the recipe for vessel 9. Because the flow feed is a group defining task, the active vessel is changed to 9 and the active chain is reset of 9-3-6-1. All vessels in the new chain are already started, so it is not necessary to insert any new start steps into the recipe. The first common ancestor between the new chain (9-3-6-1) and the old chain (3-6-1) is vessel 3. This is the same as the previous active vessel, so it is not necessary to generate any dumps. This is shown in FIG. 46.

Analysis of Step 32

Flow Feed—Vessel 9
Group Defining: YES
Group Ending: NO

Figure 47:
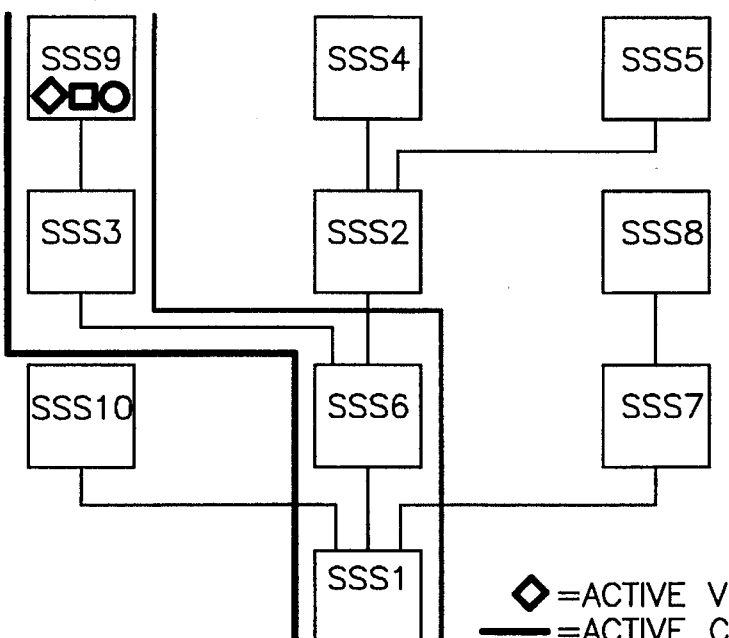
FIG. 47 shows a block diagram of Flow Feed—Vessel 9.

The thirty-second step in the pass one results is a flow feed into vessel nine. Vessel nine has already been started, so it is not necessary to insert a start step into the recipe for vessel nine. The flow feed step is group defining, so the active vessel is reset to nine, and the active chain reset to 9-3-6-1. All vessels in the active chain have been started, so it is not necessary to insert any additional start steps at this time. The first common ancestor between the old chain (9-3-6-1) and the new chain (9-3-6-1) is vessel nine. This is the same as the previous active vessel, so it is not necessary to generate any dumps. This is shown in FIG. 47.

Analysis of Step 33

GIW Feed—Vessel 9
Group Defining: YES
Group Ending: NO

Figure 48:
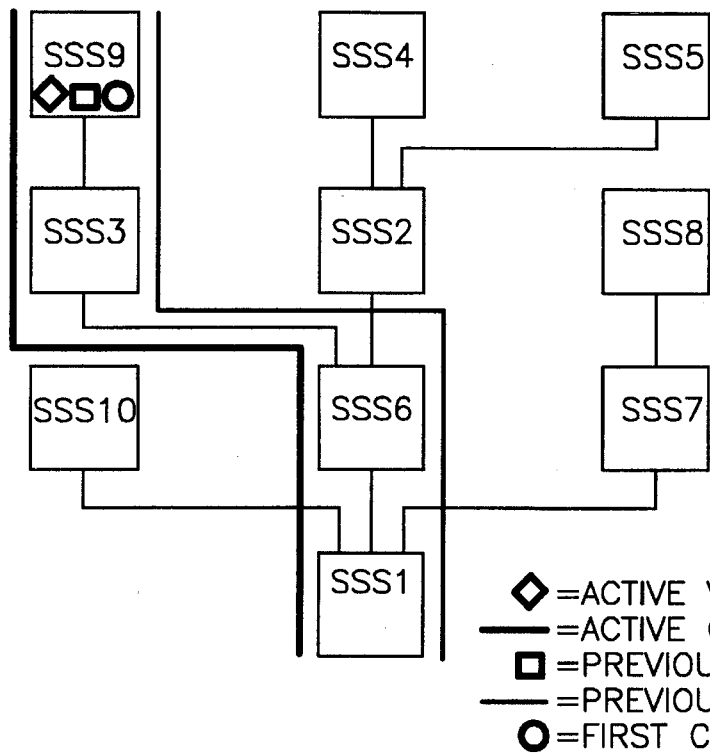
FIG. 48 shows a block diagram of GIW Feed—Vessel 9.

The thirty-third step in the pass one results is a gain in weight feed into vessel nine. Vessel nine has already been started, so it is not necessary to insert a start step into the recipe for vessel nine. The gain in weight feed step is group deeming, so the active vessel is reset to nine, and the active chain reset to 9-3-6-1. All vessels in the active chain have been started, so it is not necessary to insert any additional start steps at this time. The first common ancestor between the old chain (9-3-6-1) and the new chain (9-3-6-1) is vessel nine. This is the same as the previous active vessel, so it is not necessary to generate any dumps. This is shown in FIG. 48.

Analysis of Step 34

Gauge Tank Feed—Vessel 7
Group Defining: YES
Group Ending: NO

Figure 49:
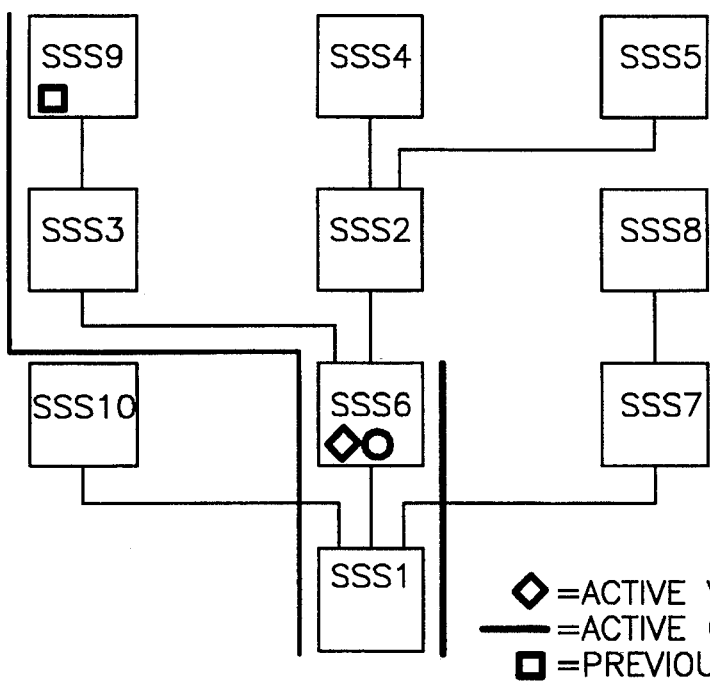
FIG. 49 shows a block diagram of Gauge Tank Feed—Vessel 9.

The thirty-fourth step in the pass one results is a gauge tank feed into vessel 6. Vessel 6 is already started so it is not necessary to insert a start step into the recipe for vessel 6. The gauge tank feed task is group defining, so the active vessel is changed to 6 and the active chain reset to 6-1. All vessels in the new chain are already started, so it is not necessary to add any additional start steps to the recipe. The first common ancestor between the new chain (6-1) and the old chain (9-3-6-1) is vessel 6. This means that it is necessary for the previous current vessel to dump from vessel 9 to vessel 3 and then for vessel 3 to dump to vessel 6. To achieve this, READY TO DUMP and DUMP steps are inserted into the recipe for vessel 9 and a REQUEST TO DUMP step is inserted into the recipe for vessel 3. READY TO DUMP and DUMP steps are then inserted into the recipe for vessel 3 and a REQUEST TO DUMP step is inserted into the recipe for vessel 6. Since vessels 9 and 3 have both just dumped and are no longer part of the current chain, the status of both vessels is set to "NOT STARTED". This is shown in FIG. 49.

Analysis of Step 35

End Linked—Vessel 1
Group Defining: NO
Group Ending: YES

Figure 50:
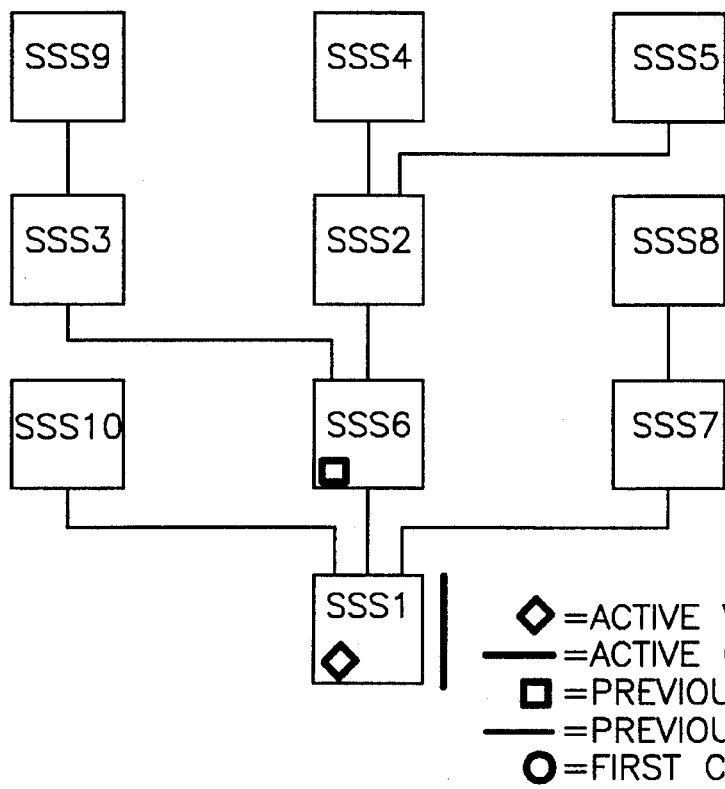
FIG. 50 shows a block diagram of End Linked—Vessel 1.

The thirty-fifth step in the pass one results is an end linked step located in the primary. Since the primary has already been started, it is not necessary to insert a start step for the primary subsystem. The end linked task is a group ending task located in vessel 1. The chain generated from the currently active vessel is 6-1. Since the vessel into which the group ending task is being located is within the currently active chain, the currently active vessel must dump down the chain until it reaches the vessel where the group ending task is located. To achieve this, READY TO DUMP and DUMP steps are inserted into the recipe for vessel 6 and a REQUEST TO DUMP step is inserted into the recipe for vessel 1. The status of vessel 6 is then set to "NOT STARTED". The currently active vessel is reassigned to be vessel 1 and the currently active chain is reset to 1. This is shown in FIG. 50.

Analysis of Step 36

Pumpout—Vessel 1
Group Defining: NO
Group Ending: YES

Figure 51:
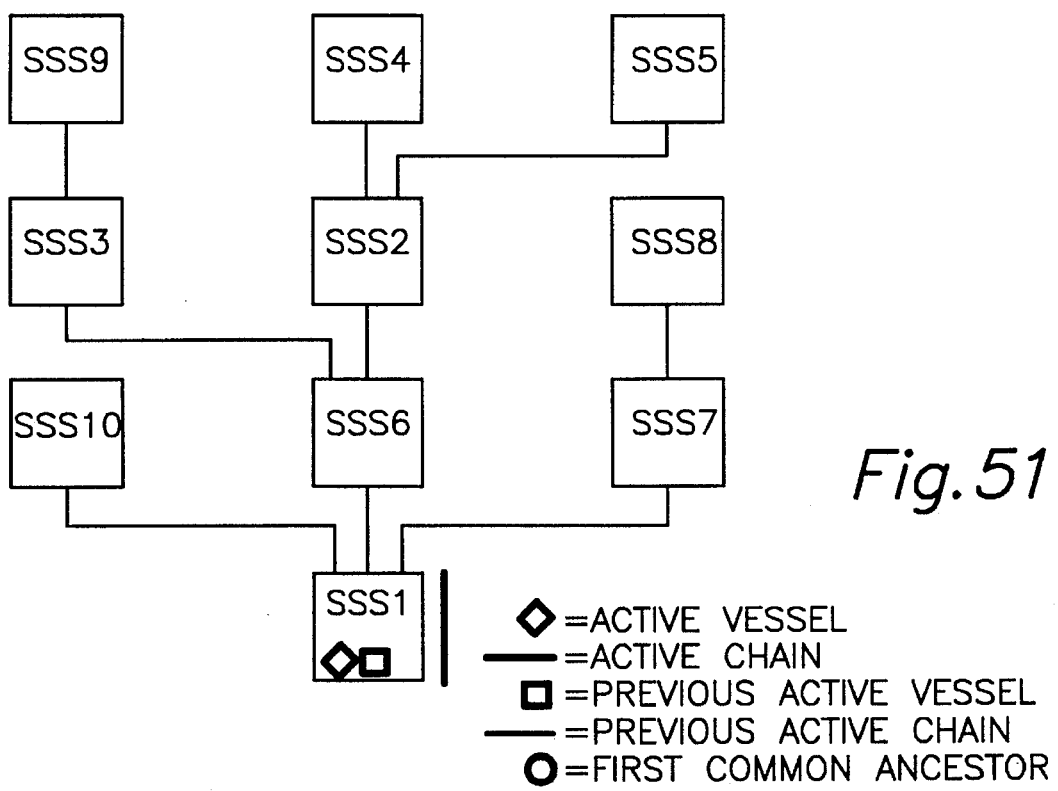
FIG. 51 shows a block diagram of Pumpout—Vessel 1.

The thirty-sixth step in the pass one results is a pumpout step located in the primary subsystem. The primary subsystem has already been started, so it is not necessary to insert a start step into the recipe for the primary, subsystem. The pumpout step is a group ending step. The vessel in which the pumpout task is located is in the currently active chain, but since the currently active vessel and the vessel into which the pumpout task is located are the same, no dumps or changes of currently active vessel/chain are necessary. This is shown as FIG. 51.

Analysis of Step 37

Gauge Tank Feed—Vessel 1
Group Defining: YES
Group Ending: NO

Figure 52:
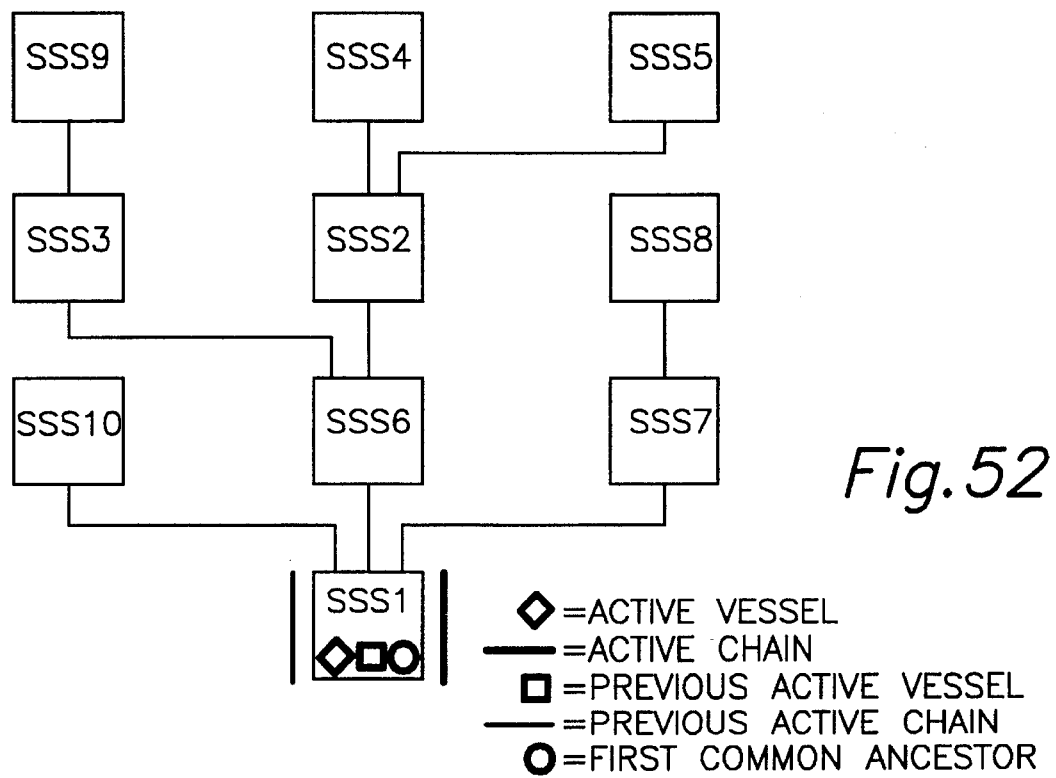
FIG. 52 shows a block diagram of Gauge Tank Feed—Vessel 1.

The thirty-seventh step in the pass one results is a gauge tank feed into the primary subsystem. The primary subsystem is already started, so it is not necessary to insert a start step into the primary subsystem. The gauge tank feed is group defining, so the active vessel is reset to one and the active chain reset to 1. All vessels in the active chain have been started, so it is not necessary to insert any additional start steps at this point. The first common ancestor between the old chain (1) and the new chain (1) is the primary subsystem (1). Since this was also the previous active vessel, no dumps are necessary. This is shown as FIG. 52.

Analysis of Step 38

Flow Feed—Vessel 10
Group Defining: YES
Group Ending: NO

Figure 53:
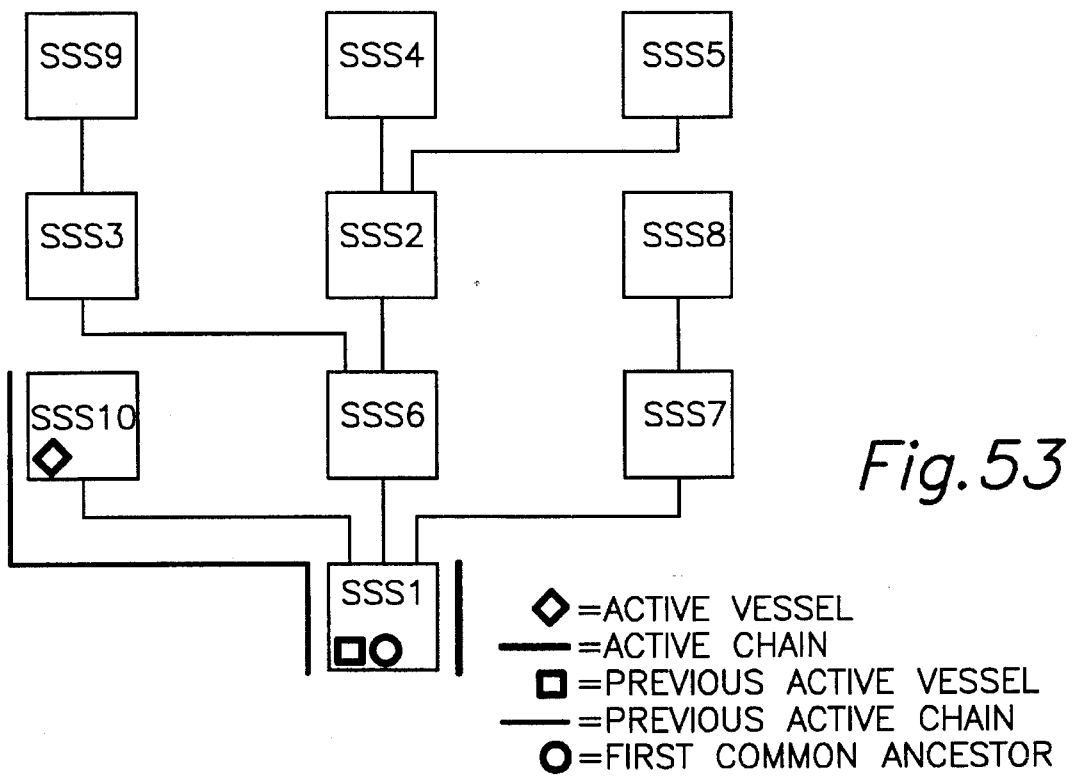
FIG. 53 shows a block diagram of Flow Feed—Vessel 10.

The thirty-eighth and final step in the pass one results is a flow feed into vessel ten. Vessel 10 has not yet been started, so it is necessary to insert a START step into the recipe for vessel 10. The flow feed is a group defining task so the active vessel is set to 10 and the active chain is set to 10-1. All vessels in the new chain have already been started, so it is not necessary to add any additional start steps to the recipe at this time. The first common ancestor between the old chain (1) and the new chain (10-1) is the primary. Since the previous current vessel was the primary also, no dumps are necessary. This is shown in FIG. 53.

Final Operations

Figure 54:
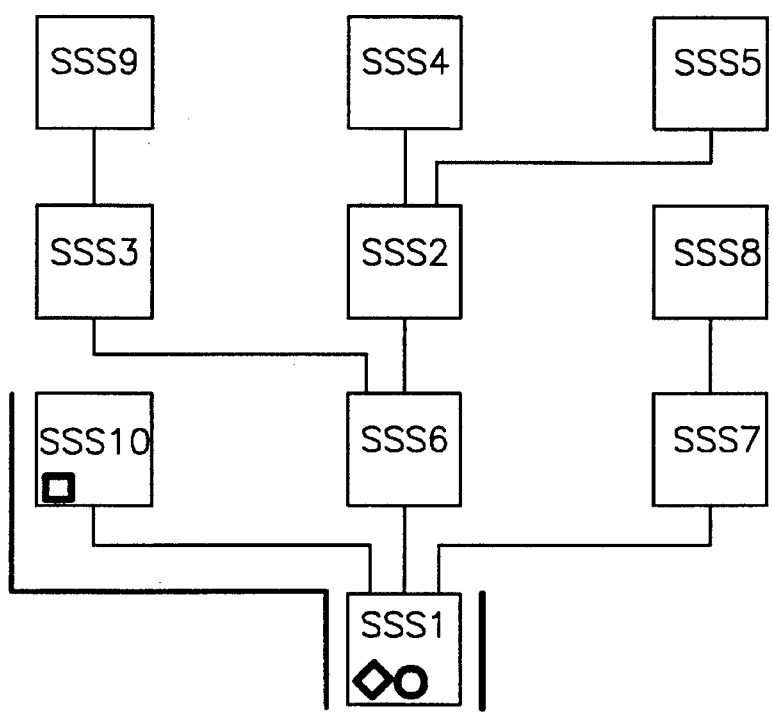
FIG. 54 shows a block diagram of Final Operations.

Now that the end of the recipe has been reached, it is necessary to dump any remaining material in the current chain down to the primary. To achieve this READY TO DUMP and DUMP steps are added to the recipe for vessel 10 and a REQUEST TO DUMP step is added to the recipe for the primary subsystem. This is shown in FIG. 54.

Pass two of the recipe build example has now been completed. The results are displayed in the table below with changes from the pass 1 results displayed in bold type for clarity.

| | | | | | | | | | | |
|---|---|---|---|---|---|---|---|---|---|---|
| | | | | Pass Two Results | | | | | | |
| STEP | TASK | FUNCTION | VSL | FSG/GRP | GRP END/DEF | LINKED CODE | RMI | ASSOC SUBSYS | CONDL START | PAIR ID |
| 1 | −1 | START | 1 | 1 | | | | 1 | | |
| 2 | 1 | AGITATOR | 1 | | | | | | | |
| 3 | 2 | FLOW | 1 | | 2 | | A | | | |
| 4 | 3 | GAIN IN WT | 1 | | 2 | | B | | | |
| 5 | 4 | TEMPERTR | 1 | | | | | | | |
| 6 | −1 | START | 6 | 1 | | | | 1 | | |
| 7 | −1 | START | 2 | 1 | | | | 6 | | |
| 8 | 5 | FLOW | 2 | | 2 | | C | | | |
| 9 | −1 | START | 4 | 1 | | | | 2 | | |
| 10 | 6 | GAUGE TANK | 4 | | 2 | | (E) | | | |
| 11 | 7 | FLOW | 4 | | 2 | | F | | | |
| 12 | −1 | START | 5 | 1 | | | | 2 | | |
| 13 | −1 | RDY DMP | 4 | 1 | | | | 4 | | 1 |
| 14 | −1 | REQ DMP | 2 | 1 | | | | 4 | | 1 |
| 15 | −1 | DUMP | 4 | 1 | | | | 4 | | |
| 16 | 8 | GAIN IN WT | 5 | | 2 | | G | | | |
| 17 | 9 | AGITATOR | 2 | | | | H | | | |

-continued

Pass Two Results

| STEP | TASK | FUNCTION | VSL | FSG/GRP | GRP END/DEF | LINKED CODE | RMI | ASSOC SUBSYS | CONDL START | PAIR ID |
|---|---|---|---|---|---|---|---|---|---|---|
| 18 | −1 | RDY DMP | 5 | 1 | | | | 5 | | 2 |
| 19 | −1 | REQ DUMP | 2 | 1 | | | | 5 | | 2 |
| 20 | −1 | DUMP | 5 | 1 | | | | 5 | | |
| 21 | 10 | FLOW | 2 | | 2 | | H | | | |
| 22 | −1 | START | 3 | 1 | | | | 6 | | |
| 23 | 11 | AGITATOR | 3 | | | | I | | | |
| 24 | −1 | RDY DMP | 2 | 1 | | | | 2 | | 3 |
| 25 | −1 | REQ DUMP | 6 | 1 | | | | 2 | | 3 |
| 26 | −1 | DUMP | 2 | 1 | | | | 2 | | |
| 27 | 12 | FLOW | 3 | | 2 | | I | | | |
| 28 | −1 | START | 9 | 1 | | | | 3 | | |
| 29 | 13 | FLOW | 9 | | 2 | | J | | | |
| 30 | 14 | FLOW | 9 | | 2 | | (K) | | | |
| 31 | 15 | GAIN IN WT | 9 | | 2 | | L | | | |
| 32 | −1 | RDY DMP | 9 | 1 | | | | 9 | | 4 |
| 33 | −1 | REQ DUMP | 3 | 1 | | | | 9 | | 4 |
| 34 | −1 | DUMP | 9 | 1 | | | | 9 | | |
| 35 | −1 | RDY DMP | 3 | 1 | | | | 3 | | 5 |
| 36 | −1 | REQ DUMP | 6 | 1 | | | | 3 | | 5 |
| 37 | −1 | DUMP | 3 | 1 | | | | 3 | | |
| 38 | 16 | GAUGE TANK | 6 | | 2 | | M | | | |
| 39 | −1 | START | 7 | 1 | | | | 1 | | |
| 40 | −1 | START | 8 | 1 | | | | 7 | | |
| 41 | 17 | TEMPERTR | 8 | | | | N | | | |
| 42 | −1 | RDY DMP | 6 | 1 | | | | 6 | | 6 |
| 43 | −1 | REQ DUMP | 1 | 1 | | | | 6 | | 6 |
| 44 | −1 | DUMP | 6 | 1 | | | | 6 | | |
| 45 | 18 | GAIN IN WT | 8 | | 2 | | N | | | |
| 46 | 19 | FLOW | 8 | | 2 | | O | | | |
| 47 | 20 | TEMPERTR | 7 | | | | P | | | |
| 48 | −1 | RDY DMP | 8 | 1 | | | | 8 | | 7 |
| 49 | −1 | REQ DUMP | 7 | 1 | | | | 8 | | 7 |
| 50 | −1 | DUMP | 8 | 1 | | | | 8 | | |
| 51 | 21 | FLOW | 7 | | 2 | | P | | | |
| 52 | 22 | ANALYSIS | 7 | | 1 | 1 | P | | | |
| 53 | −1 | START | 8 | 2 | | | | 7 | | |
| 54 | 23 | GAIN IN WT | 8 | | 2 | | N | | | |
| 55 | 24 | FLOW | 8 | 7 | 2 | | O | | | |
| 56 | −1 | RDY DMP | 8 | 2 | | | | 8 | | 8 |
| 57 | −1 | REQ DUMP | 7 | 2 | | | | 8 | | 8 |
| 58 | −1 | DUMP | 8 | 2 | | | | 8 | | |
| 59 | −1 | START | 8 | 3 | | | | 7 | | |
| 60 | 25 | GAIN IN WT | 8 | | 2 | | N | | | |
| 61 | 26 | FLOW | 8 | | 2 | | O | | | |
| 62 | −1 | RDY DMP | 8 | 3 | | | | 8 | | 9 |
| 63 | −1 | REQ DUMP | 7 | 3 | | | | 8 | | 9 |
| 64 | −1 | DUMP | 8 | 3 | | | | 8 | | |
| 65 | 27 | FLOW | 7 | | 2 | | P | | | |
| 66 | 28 | END LINKED | 7 | | 1 | 2 | P | | | |
| 67 | −1 | RDY DMP | 7 | 1 | | | | 7 | | 10 |
| 68 | −1 | REQ DUMP | 1 | 1 | | | | 7 | | 10 |
| 69 | −1 | DUMP | 7 | 1 | | | | 7 | | |
| 70 | 29 | ANALYSIS | 1 | | 1 | 1 | | | | |
| 71 | −1 | START | 6 | 2 | | | | 1 | | |
| 72 | −1 | START | 3 | 2 | | | | 6 | | |
| 73 | 30 | FLOW | 3 | | 2 | | I | | | |
| 74 | −1 | START | 9 | 2 | | | | 3 | | |
| 75 | 31 | FLOW | 9 | | 2 | | J | | | |
| 76 | 32 | FLOW | 9 | | 2 | | (K) | | | |
| 77 | 33 | GAIN IN WT | 9 | | 2 | | L | | | |
| 78 | −1 | RDY DMP | 9 | 2 | | | | 9 | | 11 |
| 79 | −1 | REQ DUMP | 3 | 2 | | | | 9 | | 11 |
| 80 | −1 | DUMP | 9 | 2 | | | | 9 | | |
| 81 | −1 | RDY DMP | 3 | 2 | | | | 3 | | 12 |
| 82 | −1 | REQ DUMP | 6 | 2 | | | | 3 | | 12 |
| 83 | −1 | DUMP | 3 | 2 | | | | 3 | | |
| 84 | 34 | GAUGE TANK | 6 | | 2 | | M | | | |
| 85 | −1 | RDY DMP | 6 | 2 | | | | 6 | | 13 |
| 86 | −1 | REQ DUMP | 1 | 2 | | | | 6 | | 13 |
| 87 | −1 | DUMP | 6 | 2 | | | | 6 | | |
| 88 | 35 | END LINKED | 1 | | 1 | 2 | | | | |
| 89 | 36 | PUMPOUT | 1 | | 1 | | | | | |
| 90 | 37 | GAUGE TANK | 1 | | 2 | | Q | | | |
| 91 | −1 | START | 10 | 1 | | | | 1 | | |
| 92 | 38 | FLOW | 10 | | 2 | | R | | | |

| | | | Pass Two Results | | | | | |
|---|---|---|---|---|---|---|---|---|---|
| STEP | TASK | FUNCTION | VSL | FSG/ GRP | GRP END/DEF | LINKED CODE | RMI | ASSOC SUBSYS | CONDL START | PAIR ID |
| 93 | −1 | RDY DMP | 10 | 1 | | | | 10 | | 14 |
| 94 | −1 | REQ DUMP | 1 | 1 | | | | 10 | | 14 |
| 95 | −1 | DUMP | 10 | 1 | | | | 10 | | |

8.5.7 Example Recipe Build—Pass Three

Pass three of the recipe builder examines each START step within the recipe to determine if the START step should be made conditional. For each START step that is made conditional, a corresponding INITIATE step must be added to the vessel to which the one containing the START step dumps. The pass three algorithm scans through the steps in the pass two results and performs two basic functions. First, it maintains a flag to indicate whether the steps being examined are currently inside of an analysis task or not. Second it examines each start step encountered, categorizes the start step into one of the five categories shown below and performs the appropriate action:

1. Start Step of Primary Vessel—No Action Required
2. Material Residency Restriction (Not inside Analysis task)—The START step is made conditional and an INITIATE step is inserted immediately prior to the START step.
3. Material Residency Restriction (Inside Analysis Task)—The start step is made conditional, an INITIATE step is inserted immediately prior to the START step, and if this is the first group being formed in this vessel inside the analysis task, the vessel is marked as requiring an END LINKED step when the END LINKED task corresponding to the ANALYSIS task is reached.
4. No Material Residency Restriction and not inside Analysis Task—No Action Required.
5. No Material Residency Restriction (Inside Analysis Task)—If this is the first group to form in this vessel inside of the analysis task, then the start step is made conditional. The corresponding INITIATE step is located immediately after the analysis task, a dump of a previous group from the same vessel, or the start step of the initiation vessel, whichever came last. The vessel is marked as requiring a END LINKED step when the END LINKED task corresponding to the ANALYSIS task is reached.

APPLICATION OF PASS THREE ALGORITHM TO RECIPE BUILD EXAMPLE

Initialization:

The data structures used by the pass three algorithm are initialized
Status:
Inside Analysis Task: No
End Links to Generate: NONE

Step 1

Start—Vessel 1
Start step is located at step location one. Since this is a start step of the primary vessel (case 1), no action is required.
Initial Status:
Inside Analysis Task: NO
End Links to Generate: NONE
Final status:
Inside Analysis Task: NO
End Links to Generate: NONE

| STEP | FUNCTION | VESSEL | LINKED CODE | RMI | ASSOC SUBSYS | |
|---|---|---|---|---|---|---|
| 1 | START | 1 | | | 1 | ←Start Step |

Step 6

Start Step—Vessel 6
No MRR Feeds
Start step located at step location 6. The start stap is not inside of an Analysis Task, and there are no Material Residency. Restrictions inside of the vessel's group (case 4), so no action is required.
Initial Status:
Inside Analysis Task: NO
End Links to Generate: NONE
Final status:
Inside Analysis Task: NO
End Links to Generate: NONE

| STEP | FUNCTION | VESSEL | LINKED CODE | RMI | ASSOC SUBSYS | |
|---|---|---|---|---|---|---|
| 6 | START | 6 | | | 1 | ←Start Step |
| 7 | START | 2 | | | 6 | |
| 8 | FLOW | 2 | C | | | |
| 9 | START | 4 | | | 2 | |
| 10 | GAUGE TANK | 4 | (E) | | | ←MRR not in same Vsi |
| 11 | FLOW | 4 | F | | | |
| 12 | START | 5 | | | 2 | |

-continued

| STEP | FUNCTION | VESSEL | LINKED CODE | RMI | ASSOC SUBSYS | |
|---|---|---|---|---|---|---|
| 13 | RDY DUMP | 4 | | | 4 | |
| 14 | REQ DUMP | 2 | | | 4 | |
| 15 | DUMP | 4 | | | 4 | |
| 16 | GAIN IN WT | 5 | | G | | |
| 17 | AGITATOR | 2 | | H | | |
| 18 | RDY DUMP | 5 | | | 5 | |
| 19 | REQ DUMP | 2 | | | 5 | |
| 20 | DUMP | 5 | | | 5 | |
| 21 | FLOW | 2 | | H | | |
| 22 | START | 3 | | | 6 | |
| 23 | AGITATOR | 3 | | I | | |
| 24 | RDY DUMP | 2 | | | 2 | |
| 25 | REQ DUMP | 6 | | | 2 | ←Non Mat Feed Task |
| 26 | DUMP | 2 | | | 2 | |
| 27 | FLOW | 3 | | I | | |
| 28 | START | 9 | | | 3 | |
| 29 | FLOW | 9 | | J | | |
| 30 | FLOW | 9 | | (K) | | ←MRR not in same Vsi |
| 31 | GAIN IN WT | 9 | | L | | |
| 32 | RDY DUMP | 9 | | | 9 | |
| 33 | REQ DUMP | 3 | | | 9 | |
| 34 | DUMP | 9 | | | 9 | |
| 35 | RDY DUMP | 3 | | | 3 | |
| 36 | REQ DUMP | 6 | | | 3 | ←Non-Mat Feed Task |
| 37 | DUMP | 3 | | | 3 | |
| 38 | GAUGE TANK | 6 | | M | | ←Non MRR Feed |
| 39 | START | 7 | | | 1 | |
| 40 | START | 8 | | | 7 | |
| 41 | TEMPERTR | 8 | | N | | |
| 42 | RDY DUMP | 6 | | | 6 | ←Non Mat Feed Task |
| 43 | REQ DUMP | 1 | | | 6 | |
| 44 | DUMP | 6 | | | 6 | ←Corresponding Dump |

Step 7

End Links to Generate: NONE

| STEP | FUNCTION | VESSEL | LINKED CODE | RMI | ASSOC SUBSYS | |
|---|---|---|---|---|---|---|
| 7 | START | 2 | | | 6 | ←Start Step |
| 8 | FLOW | 2 | | C | | ←Non MRR Feed |
| 9 | START | 4 | | | 2 | |
| 10 | GAUGE TANK | 4 | | (E) | | ←MRR not in same Vsi |
| 11 | FLOW | 4 | | F | | |
| 12 | START | 5 | | | 2 | |
| 13 | RDY DUMP | 4 | | | 4 | |
| 14 | REQ DUMP | 2 | | | 4 | ←Non Mat Feed Task |
| 15 | DUMP | 4 | | | 4 | |
| 16 | GAIN IN WT | 5 | | G | | |
| 17 | AGITATOR | 2 | | H | | ←Non Mat Feed Task |
| 18 | RDY DUMP | 5 | | | 5 | |
| 19 | REQ DUMP | 2 | | | 5 | ←Non Mat Feed Task |
| 20 | DUMP | 5 | | | 5 | |
| 21 | FLOW | 2 | | H | | ←Non MRR Feed |
| 22 | START | 3 | | | 6 | |
| 23 | AGITATOR | 3 | | I | | |
| 24 | RDY DUMP | 2 | | | 2 | ←Non Mat Feed Task |
| 25 | REQ DUMP | 6 | | | 2 | |
| 26 | DUMP | 2 | | | 2 | ←Corresponding Dump |

Start Step—Vessel 2
No MRR Feeds
Start step located at step location 7. The start step The start step is not inside of an Analysis Task, and there are no Material Residency Restrictions (case 4), so no action is required.
Initial Status:
Inside Analysis Task: NO
End Links to Generate: NONE
Final Status:
Inside Analysis Task: NO Step 9

Start Step—Vessel 4
MRR Feed
Start step located at step location 9. The start step is not inside of an Analysis Task, but there is a feed with a material residency restriction inside of the group (case 2). The start step is made conditional and an initiate secondary is inserted into the recipe immediately prior to the start step.
Initial Status:
Inside Analysis Task: NO End Links to Generate: NONE
Final Status:
Inside Analysis Task: NO
End Links to Generate: NONE

| STEP | FUNCTION | VESSEL | LINKED CODE | RMI | ASSOC SUBSYS | |
|------|----------|--------|-------------|-----|--------------|---|
| 9 | START | 4 | | | 2 | ←Start Step |
| 10 | GAUGE TANK | 4 | | (E) | | ←MRR Feed |
| 11 | FLOW | 4 | | F | | ←Non MRR Feed |
| 12 | START | 5 | | | 2 | |
| 13 | RDY DUMP | 4 | | | 4 | ←Non Mat Feed Task |
| 14 | REQ DUMP | 2 | | | 4 | |
| 15 | DUMP | 4 | | | 4 | ←Corresponding Dump |

Start Step—Vessel 5

No MRR Feeds

Start step located at step location 12. The start step is not inside of an Analysis Task and there are no material residency restrictions (case 4), so no action is necessary.
Initial Status:
Inside Analysis Task: NO
End Links to Generate: NONE
Final Status:
Inside Analysis Task: NO
End Links to Generate: NONE Start step located at step location 22. The start step is not inside of an Analysis Task and there are no material residency restrictions (case 4), so no action is necessary.
Initial Status:
Inside Analysis Task: NO
End Links to Generate: NONE
Final Status:
Inside Analysis Task: NO
End Links to Generate: NONE

| STEP | FUNCTION | VESSEL | LINKED CODE | RMI | ASSOC SUBSYS | |
|------|----------|--------|-------------|-----|--------------|---|
| 12 | START | 5 | | | 2 | ←Start Step |
| 13 | RDY DUMP | 4 | | | 4 | |
| 14 | REQ DUMP | 2 | | | 4 | |
| 15 | DUMP | 4 | | | 4 | |
| 16 | GAIN IN WT | 5 | | G | | ←Non MRR Feed |
| 17 | AGITATOR | 2 | | H | | |
| 18 | RDY DUMP | 5 | | | 5 | ←Non Mat Feed Task |
| 19 | REQ DUMP | 2 | | | 5 | |
| 20 | DUMP | 5 | | | 5 | ←Corresponding Dump |

Step 22

| STEP | FUNCTION | VESSEL | LINKED CODE | RMI | ASSOC SUBSYS | |
|------|----------|--------|-------------|-----|--------------|---|
| 22 | START | 3 | | | 6 | ←Start Step |
| 23 | AGITATOR | 3 | | I | | ←Non Mat Feed Task |
| 24 | RDY DUMP | 2 | | | 2 | |
| 25 | REQ DUMP | 6 | | | 2 | |
| 26 | DUMP | 2 | | | 2 | |
| 27 | FLOW | 3 | | I | | ←Non MRR Feed |
| 28 | START | 9 | | | 3 | |
| 29 | FLOW | 9 | | J | | |
| 30 | FLOW | 9 | | (K) | | |
| 31 | GAIN IN WT | 9 | | L | | |
| 32 | RDY DUMP | 9 | | | 9 | |
| 33 | REQ DUMP | 3 | | | 9 | ←Non Mat Feed Task |
| 34 | DUMP | 9 | | | 9 | |
| 35 | RDY DUMP | 3 | | | 3 | ←Non Mat Feed Task |
| 36 | REQ DUMP | 6 | | | 3 | |
| 37 | DUMP | 3 | | | 3 | ←Corresponding Dump |

Step 28

Start Step—Vessel 3
No MRR Feeds

Start Step—Vessel 9
MRR Feed

Start step located at step location 28. The start step is not inside of an Analysis Task, but there is a material residency, restricted feed (case 2). The start step is made conditional and an INITIATE step is inserted immediately prior to the START step.
Initial Status:
Inside Analysis Task: NO
End Links to Generate: NONE

| STEP | FUNCTION | VESSEL | LINKED CODE | RMI | ASSOC SUBSYS | |
|------|----------|--------|-------------|-----|--------------|---|
| 28 | START | 9 | | | 3 | ←Start Step |
| 29 | FLOW | 9 | | J | | ←Non MRR Feed |
| 30 | FLOW | 9 | | (K) | | ←MRR Feed |
| 31 | GAIN IN WT | 9 | | L | | ←Non MRR Feed |
| 32 | RDY DUMP | 9 | | | 9 | ←Non Mat Feed Task |
| 33 | REQ DUMP | 3 | | | 9 | |
| 34 | DUMP | 9 | | | 9 | ←Corresponding Dump |

Step 39

Start Step—Vessel 7
No MRR Feeds
Start step located at step location 39. The start step is not inside of an Analysis Task, and there are no material residency restrictions (case 4), so no action is necessary.
Initial Status:
Inside Analysis Task: NO
End Links to Generate: NONE
Final Status:
Inside Analysis Task: NO
End Links to Generate: NONE No MRR Feeds
Start step located at step location 40. The start step is not inside of an Analysis Task, and there are no material residency restrictions (case 4), so no action is necessary.
Initial Status:
Inside Analysis Task: NO
End Links to Generate: NONE
Final Status:
Inside Analysis Task: NO
End Links to Generate: NONE

| STEP | FUNCTION | VESSEL | LINKED CODE | RMI | ASSOC SUBSYS | |
|------|----------|--------|-------------|-----|--------------|---|
| 39 | START | 7 | | | 1 | ←Start Step |
| 40 | START | 8 | | | 7 | |
| 41 | TEMPERTR | 8 | | N | | |
| 42 | RDY DUMP | 6 | | | 6 | |
| 43 | REQ DUMP | 1 | | | 6 | |
| 44 | DUMP | 6 | | | 6 | |
| 45 | GAIN IN WT | 8 | | N | | |
| 46 | FLOW | 8 | | O | | |
| 47 | TEMPERTR | 7 | | P | | ←Non Mat Feed Task |
| 48 | RDY DUMP | 8 | | | 8 | |
| 49 | REQ DUMP | 7 | | | 8 | ←Non Mat Feed Task |
| 50 | DUMP | 8 | | | 8 | |
| 51 | FLOW | 7 | | P | | ←Non MRR Feed |
| 52 | ANALYSIS | 7 | 1 | P | | ←Non Mat Feed Task |
| 53 | START | 8 | | | 7 | |
| 54 | GAIN IN WT | 8 | | N | | |
| 55 | FLOW | 8 | | O | | |
| 56 | RDY DUMP | 8 | | | 8 | |
| 57 | REQ DUMP | 7 | | | 8 | ←Non Mat Feed Task |
| 58 | DUMP | a | | | 8 | |
| 59 | START | 8 | | | 7 | |
| 60 | GAIN IN WT | 8 | | N | | |
| 61 | FLOW | 8 | | O | | |
| 62 | RDY DUMP | 8 | | | 8 | |
| 63 | REQ DUMP | 7 | | | 8 | ←Non Mat Feed Task |
| 64 | DUMP | 8 | | | 8 | |
| 65 | FLOW | 7 | | P | | ←Non MRR Feed |
| 66 | END LINKED | 7 | 2 | P | | ←Non Mat Feed Task |
| 67 | RDY DUMP | 7 | | | 7 | ←Non Mat Feed Task |
| 68 | REQ DUMP | 1 | | | 7 | |
| 69 | DUMP | 7 | | | 7 | ←Corresponding Dump |

Step 40

Start Step—Vessel 8

| STEP | FUNCTION | VESSEL | LINKED CODE | RMI | ASSOC SUBSYS | |
|------|----------|--------|-------------|-----|--------------|---|
| 40 | START | 8 | | | 7 | ←Start Step Detected |
| 41 | TEMPERTR | 8 | | N | | ←Non Mat Feed Task |
| 42 | RDY DUMP | 6 | | | 6 | |
| 43 | REQ DUMP | 1 | | | 6 | |
| 44 | DUMP | 6 | | | 6 | |
| 45 | GAIN IN WT | 8 | | N | | ←Non MRR Feed |
| 46 | FLOW | 8 | | O | | ←Non MRR Feed |
| 47 | TEMPERTR | 7 | | P | | |
| 48 | RDY DUMP | 8 | | | 8 | ←Non Mat Feed Task |
| 49 | REQ DUMP | 7 | | | 8 | |
| 50 | DUMP | 8 | | | 8 | ←Corresponding Dump |

Step 52

Analysis Step—Vessel 7
Analysis step located at step location 52. The analysis vessel is set as vessel 7, and the list of vessels requiring additional end linked steps is set to none.
Initial Status:
Inside Analysis Task: NO
End Links to Generate: NONE
Final Status:
Inside Analysis Task: YES
Analysis Vessel: 7
End Links to Generate: NONE

| STEP | FUNCTION | VESSEL | LINKED CODE | RMI | ASSOC SUBSYS | |
|------|----------|--------|-------------|-----|--------------|---|
| 52 | ANALYSIS | 7 | 1 | P | | ←Analysis Step Detected |

Step 53

Start Step—Vessel 8
No MRR Feeds
Start step located at step location 53. The start step is inside of an Analysis Task, but there are no material residency restrictions (case 5). Since this is the first group to form in this vessel inside of this analysis task (i.e. vessel 8 has not been placed into the list of vessels requiring end linked steps), we make the start step conditional. Then we search backward until we detect either the analysis task, a previous dump of the same vessel, or the start step of the initiation vessel. In this case, the analysis task is located first. The initiate secondary is placed immediately after the Analysis step.
Initial Status:
Inside Analysis Task: YES
Analysis Vessel: 7
End Links to Generate: NONE
Final Status:
Inside Analysis Task: YES Analysis Vessel: 7
End Links to Generate: Vessel 8

| STEP | FUNCTION | VESSEL | LINKED CODE | RMI | ASSOC SUBSYS | |
|------|----------|--------|-------------|-----|--------------|---|
| 52 | ANALYSIS | 7 | 1 | P | | ←Prior Analysis Step |
| 53 | START | 8 | | | 7 | ←Start Step |
| 54 | GAIN IN WT | 8 | | N | | ←Non MRR Feed |
| 55 | FLOW | 8 | | O | | ←Non MRR Feed |
| 56 | RDY DUMP | 8 | | | 8 | ←Non Mat Feed Task |
| 57 | REQ DUMP | 7 | | | 8 | |
| 58 | DUMP | 8 | | | 8 | ←Corresponding Dump |

Step 59

Start Step—Vessel 8
No MRR Feeds
Start step located at step location 53. The start step is inside of an Analysis Task, but there are no material residency restrictions (case 5). Since this is NOT the first group to form in this vessel inside of this analysis task (i.e. vessel 8 has been placed into the list of vessels requiring end linked steps), no action is required.
Initial Status:
Inside Analysis Task: YES
Analysis Vessel: 7
End Links to Generate: Vessel 8 .
Final Status:
Inside Analysis Task: YES
End Links to Generate: Vessel 8

| STEP | FUNCTION | VESSEL | LINKED CODE | RMI | ASSOC SUBSYS | |
|---|---|---|---|---|---|---|
| 59 | START | 8 | | | 7 | ←Start Step |
| 60 | GAIN IN WT | 8 | | N | | ←Non MRR Feed |
| 61 | FLOW | 8 | | O | | ←Non MRR Feed |
| 62 | RDY DUMP | 8 | | | 8 | ←Non Mat Feed Task |
| 63 | REQ DUMP | 7 | | | 8 | |
| 64 | DUMP | 8 | | | 8 | ←Corresponding Dump |

Step 65

End Linked Step—Vessel 7

End Linked step located at step location 65. The only vessel in the list of vessels requiring end linked steps is vessel 8, so an End Linked step for vessel 8 is inserted into the recipe immediately prior to the End Linked step for vessel 7. The inside analysis task flag is then turned off. The list of vessels in the End Linked Step required list is reset to none.

Initial Status:
Inside Analysis Task: YES
Analysis Vessel: 7
End Links to Generate: Vessel 8
Final Status:
Inside Analysis Task: NO
End Links to Generate: NONE Start Step—Vessel 6
No MRR Feeds
Start step located at step location 71. The start step is inside of an analysis task, but there are no material residency restrictions (case 5). Since this is the first group to form in this vessel inside of this analysis task (i.e. vessel 6 has not been placed into the list of vessels requiring end linked steps), we make the start step conditional. Then we search backward until we detect either the analysis task, a previous dump of the same vessel, or the start step of the initiation vessel. In this case, the analysis task is located first. The initiate secondary is placed immediately after the Analysis step.

Initial Status:
Inside Analysis Task: YES
Analysis Vessel: 1
End Links to Generate: NONE

| STEP | FUNCTION | VESSEL | LINKED CODE | RMI | ASSOC SUBSYS | |
|---|---|---|---|---|---|---|
| 66 | END LINKED | 7 | 2 | P | | ←End Linked Step |

Step 70

Analysis Step—Vessel 1
Analysis step located at step location 70. The inside analysis task flag is turned on and the list of vessels requiring end linked steps is initialized to none.
Initial Status:
Inside Analysis Task: NO
End Links to Generate: NONE
Final Status:
Inside Analysis Task: YES
Analysis Vessel: 1
End Links to Generate: NONE Final Status:
Inside Analysis Task: YES
Analysis Vessel: 1
End Links to Generate: Vessel 6

| STEP | FUNCTION | VESSEL | LINKED CODE | RMI | ASSOC SUBSYS | |
|---|---|---|---|---|---|---|
| 70 | ANALYSIS | 1 | 1 | | | ←Analysis Step |

Step 71

| STEP | FUNCTION | VESSEL | LINKED CODE | RMI | ASSOC SUBSYS | |
|---|---|---|---|---|---|---|
| 70 | ANALYSIS | 1 | 1 | | | ←Prior Analysis Step |
| 71 | START | 6 | | | 1 | ←Start Step |
| 72 | START | 3 | | | 6 | |
| 73 | FLOW | 3 | | I | | |
| 74 | START | 9 | | | 3 | |
| 75 | FLOW | 9 | | J | | |
| 76 | FLOW | 9 | | (K) | | ←MRR feed in other vsl |

-continued

| STEP | FUNCTION | VESSEL | LINKED CODE | RMI | ASSOC SUBSYS | |
|------|----------|--------|-------------|-----|--------------|---|
| 77 | GAIN IN WT | 9 | | L | | |
| 78 | RDY DUMP | 9 | | | 9 | |
| 79 | REQ DUMP | 3 | | | 9 | |
| 80 | DUMP | 9 | | | 9 | |
| 81 | RDY DUMP | 3 | | | 3 | |
| 82 | REQ DUMP | 6 | | | 3 | ←Non Mat Feed Task |
| 83 | DUMP | 3 | | | 3 | |
| 84 | GAUGE TANK | 6 | | M | | ←Non MRR Feed |
| 85 | RDY DUMP | 6 | | | 6 | ←Non Mat Feed Task |
| 86 | REQ DUMP | 1 | | | 6 | |
| 87 | DUMP | 6 | | | 6 | ←Corresponding Dump |

Step 72

Start Step—Vessel 3
No MRR Feeds
Start step licated at step location 72. The start step is inside of an analysis task, but there are no material residency restrictions (case 5). Since this is the first group to form in this vessel inside of this analysis task (i.e. vessel 3 has not been placed into the list of vessels requiring end linked steps), we make the start step conditional. Then we search backward until we detect either the analysis task, a previous dump of the same vessel, or the start step of the initiation vessel. In this case, the start step of the initiation vessel is located first. The initiate secondary is placed immediately after the initiation vessel start step. Vessel 3 is then placed into the list of vessels requiring an end linked step to be generated.
Initial Status:
Inside Analysis Task: YES
Analysis Vessel: 1
End Links to Generate: Vessel 6
Final Status:
Inside Analysis Task: YES
Analysis Vessel: 1
End Links to Generate: Vessel 6, Vessel 3

Start Step—Vessel 9
MRR Feed
Start step located at step location 74. The start step is inside of an analysis task, and there is a material residency restriction (case 3). The start step is made conditional. Because of the material residency restriction, the initiation step is placed immediately prior to the start step for vessel 9. Vessel 9 is then placed into the list of vessels requiring an end linked step to be generated.
Initial Status:
Inside Analysis Task: YES
Analysis Vessel: 1
End Links to Generate: Vessel 6, Vessel 3
Final Status:
Inside Analysis Task: YES
Analysis Vessel: 1
End Links to Generate: Vessel 6, Vessel 3, Vessel 9.

| STEP | FUNCTION | VESSEL | LINKED CODE | RMI | ASSOC SUBSYS | |
|------|----------|--------|-------------|-----|--------------|---|
| 71 | START | 6 | | | 1 | ←Initiation Vessel Start |
| 72 | START | 3 | | | 6 | ←Start Step |
| 73 | FLOW | 3 | | I | | ←Non MRR Feed |
| 74 | START | 9 | | | 3 | |
| 75 | FLOW | 9 | | J | | |
| 76 | FLOW | 9 | | (K) | | ←MRR feed in other vsl |
| 77 | GAIN IN WT | 9 | | L | | |
| 78 | RDY DUMP | 9 | | | 9 | |
| 79 | REQ DUMP | 3 | | | 9 | ←Non Mat Feed Task |
| 80 | DUMP | 9 | | | 9 | |
| 81 | RDY DUMP | 3 | | | 3 | ←Non Mat Feed Task |
| 82 | REQ DUMP | 6 | | | 3 | |
| 83 | DUMP | 3 | | | 3 | ←Corresponding Dump |

Step 74

| STEP | FUNCTION | VESSEL | LINKED CODE | RMI | ASSOC SUBSYS | |
|------|----------|--------|-------------|-----|--------------|---|
| 74 | START | 9 | | | 3 | ←Start Step |
| 75 | FLOW | 9 | | J | | ←Non MRR Feed |
| 76 | FLOW | 9 | | (K) | | ←MRR Feed |
| 77 | GAIN IN WT | 9 | | L | | ←Non MRR Feed |
| 78 | RDY DUMP | 9 | | | 9 | ←Non Mat Feed Task |

| STEP | FUNCTION | VESSEL | LINKED CODE | RMI | ASSOC SUBSYS | |
|------|----------|--------|-------------|-----|--------------|---|
| 79   | REQ DUMP | 3      |             |     | 9            |   |
| 80   | JUMP     | 9      |             |     | 9            | ←Corresponding Dump |

Step 88

End Linked Step—Vessel 1
End Linked step located at step location 88. Vessels 3, 9, and 6 are in the list of vessels requiring end linked steps. End Linked steps for these vessels are inserted prior to the End Linked step for vessel 1. The list of vessels requiring End Linked steps is reset to none.
Initial Status:
Inside Analysis Task: YES
Analysis Vessel: 1
End Links to Generate: Vessel 6, Vessel 3. Vessel 9
Final Status:
Inside Analysis Task: NO
End Links to Generate: NONE

| STEP | FUNCTION | VESSEL | LINKED CODE | RMI | ASSOC SUBSYS | |
|------|----------|--------|-------------|-----|--------------|---|
| 88   | END LINKED | 1    | 2           |     |              | ←End Linked Step |

Step 91

Start Step—Vessel 10
No MRR Feeds
Start step located at step location 91. The start step is not inside of an Analysis Task, and there are no Material Residency Restrictions inside of the vessel's group (case 4), so no action is required.
Initial Status:
Inside Analysis Task: NO
End Links to Generate: NONE
Final Status:
Inside Analysis Task: NO
End Links to Generate: NONE

| STEP | FUNCTION | VESSEL | LINKED CODE | RMI | ASSOC SUBSYS | |
|------|----------|--------|-------------|-----|--------------|---|
| 91   | START    | 10     |             |     | 1            | ←Start Step |
| 92   | FLOW     | 10     |             | R   |              | ←Non MRR Feed |
| 93   | RDY DUMP | 10     |             |     | 10           | ←Non Mat Feed Task |
| 94   | REQ DUMP | 1      |             |     | 10           |   |
| 95   | DUMP     | 10     |             |     | 10           | ←Corresponding Dump |

There are no more START, ANALYSIS, or END LINKED steps in the pass 2 results, so pass three of the recipe builder algorithm has now been completed. The output of the pass 3 algorithm on our example recipe build is shown below. Modifications from the Pass 2 results are shown in bold text for clarity.

| | | | | Pass Three Results | | | | | |
|---|---|---|---|---|---|---|---|---|---|
| STEP | TASK | FUNCTION | VSL | FSG/ GRP | GRP END/DEF | LINKED CODE | RMI | ASSOC SUBSYS | CONDL START | PAIR ID |
| 1 | −1 | START | 1 | 1 | | | | 1 | | |
| 2 | 1 | AGITATOR | 1 | | | | | | | |
| 3 | 2 | FLOW | 1 | | 2 | | A | | | |
| 4 | 3 | GAIN IN WT | 1 | | 2 | | B | | | |
| 5 | 4 | TEMPERTR | 1 | | | | | | | |
| 6 | −1 | START | 6 | 1 | | | | 1 | | |
| 7 | −1 | START | 2 | 1 | | | | 6 | | |
| 8 | 5 | FLOW | 2 | | 2 | | C | | | |
| 9 | −1 | INIT 2ND | 2 | 1 | | | | 4 | | 15 |
| 10 | −1 | START | 4 | 1 | | | | 2 | 1 | 15 |
| 11 | 6 | GAUGE TANK | 4 | | 2 | | (E) | | | |
| 12 | 7 | FLOW | 4 | | 2 | | F | | | |
| 13 | −1 | START | 5 | 1 | | | | 2 | | |
| 14 | −1 | RDY DUMP | 4 | 1 | | | | 4 | | 1 |
| 15 | −1 | REQ DUMP | 2 | 1 | | | | 4 | | 1 |
| 16 | −1 | DUMP | 4 | 1 | | | | 4 | | |
| 17 | 8 | GAIN IN WT | 5 | | 2 | | G | | | |
| 18 | 9 | AGITATOR | 2 | | | | H | | | |
| 19 | −1 | RDY DUMP | 5 | 1 | | | | 5 | | 2 |
| 20 | −1 | REQ DUMP | 2 | 1 | | | | 5 | | 2 |
| 21 | −1 | DUMP | 5 | 1 | | | | 5 | | |
| 22 | 10 | FLOW | 2 | | 2 | | H | | | |
| 23 | −1 | START | 3 | 1 | | | | 6 | | |
| 24 | 11 | AGITATOR | 3 | | | | I | | | |
| 25 | −1 | RDY DUMP | 2 | 1 | | | | 2 | | 3 |
| 26 | −1 | REQ DUMP | 6 | 1 | | | | 2 | | 3 |
| 27 | −1 | DUMP | 2 | 1 | | | | 2 | | |
| 28 | 12 | FLOW | 3 | | 2 | | I | | | |
| 29 | −1 | INIT 2ND | 3 | 1 | | | | 9 | | 16 |
| 30 | −1 | START | 9 | 1 | | | | 3 | 1 | 16 |
| 31 | 13 | FLOW | 9 | | 2 | | J | | | |
| 32 | 14 | FLOW | 9 | | 2 | | (K) | | | |
| 33 | 15 | GAIN IN WT | 9 | | 2 | | L | | | |
| 34 | −1 | RDY DUMP | 9 | 1 | | | | 9 | | 4 |
| 35 | −1 | REQ DUMP | 3 | 1 | | | | 9 | | 4 |
| 36 | −1 | DUMP | 9 | 1 | | | | 9 | | |
| 37 | −1 | RDY DUMP | 3 | 1 | | | | 3 | | 5 |
| 38 | −1 | REQ DUMP | 6 | 1 | | | | 3 | | 5 |
| 39 | −1 | DUMP | 3 | 1 | | | | 3 | | |
| 40 | 16 | GAUGE TANK | 6 | | 2 | | M | | | |
| 41 | −1 | START | 7 | 1 | | | | 1 | | |
| 42 | −1 | START | 8 | 1 | | | | 7 | | |
| 43 | 17 | TEMPERTR | 8 | | | | N | | | |
| 44 | −1 | RDY DUMP | 6 | 1 | | | | 6 | | 6 |
| 45 | −1 | REQ DUMP | 1 | 1 | | | | 6 | | 6 |
| 46 | −1 | DUMP | 6 | 1 | | | | 6 | | |
| 47 | 18 | GAIN IN WT | 8 | | 2 | | N | | | |
| 48 | 19 | FLOW | 8 | | 2 | | O | | | |
| 49 | 20 | TEMPERTR | 7 | | | | P | | | |
| 50 | −1 | RDY DUMP | 8 | 1 | | | | 8 | | 7 |
| 51 | −1 | REQ DUMP | 7 | 1 | | | | 8 | | 7 |
| 52 | −1 | DUMP | 8 | 1 | | | | 8 | | |
| 53 | 21 | FLOW | 7 | | 2 | | P | | | |
| 54 | 22 | ANALYSIS | 7 | | 1 | 1 | P | | | 17 |
| 55 | −1 | INIT 2ND | 7 | 2 | | | | 8 | | 18 |
| 56 | −1 | START | 8 | 2 | | | | 7 | 1 | 18 |
| 57 | 23 | GAIN IN WT | 8 | | 2 | | N | | | |
| 58 | 24 | FLOW | 8 | 7 | 2 | | O | | | |
| 59 | −1 | RDY DUMP | 8 | 2 | | | | 8 | | 8 |
| 60 | −1 | REQ DUMP | 7 | 2 | | | | 8 | | 8 |
| 61 | −1 | DUMP | 8 | 2 | | | | 8 | | |
| 62 | −1 | START | 8 | 3 | | | | 7 | | |
| 63 | 25 | GAIN IN WT | 8 | | 2 | | N | | | |
| 64 | 26 | FLOW | 8 | | 2 | | O | | | |
| 65 | −1 | RDY DUMP | 8 | 3 | | | | 8 | | 9 |
| 66 | −1 | REQ DUMP | 7 | 3 | | | | 8 | | 9 |
| 67 | −1 | DUMP | 8 | 3 | | | | 8 | | |
| 68 | 27 | FLOW | 7 | | 2 | | P | | | |
| 69 | −1 | END LNKD | 8 | 2 | | | | | | |
| 70 | 28 | END LINKED | 7 | | 1 | 2 | P | | | 17 |
| 71 | −1 | RDY DUMP | 7 | 1 | | | | 7 | | 10 |
| 72 | −1 | REQ DUMP | 1 | 1 | | | | 7 | | 10 |
| 73 | −1 | DUMP | 7 | 1 | | | | 7 | | |
| 74 | 29 | ANALYSIS | 1 | | 1 | 1 | | | | 19 |
| 75 | −1 | INIT 2ND | 1 | 2 | | | | 6 | | 20 |

|  |  |  |  | Pass Three Results | | | | | | |
|---|---|---|---|---|---|---|---|---|---|---|
| STEP | TASK | FUNCTION | VSL | FSG/ GRP | GRP END/DEF | LINKED CODE | RMI | ASSOC SUBSYS | CONDL START | PAIR ID |
| 76 | −1 | START | 6 | 2 |  |  |  | 1 | 1 | 20 |
| 77 | −1 | INIT 2ND | 6 | 2 |  |  |  | 3 |  | 21 |
| 78 | −1 | START | 3 | 2 |  |  |  | 6 | 1 | 21 |
| 79 | 30 | FLOW | 3 |  | 2 |  | I |  |  |  |
| 80 | −1 | INIT 2ND | 3 | 2 |  |  |  | 9 |  | 22 |
| 81 | −1 | START | 9 | 2 |  |  |  | 3 | 1 | 22 |
| 82 | 31 | FLOW | 9 |  | 2 |  | J |  |  |  |
| 83 | 32 | FLOW | 9 |  | 2 |  | (K) |  |  |  |
| 84 | 33 | GAIN IN WT | 9 |  | 2 |  | L |  |  |  |
| 85 | −1 | RDY DUMP | 9 | 2 |  |  |  | 9 |  | 11 |
| 86 | −1 | REQ DUMP | 3 | 2 |  |  |  | 9 |  | 11 |
| 87 | −1 | DUMP | 9 | 2 |  |  |  | 9 |  |  |
| 88 | −1 | RDY DUMP | 3 | 2 |  |  |  | 3 |  | 12 |
| 89 | −1 | REQ DUMP | 6 | 2 |  |  |  | 3 |  | 12 |
| 90 | −1 | DUMP | 3 | 2 |  |  |  | 3 |  |  |
| 91 | 34 | GAUGE TANK | 6 |  | 2 |  | M |  |  |  |
| 92 | −1 | RDY DUMP | 6 | 2 |  |  |  | 6 |  | 13 |
| 93 | −1 | REQ DUMP | 1 | 2 |  |  |  | 6 |  | 13 |
| 94 | −1 | DUMP | 6 | 2 |  |  |  | 6 |  |  |
| 95 | −1 | END LNKD | 3 | 2 |  |  |  |  |  |  |
| 96 | −1 | END LNKD | 6 | 2 |  |  |  |  |  |  |
| 97 | −1 | END LNKD | 9 | 2 |  |  |  |  |  |  |
| 98 | 35 | END LINKED | 1 |  | 1 | 2 |  |  |  | 19 |
| 99 | 36 | PUMPOUT | 1 |  | 1 |  |  |  |  |  |
| 100 | 37 | GAUGE TANK | 1 |  | 2 |  | Q |  |  |  |
| 101 | −1 | START | 10 | 1 |  |  |  | 1 |  |  |
| 102 | 38 | FLOW | 10 |  | 2 |  | R |  |  |  |
| 103 | −1 | RDY DUMP | 10 | 1 |  |  |  | 10 |  | 14 |
| 104 | −1 | REQ DUMP | 1 | 1 |  |  |  | 10 |  | 14 |
| 105 | −1 | DUMP | 10 | 1 |  |  |  | 10 |  |  |

8.5.8 Example Recipe Build—Pass Four

Pass four of the recipe builder simply sorts all the steps in the pass three results according to the vessel they are located in. Steps located in vessel 1 come first, and steps located in vessel 20 come last.

|  |  |  |  | Pass Four Results | | | | | | |
|---|---|---|---|---|---|---|---|---|---|---|
| STEP | TASK | FUNCTION | VSL | FSG/ GRP | GRP END/DEF | LINKED CODE | RMI | ASSOC SUBSYS | CONDL START | PAIR ID |
| 1 | −1 | START | 1 | 1 |  |  |  | 1 |  |  |
| 2 | 1 | AGITATOR | 1 |  |  |  |  |  |  |  |
| 3 | 2 | FLOW | 1 |  | 2 |  | 65 |  |  |  |
| 4 | 3 | GIW FEED | 1 |  | 2 |  | 71 |  |  |  |
| 5 | 4 | TEMPERTR | 1 |  |  |  |  |  |  |  |
| 6 | −1 | REQ DUMP | 1 | 1 |  |  |  | 6 |  | 6 |
| 7 | −1 | REQ DUMP | 1 | 1 |  |  |  | 7 |  | 10 |
| 8 | 29 | ANALYSIS | 1 |  | 1 | 1 |  |  |  | 19 |
| 9 | −1 | INIT 2ND | 1 | 2 |  |  |  | 6 |  | 20 |
| 10 | −1 | REQ DUMP | 1 | 2 |  |  |  | 6 |  | 13 |
| 11 | 35 | END LINKED | 1 |  | 1 | 2 |  |  |  | 19 |
| 12 | 36 | PUMPOUT | 1 |  | 1 |  |  |  |  |  |
| 13 | 37 | GTD FEED | 1 |  | 2 |  | 85 |  |  |  |
| 14 | −1 | REQ DUMP | 1 | 1 |  |  |  | 10 |  | 14 |
| 15 | −1 | START | 2 | 1 |  |  |  | 6 |  |  |
| 16 | 5 | FLOW | 2 |  | 2 |  | 72 |  |  |  |
| 17 | −1 | INIT 2ND | 2 | 1 |  |  |  | 4 |  | 15 |
| 18 | −1 | REQ DUMP | 2 | 1 |  |  |  | 4 |  | 1 |
| 19 | 9 | AGITATOR | 2 |  |  |  |  |  |  |  |
| 20 | −1 | REQ DUMP | 2 | 1 |  |  |  | 5 |  | 2 |
| 21 | 10 | FLOW | 2 |  | 2 |  | 76 |  |  |  |
| 22 | −1 | RDY DUMP | 2 | 1 |  |  |  | 2 |  | 3 |
| 23 | −1 | DUMP | 2 | 1 |  |  |  | 2 |  |  |
| 24 | −1 | START | 3 | 1 |  |  |  | 6 |  |  |
| 25 | 11 | AGITATOR | 3 |  |  |  |  |  |  |  |
| 26 | 12 | FLOW | 3 |  | 2 |  | 77 |  |  |  |
| 27 | −1 | INIT 2ND | 3 | 1 |  |  |  | 9 |  | 16 |
| 28 | −1 | REQ DUMP | 3 | 1 |  |  |  | 9 |  | 4 |

| STEP | TASK | FUNCTION | VSL | FSG/ GRP | GRP END/DEF | LINKED CODE | RMI | ASSOC SUBSYS | CONDL START | PAIR ID |
|---|---|---|---|---|---|---|---|---|---|---|
| | | | | | Pass Four Results | | | | | |
| 29 | −1 | RDY DUMP | 3 | 1 | | | | 3 | | 5 |
| 30 | −1 | DUMP | 3 | 1 | | | | 3 | | |
| 31 | −1 | START | 3 | 2 | | | | 6 | 1 | 21 |
| 32 | 30 | FLOW | 3 | | 2 | | 77 | | | |
| 33 | −1 | INIT 2ND | 3 | 2 | | | | 9 | | 22 |
| 34 | −1 | REQ DUMP | 3 | 2 | | | | 9 | | 11 |
| 35 | −1 | RDY DUMP | 3 | 2 | | | | 3 | | 12 |
| 36 | −1 | DUMP | 3 | 2 | | | | 3 | | |
| 37 | −1 | END LINKED | 3 | 2 | | | | | | |
| 38 | −1 | START | 4 | 1 | | | | 2 | 1 | 15 |
| 39 | 6 | GTD FEED | 4 | | 2 | | 73 | | | |
| 40 | 7 | FLOW | 4 | | 2 | | 74 | | | |
| 41 | −1 | RDY DUMP | 4 | 1 | | | | 4 | | 1 |
| 42 | −1 | DUMP | 4 | 1 | | | | 4 | | |
| 43 | −1 | START | 5 | 1 | | | | 2 | | |
| 44 | 8 | GIW FEED | 5 | | 2 | | 75 | | | |
| 45 | −1 | RDY DMP | 5 | 1 | | | | 5 | | 2 |
| 46 | −1 | DUMP | 5 | 1 | | | | 5 | | |
| 47 | −1 | START | 6 | 1 | | | | 1 | | |
| 48 | −1 | REQ DUMP | 6 | 1 | | | | 2 | | 3 |
| 49 | −1 | REQ DUMP | 6 | 1 | | | | 3 | | 5 |
| 50 | 16 | GTD FEED | 6 | | 2 | | 81 | | | |
| 51 | −1 | RDY DUMP | 6 | 1 | | | | 6 | | 6 |
| 52 | −1 | DUMP | 6 | 1 | | | | 6 | | |
| 53 | −1 | START | 6 | 2 | | | | 1 | 1 | 20 |
| 54 | −1 | INIT 2ND | 6 | 2 | | | | 3 | | 21 |
| 55 | −1 | REQ DUMP | 6 | 2 | | | | 3 | | 12 |
| 56 | 34 | GTD FEED | 6 | | 2 | | 81 | | | |
| 57 | −1 | RDY DUMP | 6 | 2 | | | | 6 | | 13 |
| 58 | −1 | DUMP | 6 | 2 | | | | 6 | | |
| 59 | −1 | END LINKED | 6 | 2 | | | | | | |
| 60 | −1 | START | 7 | 1 | | | | 1 | | |
| 61 | 20 | TEMPERTR | 7 | | | | | | | |
| 62 | −1 | REQ DUMP | 7 | 1 | | | | 8 | | 7 |
| 63 | 21 | FLOW | 7 | | 2 | | 84 | | | |
| 64 | 22 | ANALYSIS | 7 | | 1 | 1 | | | | 17 |
| 65 | −1 | INIT 2ND | 7 | 2 | | | | 8 | | 18 |
| 66 | −1 | REQ DUMP | 7 | 2 | | | | 8 | | 8 |
| 67 | −1 | REQ DUMP | 7 | 3 | | | | 8 | | 9 |
| 68 | 27 | FLOW | 7 | | 2 | | 84 | | | |
| 69 | 28 | END LINKED | 7 | | 1 | 2 | | | | 17 |
| 70 | −1 | RDY DUMP | 7 | 1 | | | | 7 | | 10 |
| 71 | −1 | DUMP | 7 | 1 | | | | 7 | | |
| 72 | −1 | START | 8 | 1 | | | | 7 | | |
| 73 | 17 | TEMPERTR | 8 | | | | | | | |
| 74 | 18 | GIW FEED | 8 | | 2 | | 82 | | | |
| 75 | 19 | FLOW | 8 | | 2 | | 83 | | | |
| 76 | −1 | RDY DUMP | 8 | 1 | | | | 8 | | 7 |
| 77 | −1 | DUMP | 8 | 1 | | | | 8 | | |
| 78 | −1 | START | 8 | 2 | | | | 7 | 1 | 18 |
| 79 | 23 | GIW FEED | 8 | | 2 | | 82 | | | |
| 80 | 24 | FLOW | 8 | | 2 | | 83 | | | |
| 81 | −1 | RDY DUMP | 8 | 2 | | | | 8 | | 8 |
| 82 | −1 | DUMP | 8 | 2 | | | | 8 | | |
| 83 | −1 | START | 8 | 3 | | | | 7 | | |
| 84 | 25 | GIW FEED | 8 | | 2 | | 82 | | | |
| 85 | 26 | FLOW | 8 | | 2 | | 83 | | | |
| 86 | −1 | RDY DUMP | 8 | 3 | | | | 8 | | 9 |
| 87 | −1 | DUMP | 8 | 3 | | | | 8 | | |
| 88 | −1 | END LINKED | 8 | 2 | | | | | | |
| 89 | −1 | START | 9 | 1 | | | | 3 | 1 | 16 |
| 90 | 13 | FLOW | 9 | | 2 | | 78 | | | |
| 91 | 14 | FLOW | 9 | | 2 | | 79 | | | |
| 92 | 15 | GIW FEED | 9 | | 2 | | 80 | | | |
| 93 | −1 | RDY DUMP | 9 | 1 | | | | 9 | | 4 |
| 94 | −1 | DUMP | 9 | 1 | | | | 9 | | |
| 95 | −1 | START | 9 | 2 | | | | 3 | 1 | 22 |
| 96 | 31 | FLOW | 9 | | 2 | | 78 | | | |
| 97 | 32 | FLOW | 9 | | 2 | | 79 | | | |
| 98 | 33 | GIW FEED | 9 | | 2 | | 80 | | | |
| 99 | −1 | RDY DUMP | 9 | 2 | | | | 9 | | 11 |
| 100 | −1 | DUMP | 9 | 2 | | | | 9 | | |
| 101 | −1 | END LINKED | 9 | 2 | | | | | | |
| 102 | −1 | START | 10 | 1 | | | | 1 | | |
| 103 | 38 | FLOW | 10 | | 2 | | 86 | | | |

-continued

| | | | | Pass Four Results | | | | | |
|---|---|---|---|---|---|---|---|---|---|
| STEP | TASK | FUNCTION | VSL | FSG/ GRP | GRP END/DEF | LINKED CODE | RMI | ASSOC SUBSYS | CONDL START | PAIR ID |
| 104 | −1 | RDY DUMP | 10 | 1 | | | | 10 | | 14 |
| 105 | −1 | DUMP | 10 | 1 | | | | 10 | | |

8.5.9 Example Recipe Build—Pass Five

Pass five of the recipe builder is responsible for inserting initiate gauge tank fill steps into the recipe. For each gauge tank feed present in the recipe, a corresponding gauge tank fill step must be inserted into the recipe somewhere prior to the gauge tank feed. Gauge tank fill steps are placed at the beginning of a vessel recipe (immediately after the start step) with the following exceptions:

A: The initiate step for any gauge tank with a material residency restriction is placed immediately before the corresponding gauge tank feed step.

B. The initiate step for any gauge tank feed that is within a group with a conditional start is placed immediately after the start step for the group in which the material is fed.

The algorithm for inserting the gauge tank fill steps is as follows. The program searches through the steps in the recipe until a gauge tank feed step is located. If the gauge tank feed step has a material residency restriction, then the gauge tank fill step is inserted immediately prior to the gauge tank feed. If there is no material residency restriction, then the program searches backwards through the steps in the recipe until either a conditional start step or the first start step in the recipe is located. The initiate gauge tank fill step is inserted immediately after the start step.

PASS FIVE RECIPE BUILD EXAMPLE

Continuing our recipe build example, we will apply the pass five algorithms to our example recipe build.

Step 13

Gauge Tank Feed—Vessel 1

The first gauge tank feed in the recipe is detected at step thirteen. Since the feed does not have a material residency restriction, we search backwards until we locate either a conditional start, or the initial start step of the vessel. The first item we locate in our backwards search is the initial start step of the vessel, located in step 1 of the recipe. We insert the gauge tank fill step into the recipe immediately after the start step located in step one.

| STEP | FUNCTION | VESSEL | LINKED CODE | RMI | ASSOC SUBSYS | |
|---|---|---|---|---|---|---|
| 1 | START | 1 | | | | |
| 2 | AGITATOR | 1 | | | 1 | ←1st Start Step |
| 3 | FLOW | 1 | 2 | 65 | | |
| 4 | GIW FEED | 1 | 2 | 71 | | |
| 5 | TEMPERTR | 1 | | | | |
| 6 | REQ DUMP | 1 | | | 6 | |
| 7 | REQ DUMP | 1 | | | 7 | |
| 8 | ANALYSIS | 1 | 1 | | | |
| 9 | INIT 2ND | 1 | | | 6 | |
| 10 | REQ DUMP | 1 | | | 6 | |
| 11 | END LINKED | 1 | 1 | | | |
| 12 | PUMPOUT | 1 | 1 | | | |
| 13 | GTD FEED | 1 | 2 | 85 | | ←Gauge Tank Feed |

Step 39

Gauge Tank Feed—Vessel 4

The second gauge tank feed in the recipe is detected at step number 39. This material feed does have a material residency restriction, so the corresponding initiate gauge tank fill step is inserted into the recipe immediately prior to this step.

| STEP | FUNCTION | VESSEL | LINKED CODE | RMI | ASSOC SUBSYS | |
|---|---|---|---|---|---|---|
| 39 | GTD FEED | 4 | 2 | 73 | | ←Gauge Tank Feed |

Step 50

Gauge Tank Feed—Vessel 6

The third gauge tank feed in the recipe is detected at step number 50. Since there is not a material residency restriction on this feed, we search backwards until we locate either a conditional start step, or the initial start step in the vessel. The initial start step in the vessel is found at step number 47, so the initiate gauge tank step is inserted immediately after it.

| STEP | FUNCTION | VESSEL | LINKED CODE | RMI | ASSOC SUBSYS | |
|------|----------|--------|-------------|-----|--------------|---|
| 47 | START | 6 | | | 1 | ←1st Start Step |
| 48 | REQ DUMP | 6 | | | 2 | |
| 49 | REQ DUMP | 6 | | | 3 | |
| 50 | GTD FEED | 6 | 2 | 81 | | ←Gauge Tank Feed |

Step 56

Gauge Tank Feed—Vessel 6

The fourth gauge tank feed in the recipe is detected at step number 56. Since there is not a material residency restriction on this feed, we search backwards until we locate either a conditional start step, or the initial start step in the vessel. A conditional start step is found at step number 53, so the initiate gauge tank step is inserted immediately after it.

| STEP | FUNCTION | VESSEL | LINKED CODE | RMI | ASSOC SUBSYS | |
|------|----------|--------|-------------|-----|--------------|---|
| 53 | START | 6 | | | 1 | ←Conditional Start |
| 54 | INIT 2ND | 6 | | | 3 | |
| 55 | REQ DUMP | 6 | | | 3 | |
| 56 | GTD FEED | 6 | 2 | 81 | | ←Gauge Tank Feed |

There are no more gauge tank feed steps in the pass 4 results, so pass five of the recipe builder algorithm has now been completed. The output of the pass 5 algorithm on our example recipe build is shown below. Modifications from the Pass 4 results are shown in bold text for clarity.

| | | | | | Pass Five Results | | | | |
|---|---|---|---|---|---|---|---|---|---|
| STEP | TASK | FUNCTION | VSL | FSG/ GRP | GRP END/DEF | LINKED CODE | RMI | ASSOC SUBSYS | CONDL START | PAIR ID |
| 1 | −1 | START | 1 | 1 | | | | 1 | | |
| 2 | 37 | INIT GTK | 1 | | | | 85 | | | 23 |
| 3 | 1 | AGITATOR | 1 | | | | | | | |
| 4 | 2 | FLOW | 1 | | 2 | | 65 | | | |
| 5 | 3 | GIW FEED | 1 | | 2 | | 71 | | | |
| 6 | 4 | TEMPERTR | 1 | | | | | | | |
| 7 | −1 | REQ DUMP | 1 | 1 | | | | 6 | | 6 |
| 8 | −1 | REQ DUMP | 1 | 1 | | | | 7 | | 10 |
| 9 | 29 | ANALYSIS | 1 | | 1 | 1 | | | | 19 |
| 10 | −1 | INIT 2ND | 1 | 2 | | | | 6 | | 20 |
| 11 | −1 | REQ DUMP | 1 | 2 | | | | 6 | | 13 |
| 12 | 35 | END LINKED | 1 | | 1 | 2 | | | | 19 |
| 13 | 36 | PUMPOUT | 1 | | 1 | | | | | |
| 14 | 37 | GTD FEED | 1 | | 2 | | 85 | | | 23 |
| 15 | −1 | REQ DUMP | 1 | 1 | | | | 10 | | 14 |
| 16 | −1 | START | 2 | 1 | | | | 6 | | |
| 17 | 5 | FLOW | 2 | | 2 | | 72 | | | |
| 18 | −1 | INIT 2ND | 2 | 1 | | | | 4 | | 15 |
| 19 | −1 | REQ DUMP | 2 | 1 | | | | 4 | | 1 |
| 20 | 9 | AGITATOR | 2 | | | | | | | |
| 21 | −1 | REQ DUMP | 2 | 1 | | | | 5 | | 2 |
| 22 | 10 | FLOW | 2 | | 2 | | 76 | | | |
| 23 | −1 | RDY DUMP | 2 | 1 | | | | 2 | | 3 |
| 24 | −1 | DUMP | 2 | 1 | | | | 2 | | |
| 25 | −1 | START | 3 | 1 | | | | 6 | | |
| 26 | 11 | AGITATOR | 3 | | | | | | | |
| 27 | 12 | FLOW | 3 | | 2 | | 77 | | | |
| 28 | −1 | INIT 2ND | 3 | 1 | | | | 9 | | 16 |
| 29 | −1 | REQ DUMP | 3 | 1 | | | | 9 | | 4 |
| 30 | −1 | RDY DUMP | 3 | 1 | | | | 3 | | 5 |
| 31 | −1 | DUMP | 3 | 1 | | | | 3 | | |
| 32 | −1 | START | 3 | 2 | | | | 6 | 1 | 21 |
| 33 | 30 | FLOW | 3 | | 2 | | 77 | | | |
| 34 | −1 | INIT 2ND | 3 | 2 | | | | 9 | | 22 |
| 35 | −1 | REQ DUMP | 3 | 2 | | | | 9 | | 11 |
| 36 | −1 | RDY DUMP | 3 | 2 | | | | 3 | | 12 |
| 37 | −1 | DUMP | 3 | 2 | | | | 3 | | |
| 38 | −1 | END LINKED | 3 | 2 | | | | | | |
| 39 | −1 | START | 4 | 1 | | | | 2 | 1 | 15 |
| 40 | 6 | INIT GTK | 4 | | | | 73 | | | 24 |
| 41 | 6 | GTD FEED | 4 | | 2 | | 73 | | | 24 |
| 42 | 7 | FLOW | 4 | | 2 | | 74 | | | |
| 43 | −1 | RDY DUMP | 4 | 1 | | | | 4 | | 1 |
| 44 | −1 | DUMP | 4 | 1 | | | | 4 | | |
| 45 | −1 | START | 5 | 1 | | | | 2 | | |
| 46 | 8 | GIW FEED | 5 | | 2 | | 75 | | | |
| 47 | −1 | RDY DMP | 5 | 1 | | | | 5 | | 2 |
| 48 | −1 | DUMP | 5 | 1 | | | | 5 | | |
| 49 | −1 | START | 6 | 1 | | | | 1 | | |
| 50 | 16 | INIT GTK | 6 | | | | 81 | | | 25 |
| 51 | −1 | REQ DUMP | 6 | 1 | | | | 2 | | 3 |
| 52 | −1 | REQ DUMP | 6 | 1 | | | | 3 | | 5 |
| 53 | 16 | GTD FEED | 6 | | 2 | | 81 | | | 25 |
| 54 | −1 | RDY DUMP | 6 | 1 | | | | 6 | | 6 |
| 55 | −1 | DUMP | 6 | 1 | | | | 6 | | |
| 56 | −1 | START | 6 | 2 | | | | 1 | 1 | 20 |
| 57 | 34 | INIT GTK | 6 | | | | 81 | | | 26 |
| 58 | −1 | INIT 2ND | 6 | 2 | | | | 3 | | 21 |
| 59 | −1 | REQ DUMP | 6 | 2 | | | | 3 | | 12 |
| 60 | 34 | GTD FEED | 6 | | 2 | | 81 | | | 26 |
| 61 | −1 | RDY DUMP | 6 | 2 | | | | 6 | | 13 |
| 62 | −1 | DUMP | 6 | 2 | | | | 6 | | |
| 63 | −1 | END LINKED | 6 | 2 | | | | | | |
| 64 | −1 | START | 7 | 1 | | | | 1 | | |
| 65 | 20 | TEMPERTR | 7 | | | | | | | |
| 66 | −1 | REQ DUMP | 7 | 1 | | | | 8 | | 7 |
| 67 | 21 | FLOW | 7 | | 2 | | 84 | | | |
| 68 | 22 | ANALYSIS | 7 | | 1 | 1 | | | | 17 |
| 69 | −1 | INIT 2ND | 7 | 2 | | | | 8 | | 18 |
| 70 | −1 | REQ DUMP | 7 | 2 | | | | 8 | | 8 |
| 71 | −1 | REQ DUMP | 7 | 3 | | | | 8 | | 9 |
| 72 | 27 | FLOW | 7 | | 2 | | 84 | | | |
| 73 | 28 | END LINKED | 7 | | 1 | 2 | | | | 17 |
| 74 | −1 | RDY DUMP | 7 | 1 | | | | 7 | | 10 |
| 75 | −1 | DUMP | 7 | 1 | | | | 7 | | |

-continued

| | | | | | Pass Five Results | | | | |
|---|---|---|---|---|---|---|---|---|---|
| STEP | TASK | FUNCTION | VSL | FSG/ GRP | GRP END/DEF | LINKED CODE | RMI | ASSOC SUBSYS | CONDL START | PAIR ID |
| 76 | −1 | START | 8 | 1 | | | | 7 | | |
| 77 | 17 | TEMPERTR | 8 | | | | | | | |
| 78 | 18 | GIW FEED | 8 | | 2 | | 82 | | | |
| 79 | 19 | FLOW | 8 | | 2 | | 83 | | | |
| 80 | −1 | RDY DUMP | 8 | 1 | | | | 8 | | 7 |
| 81 | −1 | DUMP | 8 | 1 | | | | 8 | | |
| 82 | −1 | START | 8 | 2 | | | | 7 | 1 | 18 |
| 83 | 23 | GIW FEED | 8 | | 2 | | 82 | | | |
| 84 | 24 | FLOW | 8 | | 2 | | 83 | | | |
| 85 | −1 | RDY DUMP | 8 | 2 | | | | 8 | | 8 |
| 86 | −1 | DUMP | 8 | 2 | | | | 8 | | |
| 87 | −1 | START | 8 | 3 | | | | 7 | | |
| 88 | 25 | GIW FEED | 8 | | 2 | | 82 | | | |
| 89 | 26 | FLOW | 8 | | 2 | | 83 | | | |
| 90 | −1 | RDY DUMP | 8 | 3 | | | | 8 | | 9 |
| 91 | −1 | DUMP | 8 | 3 | | | | 8 | | |
| 92 | −1 | END LINKED | 8 | 2 | | | | | | |
| 93 | −1 | START | 9 | 1 | | | | 3 | 1 | 16 |
| 94 | 13 | FLOW | 9 | | 2 | | 78 | | | |
| 95 | 14 | FLOW | 9 | | 2 | | 79 | | | |
| 96 | 15 | GIW FEED | 9 | | 2 | | 80 | | | |
| 97 | −1 | RDY DUMP | 9 | 1 | | | | 9 | | 4 |
| 98 | −1 | DUMP | 9 | 1 | | | | 9 | | |
| 99 | −1 | START | 9 | 2 | | | | 3 | 1 | 22 |
| 100 | 31 | FLOW | 9 | | 2 | | 78 | | | |
| 101 | 32 | FLOW | 9 | | 2 | | 79 | | | |
| 102 | 33 | GIW FEED | 9 | | 2 | | 80 | | | |
| 103 | −1 | RDY DUMP | 9 | 2 | | | | 9 | | 11 |
| 104 | −1 | DUMP | 9 | 2 | | | | 9 | | |
| 105 | −1 | END LINKED | 9 | 2 | | | | | | |
| 106 | −1 | START | 10 | 1 | | | | 1 | | |
| 107 | 38 | FLOW | 10 | | 2 | | 86 | | | |
| 108 | −1 | RDY DUMP | 10 | 1 | | | | 10 | | 14 |
| 109 | −1 | DUMP | 10 | 1 | | | | 10 | | |

The remaining passes of the recipe build algorithm do not generate any more steps or change the order of any steps. The order of steps in the pass 5 results is the order of the steps as they will appear in the finished individual vessel recipes.

8.6 Formula/Recipe Build Data Flows

The Flexible Formulation formula builder and recipe builders are fairly complex pieces of software and it may not always be entirely obvious to the user why, how, or when a certain piece of information was written into the data structure . . . especially if it overwrote something that the operator has manually entered at formula build time.

The purpose of this portion of the documentation is to describe the data flows that occur during the formula/recipe build process so that the user can understand where values are coming from, and just as importantly, what they are overwriting when they are stored into the formula.

8.6.1 Data Flow Map

Figure 55:
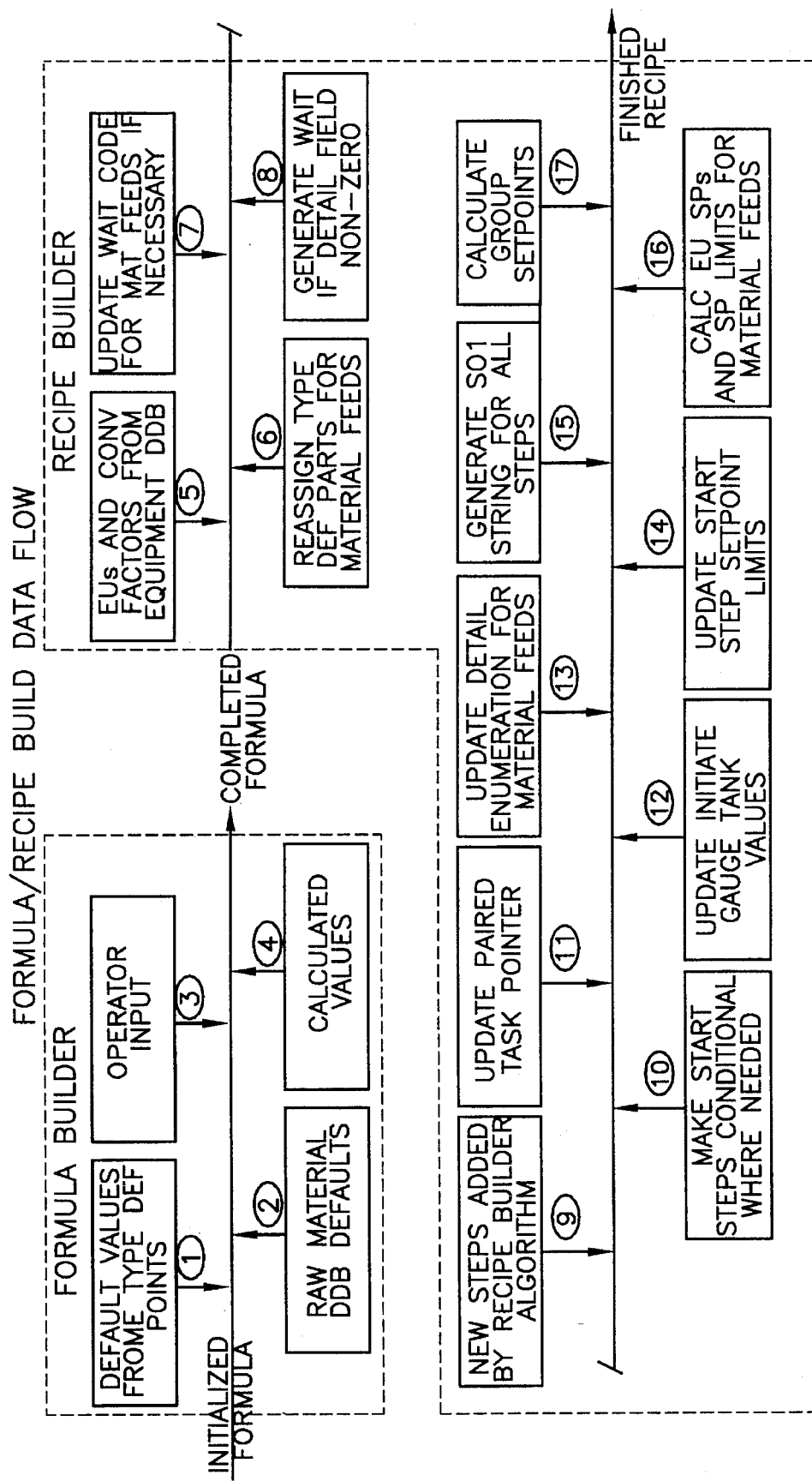
FIG. 55 shows a block diagram of a Formula/Recipe Build Data Flow.

FIG. 55 depicts the data flow of an initialized formula data structure through the formula builder and recipe builder software. Each possible operation which can store data into the formula/recipe data structure is marked and numbered. Descriptions of these operations and the data values they manipulate are given hereinunder.

Operation 1

Whenever the operator adds a task to a formula, the default values stored in the type definition point are copied into the formula.

Operation 2

If the task being added to the formula has a raw material associated with it then the raw material index is stored into the first index of the raw material data, the time stamp of the raw material is recorded, and the status of the raw material slot set to good. The packed descriptor strings describing the raw material are also updated. The values modified are the following:

R13(Base_Index+1)=RMI

T06(Base_Index+1)=RMI Creation Timestamp

R14(Base_Index+1)=RMI Status (Valid/Invalid)

S01 Chars 1..10=Raw Material Name

S01 Chars 11..20=Raw Material RMS Code

If the "RETRIEVE RAW MATERIAL DEFAULTS" flag (L01(1)) is on in the type definition point which describes the task being added to the formula, then the raw material default values stored in the global data area of the raw material database are copied from the raw material database into the formula data structure, overwriting existing values. The data that is overwritten is the following:

R09(Base_Index+6)=Engineering Units Conversion Factor

S01 Chars 34..36=Engineering Units String

R09(Base_Index+1)=Minimum Operator Setpoint Limit

R09(Base_Index+2)=Maximum Operator Setpoint Limit

R10(Base_Index+2)=Minimum Temperature Limit

R10(Base_Index+3)=Maximum Temperature Limit

R10(Base_Index+4)=Minimum Error Tolerance

R10(Base_Index+5)=Maximum Error Tolerance

Operation 3

The operator can manually enter values into the data structures via the task detail displays.

Operation 4

Changing of values within the formula builder it will sometimes cause a set of calculations to be performed. The following is a list of the types of calculations that can be requested of the formula builder software and the actions that will initiate the performing of these calculations.

Calculate EU Setpoints: The calculate EU setpoint function recalculates the engineering units setpoint values for every material feed task in the formula. A task is identified as a material feed when the R09(Base_Index+13) value associated with the task is equal to one. This function writes to the following value(s):
R09(Base_Index+14): Engineering Units Setpoint This function can be requested by any of the following events:
1. Operator Modification of Engineering Units Conversion Factor
2. Operator Modification of Formula Parts Setpoint
3. Operator Modification of M1 modifier
4. Operator Modification of M2 modifier
5. Operator Modification of Batch Size
6. Operator Modification of Recycle Handler Code
7. Addition of a new task to a formula
8. Removal of an existing task from a formula Sum Formula Parts: The sum formula pans function recalculates the totalized formulated and unformulated pans in the formula and updates the working batch size. This function writes to the following value(s):
FRM001HD.R06(1)=Totalized formula parts
FRM001HD.R05(7)=Working Batch Size This function can be requested by any of the following events:
1. Operator Modification of a Formula Pans Setpoint
2. Operator Modification of M1 modifier
3. Operator Modification of M2 modifier
4. Operator Modification of Batch Size
5. Operator Modification of Recycle Handler Code
6. Addition of a new task to a formula
7. Removal of an existing task from a formula Select Raw Material: This function is run when the operator changes a raw material index inside of an already existing task in a formula. It updates the raw material time stamp and resets the status flag for the raw material index that the operator edited to Okay (no time stamp conflict). This function writes to the following values(s)
T06(Base_Index+#)=Formula copy of Raw Material Creation Time Stamp
R13(Base_Index+#)=Raw Material Index
R14(Base_Index+#)=RMI Status (Valid/Invalid)

If the "RETRIEVE RAW MATERIAL DEFAULTS" flag (L01(1)) is on in the type definition point which describes the task being edited and the raw material value that was modified was index number one, then the raw material default values stored in the global data area of the raw material database are copied from the raw material database into the formula data structure, overwriting existing values. The data that is overwritten is the following:
S01 Chars 1..10=Raw Material Name
S01 Chars 11..20=Raw Material RMS Code
R09(Base_Index+6)=Engineering Units Conversion Factor
S01 Chars 34..36=Engineering Units String
R09(Base_Index+1)=Minimum Operator Setpoint Limit
R09(Base_Index+2)=Maximum Operator Setpoint Limit
R10(Base_Index+2)=Minimum Temperature Limit
R10(Base_Index+3)=Maximum Temperature Limit
R10(Base_Index+4)=Minimum Error Tolerance
R10(Base_Index+5)=Maximum Error Tolerance This function can be requested by any of the following events:
1. Operator Modification of a Raw Material Index inside of an existing task

Operation 5

Pass 1 of the recipe builder overwrites the engineering units string and conversion factor values for all material feed steps with the values that are stored in the system specific raw material data of the raw material database. The data that is overwritten is the following:
R09(Base_Index=6)=Engineering Units Conversion Factor
S01 Chars 34..36=Engineering Units String

Operation 6

The type definition point for every material feed is changed from the standard material feed type definition point to whatever type definition point is defined in the raw material database for the system that the recipe is being built against. The new type definition point is assigned during pass one of the recipe build algorithm and is held in the intermediate recipe build results. It can be viewed from the intermediate recipe build results schematic INTERMDO. During pass six of the recipe builder, the value is written to its correct location within the step data structure. The data that is overwritten is the following:
E03=Type Definition Point
R09(Base_Index+15)=Type Definition Point Index

Operation 7

When a material feed type definition point is changed, it may be necessary to update the wait codes in the step data structure. The default values for the wait codes in the new type definition point are examined and if either default has a higher priority than the current value of its corresponding wait code in the step data structure, then the default is written into the step data structure. The data that is overwritten is the following:
R09(Base_Index+9)=Initiation Wait Code
R09(Base_20_Index+10)=Continuation Wait Code

Operation 8

If the type definition point for a step has the "Generate Wait if Detail Field Non-Zero" flag on in its recipe builder flags and the detail field enumeration value in the steps data structure is non-zero, then a "WAIT COMPLETE" code will be written into the continuation wait code for the step unless the current value of the wait code has a higher priority. The data that is overwritten is the following:
R09(Base_20_Index+10): Continuation Wait Code

Operation 9

Passes two through five of the recipe builder insert new steps into the recipe based upon the recipe builder algorithm. Typically these steps are populated with default values from the type definition point for the type of step being inserted. Examples of this include START, READY TO DUMP, DUMP, etc. Sometimes an inserted step will copy the existing data structure from another task. An example of this would be a INITIATE GAUGE TANK FILL step copying the data structure of the GAUGE TANK DUMP step from which it was generated. It is possible to determine where a newly inserted step will get its data from by examining the recipe build intermediate results schematic INTERMDO. The second column on the screen is titled "TASK", If the value in this column for a newly inserted task is - 1, then the step will be populated with the default values from the type definition point. If the value is a positive integer, then the step will be populated with the data structure from the task in the original formula corresponding to that number.

Operation 10

Start Steps which are inserted into a recipe may have their conditional flags set on to make them conditional starts. A start step will be made conditional if a material feed within its group has a material residency restriction, or if it is the first start step in a set of groups to be made in response to an analysis task in a lower vessel. The conditional flags for the start steps are placed into the intermediate data structures during pass three and can be seen from the recipe build intermediate results schematic, INTERMDO. The actual setting of the conditional flag in the step data structure is not done until pass six, when the recipe step buffer points are built. The data that is overwritten is the following:

R10(Base_20_Index+1)=Conditional start code (for start steps only)

Operation 11

During the recipe build operation, many steps will be "paired". Examples of paired steps are ANALYSIS and END LINKED, READY TO DUMP and REQUEST TO DUMP, and INITIATE GAUGE TANK FILL and GAUGE TANK DUMP. There are two possible ways in which steps can be paired. The normal means is two steps that point at each other. In this case, when a pair is detected during recipe build, it is assigned a pair ID, and this value is shown in the PAIR ID field on the schematic INTERMDO. During pass six of the recipe builder, these pair IDs are converted into coded pointers that point at each other. In some cases, however, a step points at another step without being pointed back at. The only current example of this is an END LINKED step that points at a START step, but the start step cannot point back since it is already paired with an INITIATE SECONDARY step. In this case, the END LINKED is marked as being paired with the start step by having the same group number as the start step stored in the intermediate recipe build results. Once again, during pass six of the recipe builder, a pointer to the paired step is calculated and placed into the data structure for the END LINKED step. The following data is overwritten by this operation:

R09(Base_20_Index+7)=Associated Step Pointer

Operation 12

When a gauge tank feed is present in a formula, the recipe builder generates INITIATE GAUGE TANK FILL steps to correspond to every gauge tank feed. Since the data structure for the INITIATE GAUGE TANK FILL step is copied from the gauge tank feed step, the data must then be updated as follows: The BPO location code is changed from one to two. The detail field enumeration is set to five. The minimum setpoint limit is set to zero and the maximum setpoint limit is set to the maximum gauge tank weight. If there is a material residency restriction, then the initiation wait code is set to seven (wait complete), otherwise it is set to zero (no wait). The continuation wait code is set to zero (no wait). The following data is overwritten by this operation:

R09(Base_20_Index+13)=BPO Location/Feed Code
R09(Base_20_Index+11)=Detail Field Enumeration
R09(Base_20_Index+1)=Minimum Setpoint Limit
R09(Base_20_Index+2)=Maximum Setpoint Limit
R09(Base_20_Index+9)=Initiation Wait Code
R09(Base_20_Index+10)=Continuation Wait Code

Operation 13

Material Feed steps retrieve the default value for the detail enumeration code from their type definition point during pass 6 of the recipe builder. This is because the material feeds were convened from one type definition point to another, and the detail string is used to describe the type of feed that the step is. The following data is overwritten by this operation:

R09(Base_20_Index+11)=Detail Field Enumeration Code

Operation 14

Setpoint limits for all start steps are set to zero and the maximum vessel weight during pass six of the recipe builder. The following data is overwritten by this operation.

R09(Base_20_Index+1)=Minimum Setpoint Limit
R09(Base_20_Index+2)=Maximum Setpoint Limit

Operation 15

The entire contents of the string S01 are regenerated for each step in the recipe during pass six based upon the current data in the step. The following data is overwritten by this operation:

S01=Packed string descriptor

Operation 16

The engineering units setpoints, setpoint limits, and material tolerances are recalculated for all material feeds in the recipe since the engineering units and conversion factors have been updated during the recipe build. The following data is overwritten by this operation:

R09(Base_20_Index+14)=Engineering Units Setpoint
R09(Base_20_Index+1)=Minimum Engineering Units Setpoint
R09(Base_20_Index+2)=Maximum Engineering Units Setpoint
R09(Base_20_Index+4)=Minimum Material Tolerance
R09(Base_20_Index+5)=Maximum Material Tolerance

Operation 17

Pass seven of the recipe builder calculates group setpoints. These setpoints are written into the engineering units setpoint values of all START steps and all REQUEST TO DUMP steps. The following data is overwritten by this operation:

R09(Base_20_Index+14)+Engineering Units Setpoint

8.7 Recipe Build Schematics

8.7.1 Schematic INTERMDO

The schematic INTERMDO is a recipe builder debugging schematic. It was originally built for the use of the programmer in debugging the algorithm, but is also useful for users in helping them to gain an understanding of how recipe builder works, as well as in understanding why a particular formula built into a particular recipe structure. Since this schematic was built as a debugging tool, it is not as "polished" as the standard system schematics. Documentation on this schematic is included in this DFS so that the user can also use the schematic for his or her own debugging purposes.

Structure

FIG. 56 depicts the design structure of the schematic FRMPC1A0. It also indicates the document section numbers to refer to for detail information on each object within the structure.

Design

Figure 57:
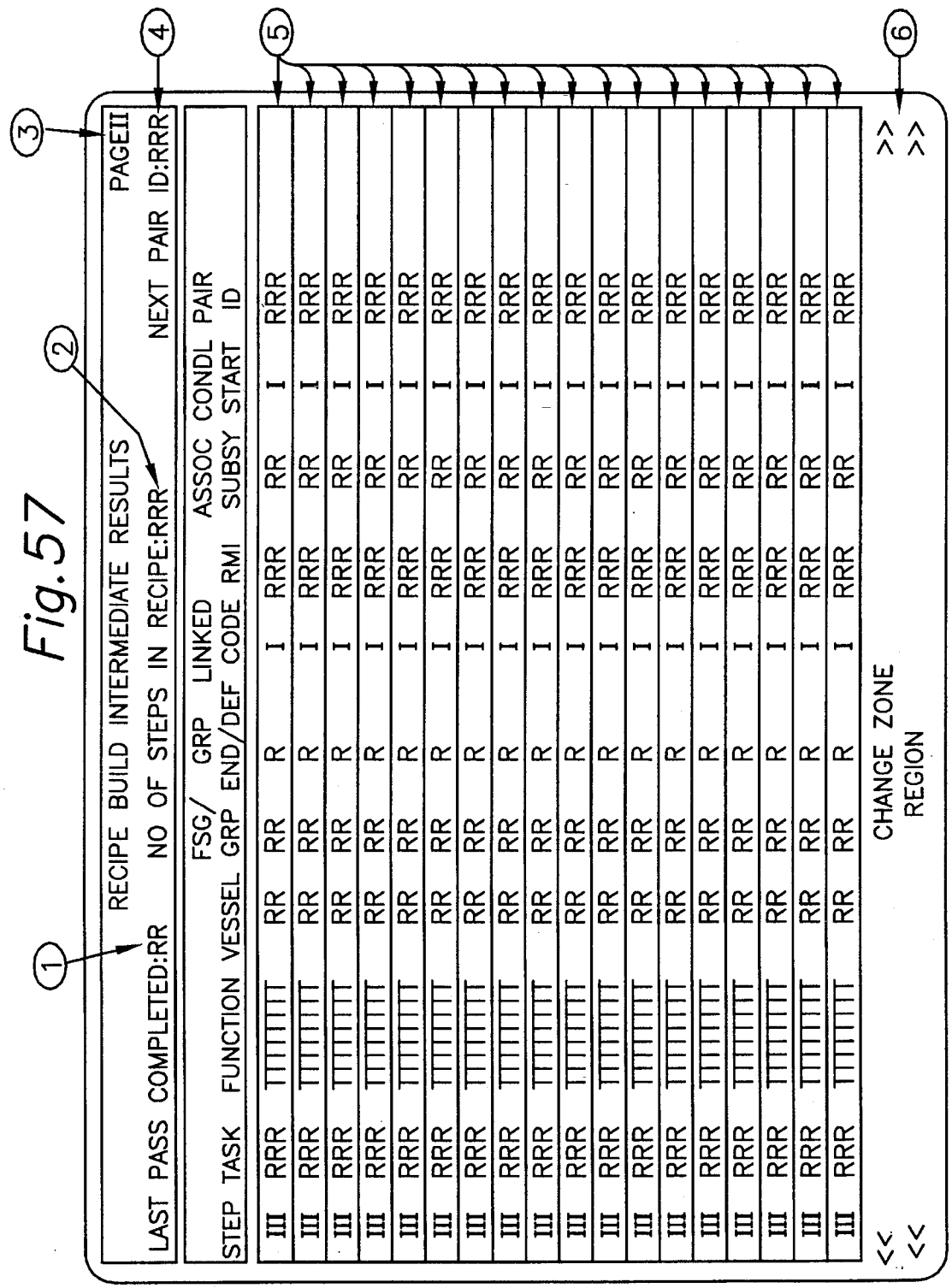
FIG. 57 shows a design schematic of INTERMD0.

The basic design of the schematic INTERMDO is shown in FIG. 57.

The schematic is broken up into three regions. The topmost region is the header region. It displays miscellaneous information regarding the recipe build currently in progress.

The middle region is the step data region. This region displays on page of recipe build intermediate step data at a time. It also provides visual indication of what changes have occurred to the intermediate step data structure since the previous pass.

The bottommost region is the change zone region. This is the area in which the change zones for the schematic will appear. It is through these change zones that the operator will issue commands.

User DDB Usage

The following User DDBs are used in the schematic INTERMDO:

| NAME | TYPE | LOC/GLOBAL | DESCRIPTION |
|------|------|------------|-------------|
| CHZL | INTEGER | LOCAL | Local Change Zone Control |

Graphic DDB Usage

The following graphic DDBs are used in the schematic INTERMDO:

| NAME | TYPE | LOC/ GLOBAL | DESCRIPTION |
|------|------|-------------|-------------|
| INT01 | INTEGER | LOCAL | Current Page Number Displayed |
| INT02 | INTEGER | LOCAL | Base Step Number for Display |
| ENT01 | ENTITY | LOCAL | Recipe Build Program Point |

Values

The following values are displayed on the recipe build intermediate results schematic INTERMDO:

① ENT01.R20(1)=Last Pass of Recipe Build Algorithm Completed
② ENT01.R20(3)=Number of Steps in current Recipe Build Intermediate Results
③ INT01=Page Number of Recipe Build Intermediate Results currently Displayed
④ ENT01.R20(4)=Next paid ID to be assigned by Recipe Build Algorithm Conditions There are no conditions present on the recipe build intermediate results schematic INTERMDO.

Targets

There are no targets present on the recipe build intermediate results schematic INTERMDO.

Initial Target

The initial target on the schematic INTERMIX) initializes the displayed page number and base index for display. It also stores the point RECBUILD into ENT01 since the display was built generic in order to be able to support multiple recipe builders if that capacity is ever added to Flexible Formulation. Finally, it sets up the Vars that are used in displaying the point types on the schematic. The pseudocode for the target is shown below:

SET CHZL=1
SET INT01=1
SET INT02=0
SET ENT01—RECBUILD
SET VAR01=ENT01.R28(INT02+1)
SET VAR02=ENT01.R28(INT02+2)
SET VAR03=ENT01.R28(INT02+3)
SET VAR04=ENT01.R28(INT02+4)
SET VAR05=ENT01.R28(INT02+5)
SET VAR06=ENT01.R28(INT02+6)
SET VAR07=ENT01.R28(INT02+7)
SET VAR08=ENT01.R28(INT02+8)
SET VAR09=ENT01.R28(INT02+9)
SET VAR10=ENT01.R28(INT02+10)
SET VAR11=ENT01.R28(INT02+11)
SET VAR12=ENT01.R28(INT02+12)
SET VAR13=ENT01.R28(INT02+13)
SET VAR14=ENT01.R28(INT02+14)
SET VAR15=ENT01.R28(INT02+15)
SET VAR16=ENT01.R28(INT02+16)
SET VAR17=ENT01.R28(INT02+17)
SET VAR18=ENT01.R28(INT02+18)

Final Target

There is no final target on the schematic INTERMDO.

Subpictures

The following subpictures are present on the schematic INTERMDO.

⑤ INTERMD9—Intermediate Step Structure Display Subpicture

Variants

With the exception of the change zone, there are no variants present on the schematic INTERMDO.

Change Zones

⑤ The following change zones are used on the recipe build intemediate results schematic INTERMDO.

FFPGMCZ8—Standard Program Interface Change Zone

INTCZ1A8—Default Change Zone
FRMCZ5A8—Initialize User DDBs Change Zone

8.7.1.1 Subpicture INTERMD9

⑤ Subpicture INTERMD9 is used to display the data associated with one step in the recipe build intermediate results data structures. The structure of the subpicture is shown in FIG. 58.

Replacement Parameters

The subpicture INTERMD9 has the following replacement parameters:

| NAME | TYPE | PROMPT |
|---|---|---|
| &INDEX | | |
| &EXPR | | |
| &VARID | | |

Values

The following values are shown in the subpicture FRMSLCT9:

| | |
|---|---|
| ⑤.1 | INT02 + &INDEX = Step Number in Intermediate Recipe Build Results |
| ⑤.2 | ENT01.R21(&EXPR) = Original Task Number of Step |
| ⑤.3 | SYSDIRPT.E02(&VARID).KEYWORD = Name of Type Def Pt defining Step |
| ⑤.4 | ENT01.R22(&EXPR) = Vessel where step will be located |
| ⑤.5 | ENT01.R23(&EXPR) = Force Secondary Group Code for Pass 1/ Group Number for Pass 2–8 |
| ⑤.6 | ENT01.R27(&EXPR) = Group Ending/Defining Code<br>Group Ending = 1<br>Group Defining = 2 |
| ⑤.7 | ENT01.R26(&EXPR) = Linked Code<br>Start Linked = 1<br>End Linked = 2 |
| ⑤.8 | ENT01.R24(&EXPR) = Raw Material Index |
| ⑤.9 | ENT01.R25(&EXPR) = Associated Subsystem |
| ⑤.10 | ENT01.R26(&EXPR) = MOD 10 = Conditional Start Code for Start Steps<br>1 = Conditional |
| ⑤.11 | ENT01.R29(&EXPR) = Assigned Paid ID |

Conditions

The following conditions are present on the subpicture INTERMD9:

⑤.1 The background of the block that displays the step number has a condition on it that makes it turn half intensity magenta when the subpicture is displaying a step that was inserted into the intermediate recipe build results during the last pass of the recipe builder algorithm. This is to provide visual indication to the operator of the changes that occur during each pass of the recipe builder. The pseudocode for the condition is shown below:

IF ENT01.R31(&EXPR)=1 THEN
   SET MAGENTA NO BLINK NO KEV HALF
ELSE
   SET WHITE NO BLINK NO REV HALF

⑤.2 The background of the block that displays the original task number has a condition on it that makes it turn half intensity magenta when the subpicture is displaying a step that was inserted into the intermediate recipe build results during the last pass of the recipe build algorithm or if this field of the step was modified during the last pass of the recipe build algorithm. The pseudocode for the condition is shown below:

IF (ENT01.R31(&EXPR) = 1) OR (ENT01.R31(&EXPR) = 21)
OR
  (ENT01.R30(&EXPR) = 21) THEN
    SET MAGENTA NO BLINK NO REV HALF
ELSE
    SET WHITE NO BLINK NO REV HALF

The value that shows the original task number has a condition on it that makes it "disappear" by matching the background color when the value of the variable is zero, and makes it appear white full intensity when it is non-zero. The pseudocode for the condition is shown below:

IF (ENT01.R21(&EXPR) = 0) AND ((ENT01.R31(&EXPR) = 1) OR
  (ENT01.R21(&EXPR) = 21) OR (ENT01.R30(&EXPR) = 21)
  THEN
    SET MAGENTA NO BLINK NO REV HALF
ELSE IF ENT01.R21(&EXPR) = 0 THEN

-continued

SET WHITE NO BLINK NO REV HALF
ELSE
    SET WHITE NO BLINK NO REV FULL

⑤.3 The background of the block that displays the name of the type definition point corresponding to the step has a condition on it that makes it turn half intensity magenta when the subpicture is displaying a step that was inserted into the intermediate recipe build results during the last pass of the recipe build algorithm. The pseudocode for this condition is shown below:

IF (ENT01.R31(&EXPR)=1) THEN
   SET MAGENTA NO BLINK NO REV HALF
ELSE
   SET WHITE NO BLINK NO REV HALF

The value that shows the name of the type definition point corresponding to the step has a condition on it that makes it "disappear" by matching the background color when there is no step in this index of the recipe build intermediate results. The pseudocode for the condition is shown below:

```
IF (ENT01.R22(&EXPR) = 0) AND ((ENT01.R31(&EXPR) = 1) OR
    (ENT01.R31(&EXPR) = 28) OR (ENT01.R30(&EXPR) = 28)) THEN
        SET MAGENTA NO BLINK NO REV HALF
ELSE IF (ENT01.R28(&EXPR) = 0) OR (ENT01.R21(&EXPR) = 0) THEN
        SET WHITE NO BLINK NO REV HALF
ELSE
        SET WHITE NO BLINK NO REV FULL
```

⑤④The background of the block that displays the vessel location of the step has a condition on it that makes it turn half intensity magenta when the subpicture is displaying a step that was inserted into the recipe build results during the last pass of the recipe build algorithm or if this field of the step was modified during the last pass of the recipe build algorithm. The pseudocode for the condition is shown below:

```
IF (ENT01.R31(&EXPR) = 1) OR (ENT01.R31(&EXPR) = 21)
OR
    (ENT01.R30(&EXPR) = 21) THEN
        SET MAGENTA NO BLINK NO REV HALF
ELSE
        SET WHITE NO BLINK NO REV HALF
```

The value that shows the vessel location of the step has a condition on it that makes it "disappear" by matching the background color when the value of the variable is zero, and makes it appear white full intensity when it is non-zero. The pseudocode for the condition is shown below:

```
IF (ENT01.R22(&EXPR) = 0) AND ((ENT01.R.31(&EXPR) =
1) OR
    (ENT01.R31(&EXPR) = 22) OR (ENT01.R30(&EXPR) = 22))
    THEN
        SET MAGENTA NO BLINK NO REV HALF
ELSE IF ENT01.R22(&EXPR) = 0 THEN
        SET WHITE NO BLINK NO REV. HALF
ELSE
        SET WHITE NO BLINK NO REV FULL
```

⑤⑤The background of the block that displays the FSG/GRP value of the step has a condition on it that makes it turn half intensity magenta when the subpicture is displaying a step that was inserted into the recipe build results during the last pass of the recipe build algorithm or if this field of the step was modified during the last pass of the recipe build algorithm. The pseudocode for the condition is shown below:

```
IF(ENT01.R31(&EXPR) = 1) OR (ENT01.R31(&EXPR) = 23)
OR
    (ENT01.R30(&EXPR) = 23) THEN
        SET MAGENTA NO BLINK NO REV HALD
ELSE
        SET WHITE NO BLINK NO REV HALF
```

The value that shows the FSG/GRP value of the step has a condition on it that makes it "disappear" by matching the background color when the value of the variable is zero, and makes it appear white full intensity when it is non-zero. The pseudocode for the condition is shown below:

```
IF (ENT01.R23(&EXPR) = 0) AND ((ENT01.R31(&EXPR) =
1) OR
    (ENT01.R31(&EXPR) = 23) OR (ENT01.R30(&EXPR) = 23))
    THEN
        SET MAGENTA NO BLINK NO REV HALF
ELSE IF ENT01.R23(&EXPR) = 0 THEN
        SET WHITE NO BLINK NO REV HALF
ELSE
        SET WHITE NO BLINK NO REV FULL
```

⑤⑥The background of the block that displays the group defining code value of the step has a condition on it that makes it turn half intensity magenta when the subpicture is displaying a step that was inserted into the recipe build results during the last pass of the recipe build algorithm or if this field of the step was modified during the last pass of the recipe build algorithm. The pseudocode for the condition is shown below:

```
IF(ENT01.R31(&EXPR) = 1) OR (ENT01.R31(&EXPR) = 27)
OR
    (ENT01.R30(&EXPR) = 27) THEN
        SET MAGENTA NO BLINK NO REV HALF
ELSE
        SET WHITE NO BLINK NO REV HALF
```

The value that shows the group defining code value of the step has a condition on it that makes it "disappear" by matching the background color when the value of the variable is zero, and makes it appear white full intensity when it is non-zero. The pseudocode for the condition is shown below:

```
IF (ENT01.R27(&EXPR) = 0) AND ((ENT01.R31(&EXPR) =
1) OR
    (ENT01.R31(&EXPR) = 27) OR (ENT01.R30(&EXPR) = 27))
    THEN
        SET MAGENTA NO BLINK NO REV HALF
ELSE IF ENT01.R27(&EXPR) = 0 THEN
        SET WHITE NO BLINK NO REV HALF
ELSE
        SET WHITE NO BLINK NO REV FULL
```

⑤⑦The background of the block that displays the linked code value of the step has a condition on it that makes it turn half intensity magenta when the subpicture is displaying a step that was inserted into the recipe build results during the last pass of the recipe build algorithm or if this field of the step was modified during the last pass of the recipe build algorithm. The pseudocode for the condition is shown below:

```
IF(ENT01.R31(&EXPR) = 1) OR (ENT01.R31(&EXPR) = 26.5)
OR
   (ENT01.R30(&EXPR) = 26.5) THEN
        SET MAGENTA NO BLINK NO REV HALF
ELSE
        SET WHITE NO BLINK NO REV HALF
```

The value that shows the linked code value of the step has a condition on it that makes it "disappear" by matching the background color when the value of the variable is zero, and makes it appear white full intensity when it is non-zero. The pseudocode for the condition is shown below:

```
IF (((ENT01.R26(&EXPR) MOD 100)/10) = 0) AND ((ENT01.R31(&EXPR) = 1) OR
    (ENT01.R31(&EXPR) = 26.5) OR (ENT01.R30(&EXPR) = 26.5)) THEN
        SET MAGENTA NO BLINK NO REV HALF
ELSE IF ENT01.R26(&EXPR) <10 THEN
        SET WHITE NO BLINK NO REV HALF
ELSE
        SET WHITE NO BLINK NO REV FULL
```

(58)The background of the block that displays the raw material index value of the step has a condition on it that makes it turn half intensity magenta when the subpicture is displaying a step that was inserted into the recipe build results during the last pass of the recipe build algorithm or if this field of the step was modified during the last pass of the recipe build algorithm. The pseudocode for the condition is shown below:

```
IF (ENT01.R31(&EXPR) = 1) OR (ENT01.0.R31(&EXPR) = 24) OR
   (ENT01.R30(&EXPR) = 24) THEN
        SET MAGENTA NO BLINK NO REV HALF
ELSE
        SET WHITE NO BLINK NO REV HALF
```

The value that shows the raw material index value of the step has a condition on it that makes it "disappear" by matching the background color when the value of the variable is zero. If the value of the raw material index is negative, indicating a material residency restriction, then the value is shown in full intensity blue, and if the value of the raw material index is positive, then the value is shown in full intensity white. The pseudocode for the condition is shown below:

```
IF(ENT0.1R24(&EXPR) = 0) AND ((ENT01.R31(&EXPR) = 1) OR
   (ENT01.R31(&EXPR) = 24) OR (ENT01.R30(&EXPR) = 24)) THEN
        SET MAGENTA NO BLINK NO REV HALF
ELSE IF (ENT01.R24(&EXPR) = 0) OR (ENT01.R21(&EXPR) = 0) THEN
        SET WHITE NO BLINK NO REV HALF
ELSE IF ENT01.R24(&EXPR) <0 THEN
        SET BLUE NO BLINK NO REV FULL
ELSE
        SET WHITE NO BLINK NO REV FULL
```

(59)The background of the block that displays the associated subsystem value of the step has a condition on it that makes it turn have intensity magenta when the subpicture is displaying a step that was inserted into the recipe build results during the last pass of the recipe build algorithm or if this field of the step was modified during the last pass of the recipe build algorithm. The pseudocode for the condition is shown below:

```
IF (ENT01.R31(&EXPR) = 1) OR (ENT01.R31(&EXPR) = 25) OR
    (ENT01.R30(&EXPR) = 25) THEN
        SET MAGENTA NO BLINK NO REV HALF
ELSE
        SET WHITE NO BLINK NO REV HALF
```

The value that shows the associated subsystem value of the step has a condition on it that makes it "disappear" by matching the background color when the value of the variable is zero, and makes it appear white full intensity when it is non-zero. The pseudocode for the condition is shown below:

```
IF (ENT01.R25(&EXPR) = 0) AND ((ENT01.R31(&EXPR) = 1) OR
    (ENT01.R31(&EXPR) = 25) OR (ENT01.R30(&EXPR) = 25)) THEN
        SET MAGENTA NO BLINK NO REV HALF
ELSE IF ENT01.R25(&EXPR) = 0 THEN
        SET WHITE NO BLINK NO REV HALF
ELSE
        SET WHITE NO BLINK NO REV FULL
```

(10) The background of the block that displays the conditional start value of the step has a condition on it that makes it turn half intensity magenta when the subpicture is displaying a step that was inserted into the recipe build results during the last pass of the recipe build algorithm or if this field of the step was modified during the last pass of the recipe build algorithm. The pseudocode for the condition is shown below:

```
IF (ENT01.R31 (&EXPR) = 1) OR (ENT01.R31(&EXPR) = 26) OR
    (ENT01.R30(&EXPR) = 26) THEN
        SET MAGENTA NO BLINK NO REV HALF
ELSE
        SET WHITE NO BLINK NO REV HALF
```

The value that shows the conditional start value of the step has a condition on it that makes it "disappear" by matching the background color when the value of the variable is zero, and makes it appear white full intensity when it is non-zero. The pseudocode for the condition is shown below:

```
IF ((ENT01.R26(&EXPR) MOD 10) = 0) AND ((ENT01.R31(&EXPR) = 1) OR
    (ENT01.R31(&EXPR) = 26) OR (ENT01.R30(&EXPR) = 26)) THEN
        SET MAGENTA NO BLINK NO REV HALF
ELSE IF ENT01.R26(&EXPR) = 0 THEN
        SET WHITE NO BLINK NO REV HALF
ELSE
        SET WHITE NO BLINK NO REV FULL
```

(11) The background of the block that displays the paired step ID value of the step has a condition on it that makes it turn half intensity magenta when the subpicture is displaying a step that was inserted into the recipe build results during the last pass of the recipe build algorithm or if this field of the step was modified during the last pass of the recipe build algorithm. The pseudocode for the condition is shown below

```
IF (ENT01.R31(&EXPR) = 1) OR (ENT01.R31(&EXPR) = 29) OR
   (ENT01.R30(&EXPR) = 29) THEN
        SET MAGENTA NO BLINK NO REV HALF
ELSE
        SET WHITE NO BLINK NO REV HALF
```

The value that shows the paired step ID value of the step has a condition on it that makes it "disappear" by matching the background color when the value of the variable is zero, and makes it appear white full intensity when it is non-zero. The pseudocode for the condition is shown below:

```
IF (ENT01.R29(&EXPR) = 0) AND ((ENT01.R31(&EXPR) = 1) OR
   (ENT01.R31(&EXPR) = 29) OR (ENT01.R30(&EXPR) = 29)) THEN
        SET MAGENTA NO BLINK NO REV HALF
ELSE IF ENT01.R29(&EXPR) = 0 THEN
        SET WHITE NO BLINK NO REV HALF
ELSE
        SET WHITE NO BLINK NO REV FULL
```

8.7.1.2 Change Zone Variant

The change zone variant for the schematic INTERMDO is as follows:
```
IF FSSP.R01(1)<0 THEN
    SUB FFPGMCZ8
ELSE
    SUB INTCZ1A8
BAD VALUE=SUB FRMCZ5A8
```
This change zone variant is different from the normal change zone variants in that the program interface change zone is only displayed if the request code value is negative, indicating an error. This is because this schematic is normally used during a recipe build operation, and the user needs to be able to control the schematic through the change zone while the recipe build is in progress, instead of having the normal recipe build messages being displayed.

The bad value leg of the variant calls up the change zone FRMCZ5A8. The subpicture FRMCZ5A8 (also used in many other schematice) contains a single target that the user can touch to initialize all the user DDB variables for the station.

8.7.1.2.1 Change Zone Subpicture FFPGMCZ8

This change zone subpicture is the standard program interface change zone for Flexible Formulation. It is documented in the station point section of this DFS. It is invoked whenever the request code on the assigned station point for the universal station is non zero, indicating that a function is in progress or an error has been generated.

8.7.1.2.2 Change Zone Subpicture INTCZ1A8

Change zone subpicture INTCZ1A8 is the default change zone for the schematic INTERMDO. The change is shown in FIG. 59.

The page back block of the change zone INTCZ1A8 is used to page backwards through the steps in the intermediate results of the recipe build display.

Targets

The target in the page back block of the change zone INTCZ1A8 presses the page back button.

The pseudocode for the target is shown below:
QUE-KEY(PAGE-BK)

(6.2) Page Forward Block

The page forward block of the change zone INTCZ1A8 is used to page forward through the steps in the intermediate results of the recipe build display.

Targets

The target in the page forward block of the change zone INTCZ1A8 presses the page forward button. The pseudocode for the target is shown below:
QUE-KEY(PAGE-FWD)

(6.3) Builder Mode Block

The Builder Mode block of the change zone INTCZ1A8 is used to display the current recipe builder mode and to allow the user to change the recipe builder mode.

Targets

The target in the Builder Mode block of the change zone INTCZ1A8 toggles the recipe builder mode between semi-auto and full-auto modes. The pseudocode for the target is shown below:
```
IF RECBUILD.R11(4)=1 THEN
    SET RECBUILD.R11(4)=0
ELSE
    SET RECBUILD.R11(4)=1
ENDIF
UPDATE(0.0)
```

Variants

A text variant is present in the Builder Mode block of the change zone INTCZ1A8 which displays to the user the current mode state of the recipe builder. The pseudocode for the variant is shown below:
```
IF RECBUILD.R11(4)=1 THEN
    "SEMI-AUTO"
ELSE
    "FULL AUTO"
BAD VALUE="Bad Value"
```

(6.4) Advance Block

The Advance block of the change zone INTCZ1A8 is used to display the current advance flag state of the recipe builder and to allow the user to change the advance flag state.

Targets

The target in the Advance block of the change zone INTCZ1A8 toggles the state of the advance flag between "on" and "off". The pseudocode for the target is shown below:
IF RECBUILD.R11(5)=1.0 THEN
    SET RECBUILD.R11(5)=0.0
ELSE
    SET RECBUILD.R11(5)—1.0
ENDIF
UPDATE(0.0)

Variants

A text variant is present in the Advance Block of the change zone INTCZ1A8 which displays to tile user the current state of the recipe builder advance flag. The pseudocode for the variant is shown below:
IF RECBUILD.R11(5)=1 THEN
    "ON"
ELSE
    "OFF"
BAD VALUE—"BV"

(6.6)Message Block

The Message Block of the change zone INTCZ1A8 is used to display status messages concerning the current state of the recipe builder.

Conditions

The "IN PROGRESS" text has a condition on it that makes it "disappear" by becoming the same color as the background when the recipe builder is not operating. The pseudocode for the condition is shown below:
IF RECBUILD.R11(6)<>THEN
    SET WHITE BLINK NO REV FULL
ELSE
    SET WHITE NO BLINK NO REV HALF Variants A text variant is present in the Message Block of the change zone INTCZ1A8 which displays to the user a text string indicating the current state of the recipe builder. The pseudocode for the variant is shown below:
IF RECBUILD.R11(6)=1 THEN "PASS 1"
ELSE IF RECBUILD.R11(6)=2 THEN "PASS 2"
ELSE IF RECBUILD.R11(6)=3 THEN "PASS 3"
ELSE IF RECBUILD.R11(6)=4 THEN "PASS 4"
ELSE IF RECBUILD.R11(6)=5 THEN "PASS 5"
ELSE IF RECBUILD.R11(6)=6 THEN "PASS 6"
ELSE IF RECBUILD.R11(6)=7 THEN "PASS 7"
ELSE IF RECBUILD.R11(6)=8 THEN "PASS 8"
ELSE IF RECBUILD.R11(6)=9 THEN "PASS 9"
ELSE IF RECBUILD.R11(6)=10 THEN "PASS 10"
ELSE IF RECBUILD.R11(6)=100 THEN "LOADING"
ELSE IF RECBUILD.R11(6)=-1 THEN "PAUSED"
ELSE IF RECBUILD.R11(6)=-2 THEN "WAITING"
ELSE IF RECBUILD.R11(6)=0 THEN "INACTIVE"

(6.6)Recipe View Block

The Recipe View Block of the change zone INTCZ1A8 allows the user to call up the recipe build buffer display schematic REDPC1CO.

Targets

The target present in the Recipe View Block of the change zone INTCZ1A8 invokes the recipe build buffer display schematic, REDPC1CO. The pseudocode for the target is shown below:
SCHEM("REDPC1CO")

(6.7)Formula Select Block

The Formula Select Block of the change zone INTCZ1A8 allows the user to call up the formula selection schematic FRMPC1A0.

Targets

The target present in the Formula Select Block of the change zone INTCZ1A8 invokes the formula selection schematic, FRMPC1A0. The pseudocode for the target is shown below:
SCHEM("FRMPC1A0")

(6.8)Return Block

The Return Block of the change zone INTCZ1A8 returns the user to the previous schematic.

Targets

The target present in the Return Block of the change zone INTCZ1A8 presses the "PRIOR DISPLAY" button on the keyboard. The pseudocode for the target is shown below:
QUE-KEY-("PRR-DISP")

We claim:

1. In a process plant having a process control system and at least one production line, each production line having equipment with a predetermined equipment configuration, the process control system further including a controller for interfacing to each production line, the process control system having information pertaining to the equipment configuration of each production line stored in an equipment data base, the operations performed by each production line stored in an operations data base, and raw materials information of the process plant stored in a raw materials data base, a method for controlling the production of a product by a production line comprising the steps of:

a) based on the product to be produced, building a formula from formula data, the formula data providing information relating to relative quantities of raw materials included in the product, the order of combining the raw materials, and the process operations, the formula providing a sequence of operations for combining the raw materials compatible with production line operations and consistent with the formula data, the formula being independent of equipment;

b) based on the formula and a selected production line, building a recipe for the product in accordance with a predetermined set of rules to perform a merging of the formula and equipment of the selected production line, wherein the predetermined set of rules comprises the steps of:

i) fetching the formula information, equipment information, raw material information, and operations information from the respective data bases, to store the fetched information in a single data structure;

ii) identifying a material feed group to identify first predetermined steps of the recipe, said first predetermined steps including a START step, necessary to be inserted into the recipe being built;

iii) examining each START step within the recipe to determine if the START step should be made conditional;

iv) sorting each step of the recipe resulting from step (iii) above according to a vessel of the equipment configuration associated with the step;

v) inserting an initiate gauge fill step into the recipe prior to a gauge tank step; and vi) calculating parameters associated with second predetermined steps of said recipe;

the recipe being a set of steps unique to the selected production line, and further wherein the set of steps is ordered to conform to the capabilities of the equipment configuration of the selected production line, necessary to produce the product; and c) executing the recipe by the controller, the controller causing the equipment of the production line to perform the specified operations in the specified sequence as called for in each step of the recipe to geneate the product.

2. A method for controlling the production of a product by a production line according to claim 1, wherein the first predetermined steps comprise the steps of, within the recipe, START, READY to DUMP, REQUEST to DUMP, and DUMP.

3. A method for controlling the production of a product by a production line according to claim 2, wherein the second predetermined steps within the recipe include parameters which include engineering unit setpoints, setpoint limits, and material tolerances.

4. In a process plant having a process control system and at least one production line, each production line having equipment with a predetermined equipment configuration, the process control system further including a controller for interfacing to each production line, the process control system having access to an equipment data base wherein there is stored information pertaining to the equipment configuration of each production line, the process control system also having access to an operations data base wherein there is stored information relating to operations performed by each production line, and the process control system further having access to a raw materials data base having stored therein information relating to the raw materials on hand in the process plant, a method for controlling the production of a product by a production line comprising the steps of:

a) based on the product to be produce, building a formula from formula data, the formula data providing information relating to relative quantities of raw materials included in the product, the order of combining the raw materials, and the process operations, the formula being built providing a sequence of operations for combining the raw materials compatible with production line operations for a selected production line and consistent with the formula data, the formula being independent of equipment of the production line;

b) based on the formula and the selected production line, building a recipe for the product in accordance with a predetermined set of rules to perform a merging of the formula and equipment of the selected production line, wherein the predetermined set of rules comprises the steps of:

i) fetching the formula information, equipment information, raw material information, and operations information from the respective data bases, to store the fetched information in a single data structure;

ii) identifying a material feed group to identify first predetermined steps of the recipe, said first predetermined steps including a START step, necessary to be inserted into the recipe being built;

iii) examining each START step within the recipe to determine if the START step should be made conditional;

iv) sorting each step of the recipe resulting from step (iii) above according to a vessel of the equipment configuration associated with the step;

v) inserting an initiate gauge fill step into the recipe prior to a gauge tank feed step; and vi) calculating parameters associated with second predetermined steps of said recipe:

the recipe being a set of steps unique to the selected production line, and further wherein the set of steps is ordered to conform to the capabilities of the equipment configuration of the selected production line, necessary to produce the product; and c) executing the recipe by the controller, the controller causing the equipment of the production line to perform the specified operations in the specified sequence as called for in each step of the recipe to generate the product, whereby the building of the recipe included as pan of controlling the production of a product eliminates formula management, and further readily allowing modification in the formula data including modifying characteristics of the modified product being produced.

5. A method for controlling the production of a product by a production line according to claim 4, wherein the first predetermined steps comprise the steps of, within the recipe, START, READY to DUMP, REQUEST to DUMP, and DUMP.

6. A method for controlling the production of a product by a production line according to claim 5, wherein the second predetermined steps within the recipe include parameters which include engineering unit setpoints, setpoint limits, and material tolerances.

* * * * *